US007916381B2

(12) United States Patent
Shirai et al.

(10) Patent No.: US 7,916,381 B2
(45) Date of Patent: Mar. 29, 2011

(54) SPATIAL LIGHT MODULATOR INCLUDING DRIVE LINES

(75) Inventors: Akira Shirai, Tokyo (JP); Fusao Ishii, Menlo Park, CA (US)

(73) Assignees: Silicon Quest Kabushiki-Kaisha (JP); Olympus Corporation (JP)

( * ) Notice: Subject to any disclaimer, the term of this patent is extended or adjusted under 35 U.S.C. 154(b) by 138 days.

(21) Appl. No.: 12/381,812

(22) Filed: Mar. 16, 2009

(65) Prior Publication Data

US 2009/0207165 A1 Aug. 20, 2009

Related U.S. Application Data

(63) Continuation-in-part of application No. 12/291,922, filed on Nov. 13, 2008, and a continuation-in-part of application No. 12/074,033, filed on Mar. 1, 2008, and a continuation-in-part of application No. 11/121,543, filed on May 4, 2005, now Pat. No. 7,268,932, and a continuation-in-part of application No. 10/698,620, filed on Nov. 1, 2003, now abandoned, said application No. 11/121,543 is a continuation-in-part of application No. 10/698,620, and a continuation-in-part of application No. 10/699,140, filed on Nov. 1, 2003, now Pat. No. 6,862,127, and a continuation-in-part of application No. 10/699,143, filed on Nov. 1, 2003, now Pat. No. 6,903,860.

(60) Provisional application No. 61/069,454, filed on Mar. 15, 2008.

(51) Int. Cl.
*G02B 26/00* (2006.01)

(52) U.S. Cl. ........................ 359/290; 359/291; 359/295

(58) Field of Classification Search .......... 359/290–298, 359/318
See application file for complete search history.

(56) References Cited

U.S. PATENT DOCUMENTS

| | | | | |
|---|---|---|---|---|
| 4,571,603 | A | 2/1986 | Hornbeck et al. | |
| 5,061,049 | A | 10/1991 | Hornbeck | |
| 5,214,420 | A | 5/1993 | Thompson et al. | |
| 5,285,407 | A | 2/1994 | Gale et al. | |
| 5,452,024 | A | 9/1995 | Sampsell | |
| 5,671,083 | A * | 9/1997 | Conner et al. | 359/291 |
| 6,388,661 | B1 | 5/2002 | Richards | |
| 6,538,800 | B2 | 3/2003 | Huibers | |
| 6,809,977 | B1 | 10/2004 | Richards | |
| 6,856,447 | B2 | 2/2005 | Richards et al. | |
| 6,888,521 | B1 | 5/2005 | Richards | |
| 7,012,592 | B2 | 3/2006 | Richards | |
| 7,027,205 | B2 | 4/2006 | Richards | |
| 7,027,207 | B2 * | 4/2006 | Huibers | 359/291 |
| 7,283,105 | B2 * | 10/2007 | Dallas et al. | 345/32 |
| 7,733,558 | B2 * | 6/2010 | Arai et al. | 359/290 |

* cited by examiner

*Primary Examiner* — Mohammed Hasan
(74) *Attorney, Agent, or Firm* — Bo-In Lin

(57) ABSTRACT

A spatial light modulator includes a pixel array including a plurality of pixel elements arranged in a form of a matrix; a word line extending along and connected to a row of the pixel elements pixel elements; and a drive line for transmitting additional modulating signals to said pixel array extended along each row of the pixel array and connected to the pixel elements in a first row and a second row constituting two different rows.

46 Claims, 41 Drawing Sheets

| Intermediate | latch out | Bitline OFF side | Bitline ON side |
|---|---|---|---|
| 1 (SW ON) | 1 | 0 | 1 |
| 1 (SW ON) | 0 | 1 | 0 |
| 0 (SW OFF) | 1 | 0 | 0 |
| 0 (SW OFF) | 0 | 1 | 0 |

221-3 220d 221-1 221-2

Fig. 17

SPATIAL LIGHT MODULATOR INCLUDING DRIVE LINES

CROSS REFERENCE TO RELATED APPLICATIONS

This application is a Non-provisional application of a Provisional Application 61/069,454 filed on Mar. 15, 2008 and a Continuation in Part Application of a Non-provisional patent application Ser. No. 12/291,922 filed on Nov. 13, 2008 and another Non-provisional application Ser. No. 12/074,033 filed on Mar. 1, 2008. This Application is further a Continuation in Part Application of a Non-provisional patent application Ser. No. 11/121,543 filed on May 4, 2005 issued into U.S. Pat. No. 7,268,932 and another Non-provisional application Ser. No. 10/698,620 filed on Nov. 1, 2003 now abandoned. The application Ser. No. 11/121,543 is a Continuation In Part (CIP) Application of three previously filed Applications. These three Applications are Ser. No. 10/698,620 filed on Nov. 1, 2003, now abandoned Ser. No. 10/699,140 filed on Nov. 1, 2003 now issued into U.S. Pat. No. 6,862,127, and Ser. No. 10/699,143 filed on Nov. 1, 2003 now issued into U.S. Pat. No. 6,903,860 by the Applicant of this Patent Applications. The disclosures made in these patent applications are hereby incorporated by reference in this Patent Application.

BACKGROUND OF THE INVENTION

1. Technical Field

The present invention relates generally to a video project apparatus implemented with a spatial light modulator. More particularly, the invention relates to a spatial light modulator implemented with plate lines for transmitting signals to modulate said pixel array.

2. Description of the Related Art

Even though there are significant advances made in recent years on the technologies of implementing electromechanical micro-mirror devices as spatial light modulator, there are still limitations and difficulties when employed to provide high quality images display. Specifically, when the display images are digitally controlled, the image qualities are adversely affected due to the fact that the image is not displayed with sufficient number of gray scales.

Electromechanical micro-mirror devices have drawn considerable interest because of their application as spatial light modulators (SLMs). A spatial light modulator requires an array of a relatively large number of micro-mirror devices. In general, the number of required devices ranges from 60,000 to several million for each SLM. Referring to FIG. 1A, an image display system 1 including a screen 2 is disclosed in a relevant U.S. Pat. No. 5,214,420. A light source 10 is used to generate light beams to project illumination for the display images on the display screen 2.

The light 9 projected from the light source is further concentrated and directed toward lens 12 by way of mirror 11. Lenses 12, 13 and 14 form a beam columnator operative to columnate the light 9 into a column of light 8. A spatial light modulator 15 is controlled by a computer through data transmitted over data cable 18 to selectively redirect a portion of the light from path 7 toward lens 5 to display on screen 2. FIG. 1B shows a SLM 15 that has a surface 16 that includes an array of switchable reflective elements 17, 27, 37, and 47, each of these reflective elements is attached to a hinge 30. When the element 17 is in an ON position, a portion of the light from path 7 is reflected and redirected along path 6 to lens 5 where it is enlarged or spread along path 4 to impinge on the display screen 2 to form an illuminated pixel 3. When the element 17 is in an OFF position, the light is reflected away from the display screen 2 and, hence, pixel 3 is dark.

The on-and-off states of the micromirror control scheme, as that implemented in the U.S. Pat. No. 5,214,420 and in most conventional display systems, impose a limitation on the quality of the display. Specifically, applying the conventional configuration of a control circuit limits the gray scale gradations produced in a conventional system (PWM between ON and OFF states), limited by the LSB (least significant bit, or the least pulse width). Due to the ON-OFF states implemented in the conventional systems, there is no way of providing a shorter pulse width than the duration represented by the LSB. The least intensity of light, which determines the gray scale, is the light reflected during the least pulse width. The limited levels of the gray scale lead to a degradation of the display image Specifically, FIG. 1C exemplifies, as related disclosures, a circuit diagram for controlling a micromirror according to U.S. Pat. No. 5,285,407. The control circuit includes memory cell 32. Various transistors are referred to as "M*" where "*" designates a transistor number and each transistor is an insulated gate field effect transistor. Transistors M5, and M7 are p-channel transistors; transistors, M6, M8, and M9 are n-channel transistors. The capacitances, C1 and C2, represent the capacitive loads in the memory cell 32. The memory cell 32 includes an access switch transistor M9 and a latch 32*a* based on a Static Random Access switch Memory (SRAM) design. All access transistors M9 on a Row line receive a DATA signal from a different Bit-line 31*a*. The particular memory cell 32 is accessed for writing a bit to the cell by turning on the appropriate row select transistor M9, using the ROW signal functioning as a Word-line. Latch 32*a* consists of two cross-coupled inverters, M5/M6 and M7/M8, which permit two stable states that include a state 1 when is Node A high and Node B low, and a state 2 when Node A is low and Node B is high The control circuit positions the micro-mirrors to be at either an ON or an OFF angular orientation, as that shown in FIG. 1A. The brightness, i.e., the number of gray scales of display for a digitally control image system, is determined by the length of time the micro-mirror stays at an ON position. The length of time a micromirror is in an ON position is controlled by a multiple bit word. FIG. 1D shows the "binary time intervals" when controlling micromirrors with a four-bit word. As shown in FIG. 1D, the time durations have relative values of 1, 2, 4, 8, which in turn define the relative brightness for each of the four bits where "1" is the least significant bit and "8" is the most significant bit. According to the control mechanism as shown, the minimum controllable differences between gray scales for showing different levels of brightness is a represented by the "least significant bit" that maintains the micromirror at an ON position.

For example, assuming n bits of gray scales, one time frame is divided into $2^n-1$ equal time periods. For a 16.7-millisecond frame period and n-bit intensity values, the time period is $16.7/(2^n-1)$ milliseconds.

Having established these times for each pixel of each frame, pixel intensities are quantified such that black is a 0 time period, the intensity level represented by the LSB is 1 time period, and the maximum brightness is $2^n-1$ time periods. Each pixel's quantified intensity determines its ON-time during a time frame. Thus, during a time frame, each pixel with a quantified value of more than 0 is ON for the number of time periods that correspond to its intensity. The viewer's eye integrates the pixel brightness so that the image appears the same as if it were generated with analog levels of light.

For controlling deflectable mirror devices, the PWM applies data to be formatted into "bit-planes", with each bit-plane corresponding to a bit weight of the intensity of light. Thus, if the brightness of each pixel is represented by an n-bit value, each frame of data has the n-bit-planes. Then, each bit-plane has a 0 or 1 value for each mirror element. According to the PWM control scheme described in the preceding paragraphs, each bit-plane is independently loaded and the mirror elements are controlled according to bit-plane values corresponding to the value of each bit during one frame. Specifically, the bit-plane according to the LSB of each pixel is displayed for 1 time period.

Meanwhile, higher levels of resolution and higher grades of gray scales required for better quality display images are in demand for projection apparatuses, especially in recent years due to the increased availability of video images, such as that provided by high definition television (HDTV) broadcasting.

However, in the gray scale control by the pulse width modulation (PWM), as shown in FIG. 1D, the expressible gray scale is limited by the length of the time period determined by the LSB. An attempt to add a new control structure to a memory cell of the above described SRAM structure in order to overcome the aforementioned limitation creates another problem, that is, the structure of a complex memory cell, with a larger number of transistors than, for example, the memory cell of a DRAM structure, increases the size of the mechanism.

Specifically, in order to obtain a higher definition display image, a large number of mirror elements are required. Each of these mirror elements, comprising an SRAM-structured memory cell, must be reduced in size to fit in the space of a certain mounting size (e.g., a predefined package size or chip size). However, the addition of a new control structure to an SRAM-structured memory cell in order to attain a higher level gray scale display image increases the size of the memory cell, thereby inhibiting a higher level display image.

In light of the above described limitations, it is necessary to solve the technical challenge of realizing a higher gray scale level, which exceeds the conventional method to control the gray scale a display image with pulse width modulation (PWM), while projecting images with a higher definition with memory cells having the simplest possible structure comprising a small number of circuit elements.

SUMMARY OF THE INVENTION

An aspect of the present invention is to provide a new configuration and control process for a video projection apparatus implemented with a spatial light modulation element. The video project apparatus can display images with a higher gray scale and a higher definition without increasing the number of wires.

A first embodiment of the present invention provides a spatial light modulator that includes a plurality of pixel elements arranged in a form of a matrix; a word line extending along and connected to a row of the pixel elements pixel elements; and a drive line for transmitting additional modulating signals to said pixel array extended along each row of the pixel array and connected to the pixel elements in a first row and a second row constituting two different rows.

A second embodiment of the present invention provides the spatial light modulator according to the first embodiment, wherein the drive lines are connected to the pixel elements arranged on two adjacent rows.

A third embodiment of the present invention provides the spatial light modulator according to the first embodiment, wherein each of the plurality of pixel elements includes first and second memories each including a capacitor and a transistor, a first electrode connected to the first memory, a second electrode connected to the second memory; a third electrode connected to the a first drive line extended along the first row including the pixel element, and a fourth electrode connected to a second drive line extended along the second row not including the pixel element.

A fourth embodiment of the present invention provides the spatial light modulator according to the first embodiment, wherein each of the plurality of pixel elements includes a first memory including first and second capacitors, and a first transistor, a second memory including third and fourth capacitors, and a second transistor, a first electrode connected to the first memory, and a second electrode connected to the second memory; the second capacitor is connected to the first drive line extended along the first row including the pixel element; and the fourth capacitor is connected to the second drive line arranged in the second row not including the pixel element.

A fifth embodiment of the present invention provides the spatial light modulator according to the first embodiment, wherein each of the plurality of pixel elements includes a first memory including a first capacitor and a first transistor, a second memory including a second capacitor and a second transistor, a first electrode connected to the first memory, and a second electrode connected to the second memory; the first capacitor is connected to a first drive line extended along the first row including the pixel element; and the second capacitor is connected to a second drive line extended along the second row not including the pixel element.

A sixth embodiment of the present invention provides the spatial light modulator according to the first embodiment, wherein each of the plurality of pixel elements includes a first memory including a first capacitor, and first and second transistors, a second memory including a second capacitor, and third and fourth transistors, a power supply connected to the second and the fourth transistors, a first electrode connected to the first memory, and a second electrode connected to the second memory; the second transistor is connected to the drive line extended along the first row including the pixel element; and the fourth transistor is connected to the drive line extended along the second row not including the pixel element.

A seventh embodiment of the present invention provides the spatial light modulator according to the first embodiment, wherein each of the plurality of pixel elements includes a first memory including a first capacitor, a first transistor and a first diode, a second memory including a second capacitor, a second transistor and a second diode, a first electrode connected to the first memory, and a second electrode connected to the second memory; the first diode is connected to the drive line extended along the first row including the pixel element; and the second diode is connected to the drive line extended along the second row not including the pixel element.

An eighth embodiment of the present invention provides the spatial light modulator according to the first embodiment, comprising a mirror device.

A ninth embodiment of the present invention provides the spatial light modulator according to the first embodiment, wherein the drive line is controlled for defecting a mirror of the pixel element in the first row in an ON direction, and the drive line is controlled simultaneously for deflecting a mirror of the pixel element in the second row in an OFF direction.

A tenth embodiment of the present invention provides the spatial light modulator according to the first embodiment, further comprising: a driver circuit for transmitting a signal to the pixel element in the second row and simultaneously transmitting the signal to the pixel element in the first row by the drive line.

An eleventh embodiment of the present invention provides the spatial light modulator according to the first exemplary embodiment, further comprising a driver circuit for transmitting a signal through the drive line to generate and apply a potential on the drive line to drive the pixel element.

A twelfth embodiment of the present invention provides the spatial light modulator according to the first embodiment, which further comprises a bit line extended along each column of the pixel array and connected to the pixel elements in each column of the pixel array, wherein a driver circuit for transmitting a signal through the drive line for applying a potential on the bit line in the pixel element.

A thirteenth embodiment of the present invention provides the spatial light modulator according to the first embodiment, further comprising a driver circuit for transmitting a signal through a drive line with a shorter transmission duration than a cycle of an access to the pixel element through the word line.

A fourteenth embodiment of the present invention provides the spatial light modulator according to the first embodiment, further comprising: a driver circuit for transmitting a signal through a drive line with a shorter transmission duration almost equal to a cycle of an access to the pixel element through the word line.

A fifteenth embodiment of the present invention provides the spatial light modulator according to the first embodiment, which further comprises a bit line extending along each column of the pixel array and connected to the pixel elements in each column of the pixel array, wherein: each of the plurality of pixel element elements includes a first memory including a first capacitor, and first and second transistors, a second memory including a second capacitor, and third and fourth transistors, a first electrode connected to the first memory, and a second electrode connected to the second memory; the first transistor is connected to the word line and a first bit line; the second transistor is connected to the drive line in the first row including the pixel element, and a second bit line; the third transistor is connected to the word line and a third bit line; the fourth transistor is connected to the drive line extended along the second row not including the pixel element, and a fourth bit line; a driver circuit for synchronously transmitting signals in the first and the second bit lines of different voltages; and the driver circuit further synchronously transmits signals in the third and the fourth bit lines of different voltages.

A sixteenth embodiment of the present invention provides the spatial light modulator according to the first embodiment, which further comprises a scanning direction switching unit for switching a scanning direction of the drive line between a forward direction and a reverse direction.

A seventeenth embodiment of the present invention provides a spatial light modulator, which comprises a pixel array including a plurality of pixel element arranged in a form of a matrix; a drive line for transmitting signals for modulating said pixel array extended along each row of the pixel array, and connected to the pixel elements in first row and a second row, wherein a signal is transmitted to a pixel element in the second row while the signal is transmitted by the drive line to the pixel element in the first row.

An eighteenth embodiment of the present invention provides the spatial light modulator according to the seventeenth embodiment, wherein a driver circuit for transmitting a signal through the drive line to generate and apply a potential on the drive line to drive the pixel element.

A nineteenth embodiment of the present invention provides the spatial light modulator according to the seventeenth embodiment, which further comprises a bit line extended along each column of the pixel array and connected to the pixel elements in each column of the pixel array, wherein a driver circuit for transmitting a signal through the drive line for generating a potential for applying to the pixel element from the bit line.

A twentieth embodiment of the present invention provides the spatial light modulator according to the seventeenth embodiment, further comprising: a driver circuit for transmitting a signal through a drive line with a shorter transmission duration than a cycle of an access to the pixel element through a word line and extended along each row of the pixel array and connected to the pixel elements in each row of the pixel array.

A twenty-first embodiment of the present invention provides the spatial light modulator according to the seventeenth embodiment, wherein a driver circuit for transmitting a signal through a drive line with a shorter transmission duration almost equal to a cycle of an access to the pixel element through the word line extended along each row of the pixel array and connected to the pixel elements in each row of the pixel array.

A twenty-second embodiment of the present invention provides the spatial light modulator according to the seventeenth embodiment, which further comprises a bit line extended along each column of the pixel array and connected to the pixel elements in each column of the pixel array, wherein: each of the plurality of pixel elements includes a first memory including a first capacitor, and first and second transistors, a second memory including a second capacitor, and third and fourth transistors, a first electrode connected to the first memory, and a second electrode connected to the second memory; the first transistor is connected to a word line extended along each row of the pixel array and connected to the pixel elements in each row of the pixel array and a first bit line; the second transistor is connected to the drive line in the first row including the pixel element, and a second bit line; the third transistor is connected to the word line and a third bit line; the fourth transistor is connected to the drive line extended along the second row not including the pixel element, and a fourth bit line; a driver circuit for synchronously transmitting signals of different voltages in the first and the second bit lines; and a driver circuit for synchronously transmitting signals of different voltages in the third and the fourth bit lines.

A twenty-third embodiment of the present invention provides the spatial light modulator according to the seventeenth embodiment, which further comprises a scanning direction switching unit for switching a scanning direction of the drive line between a forward direction and a reverse direction.

A twenty-fourth embodiment of the present invention provides the spatial light modulator according to the seventeenth embodiment, wherein the first row and the second row connected to a same drive line are two adjacent rows.

A twenty-fifth embodiment of the present invention provides the spatial light modulator according to the seventeenth embodiment, wherein each of the plurality of pixel elements includes first and second memories each including a capacitor and a transistor; a first electrode connected to the first memory, a second electrode connected to the second memory a third electrode connected to the drive line extended along the first row including the pixel element belongs, and a fourth electrode connected to the drive line extended along the second row not including the pixel element.

A twenty-sixth embodiment of the present invention provides the spatial light modulator according to the seventeenth embodiment, wherein each of the plurality of pixel elements includes a first memory including first and second capacitors, and a first transistor, a second memory including third and fourth capacitors, and a second transistor, a first electrode connected to the first memory, and a second electrode connected to the second memory; the second capacitor is connected to the drive line extended along the first row including the pixel element; and the fourth capacitor is connected to the drive line extended along the second row not including the pixel element.

A twenty-seventh embodiment of the present invention provides the spatial light modulator according to the seventeenth embodiment, wherein each of the plurality of pixel elements includes a first memory including a first capacitor and a first transistor, a second memory including a second capacitor and a second transistor, a first electrode connected to the first memory, and a second electrode connected to the second memory; the first capacitor is connected to the drive line extended along the first row including the pixel element; and the second capacitor is connected to the drive line extended along the second row not including the pixel element.

A twenty-eighth embodiment of the present invention provides the spatial light modulator according to the seventeenth embodiment, wherein each of the plurality of pixel elements includes first memory including a first capacitor, and first and second transistors, a second memory including a second capacitor, and third and fourth transistors, a power supply connected to the second and the fourth transistors, a first electrode connected to the first memory, and a second electrode connected to the second memory; the second transistor is connected to the drive line extended along the first row including the pixel element; and the fourth transistor is connected to the drive line extended along the second row not including the pixel element.

A twenty-ninth embodiment of the present invention provides the spatial light modulator according to the seventeenth embodiment, wherein each of the plurality of pixel element elements includes a first memory including a first capacitor, a first transistor and a first diode, a second memory including a second capacitor, a second transistor and a second diode, a first electrode connected to the first memory, and a second electrode connected to the second memory; the first diode is connected to the drive line extended along the first row including the pixel element belongs; and the second diode is connected to the drive line extended along the second row not including the pixel element.

A thirtieth embodiment of the present invention provides the spatial light modulator according to the seventeenth embodiment, comprises a mirror device.

A thirty-first embodiment of the present invention provides the spatial light modulator according to the seventeenth embodiment, wherein a driver circuit for transmitting a signal through the drive line for deflecting a mirror of the pixel element in the first row toward an ON direction, and for simultaneously deflecting a mirror of the pixel element in the second row toward an OFF direction.

A thirty-second embodiment of the present invention provides a method for controlling a spatial light modulator implemented with drive lines extended along rows of a pixel array including a plurality of pixel elements arranged in a form of a matrix, comprising: transmitting a signal to a plurality of pixel elements along selective rows through a plurality of selected drive lines when no signals are transmitted in other drive lines.

A thirty-third embodiment of the present invention provides the method according to the first embodiment, wherein the step of transmitting a signal to a plurality of pixel elements along selective rows through a plurality of selected drive lines comprising a step of transmitting the signal to a plurality of pixel elements extended along a first row and a second row. A thirty-fourth embodiment of the present invention provides the method according to the second embodiment, wherein the step of transmitting a signal to a plurality of pixel elements along selective rows through a plurality of selected drive lines comprising a step of transmitting the signal to a plurality of pixel elements extended along a first row and a second row adjacent to the first row.

A thirty-fifth embodiment of the present invention provides a method for controlling a spatial light modulator implemented with drive lines extended along rows of a pixel array including a plurality of pixel elements arranged in a form of a matrix, comprising: selecting and transmitting a data access signal on a first drive line; and selecting and transmitting a subsequent data access signal on a second drive line with the second drive line located at N rows away from the first drive line, where N is a positive integer.

A thirty-sixth embodiment of the present invention provides the method according to the fourth embodiment, further comprising a step of connecting a drive line to the pixel elements along a first row and a second row in the pixel array.

A thirty-seventh embodiment of the present invention provides the method according to the fifth embodiment, wherein connecting a drive line to the pixel elements along a first row and a second row with the second row adjacent to the first row in the pixel array.

A thirty-eight embodiment of the present invention provides the method according to claim 4, wherein the step of selecting and transmitting a data access signal on a first and second drive lines located with N rows between the first and second drive lines comprise a step of select and transmitting the data access signal on two adjacent drive lines with N=0.

A thirty-ninth embodiment of the present invention provides the method according to the fourth embodiment, wherein the step of selecting and transmitting a data access signal on a first and second drive lines located with N rows between the first and second drive lines comprise a step of select and transmitting the data access signal on two drive lines with N=1.

A forty embodiment of the present invention provides the method according to the fourth embodiment, wherein the step of selecting and transmitting a data access signal on a first and second drive lines located with N rows between the first and second drive lines comprise a step of select and transmitting the data access signal on two drive lines with N=2.

A forty-first embodiment of the present invention provides the method according to the fourth embodiment, wherein the step of selecting and transmitting a data access signal on a first and second drive lines located with N rows between the first and second drive lines comprise a step of processing an input video image signal applying a processing result for determining the number of rows represented by N.

A forty-second embodiment of the present invention provides the method according to the tenth embodiment, wherein the step of processing the input video image signal further comprising a step of determining the input video image signal comprising an interlaced signal or a progressive signal.

A forty-third embodiment of the present invention provides a method for controlling a spatial light modulator implemented with lines in a pixel array with a plurality of pixel elements arranged in a form of a matrix, comprising partitioning the drive lines into at least two groups and transmitting a signal to a pixel element through the drive lines within each of the groups in a predetermined duration.

A forty-fourth embodiment of the present invention provides the method according to the twelfth embodiment, further comprising a step of connecting a drive line to the pixel elements along a first row and a second row in the pixel array.

A forty-fifth embodiment of the present invention provides the method according to the twelfth embodiment, wherein the step of partitioning the drive lines into at least two groups further comprising a step of partitioning the drive lines into a plurality of groups with each group including an equal number of drive lines.

A forty-sixth embodiment of the present invention provides the method according to the twelfth embodiment, wherein the step of partitioning the drive lines into at least two groups further comprising a step of partitioning the drive lines into groups according to driver circuit configuration for controlling the drive lines.

BRIEF DESCRIPTION OF THE DRAWINGS

FIG. 17 is a table that stipulates the operations of the bit line driver (Bitline Driver) shown in FIG. 13A;

DESCRIPTION OF THE PREFERRED EMBODIMENTS

Preferred embodiments according to the present invention are described in detail below with reference to the drawings.

Figure 1A:
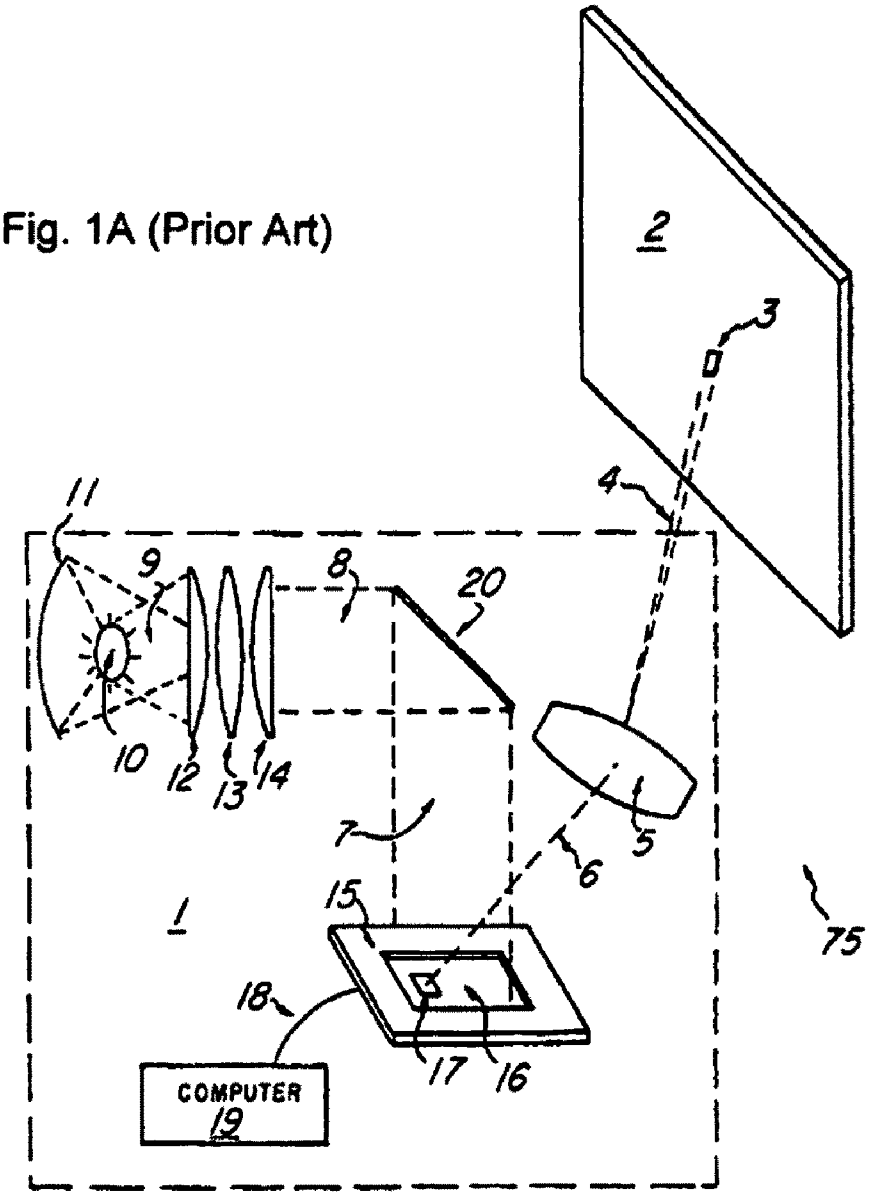
Fig. 1A (Prior Art)
FIG. 1A illustrates the basic principle of a projection display using a micromirror device, as disclosed in a prior art patent.
Figure 1B:
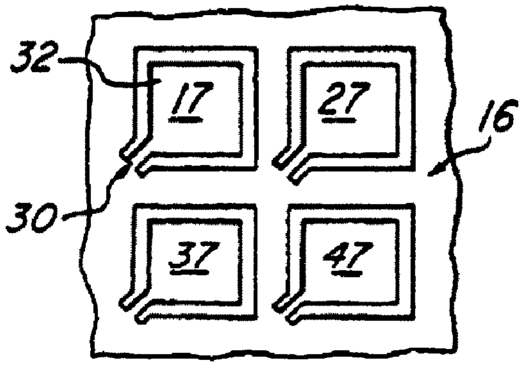
Fig. 1B (Prior Art)
FIG. 1B is a top view diagram showing the configuration of mirror elements of a portion of a micromirror array of a projection apparatus disclosed in a prior art patent.
Figure 1C:
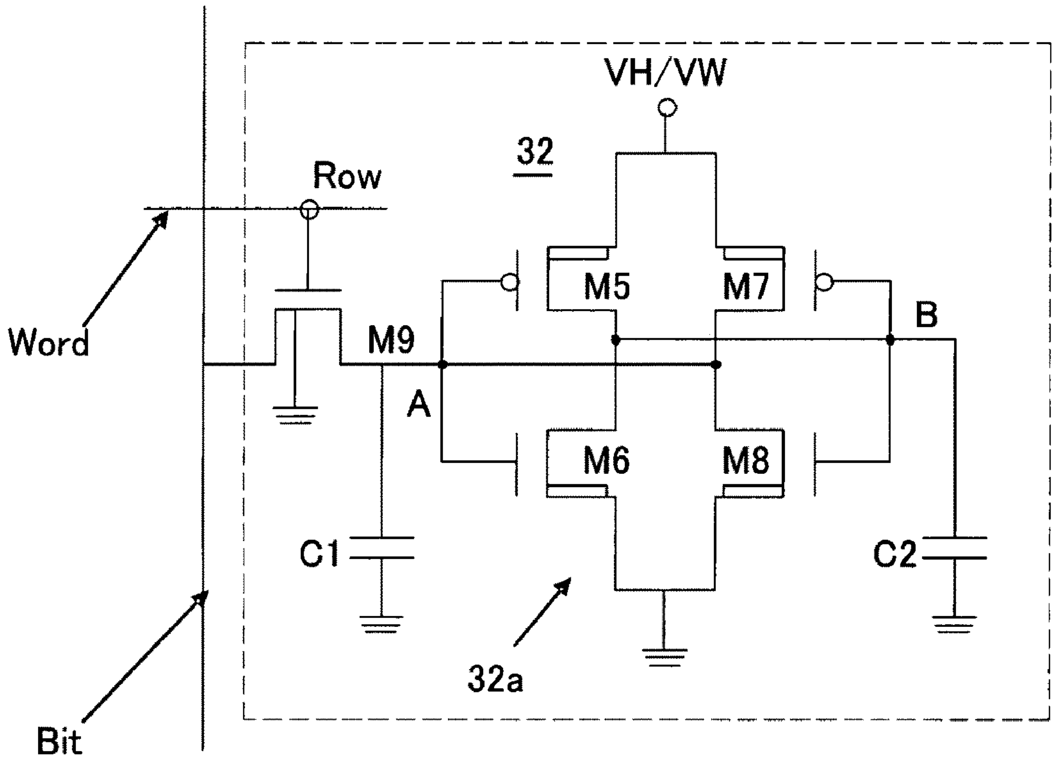
Fig. 1C (Prior Art)
FIG. 1C is a circuit diagram showing the configuration of a drive circuit of mirror elements of a projection apparatus disclosed in a prior art patent.
Figure 1D:
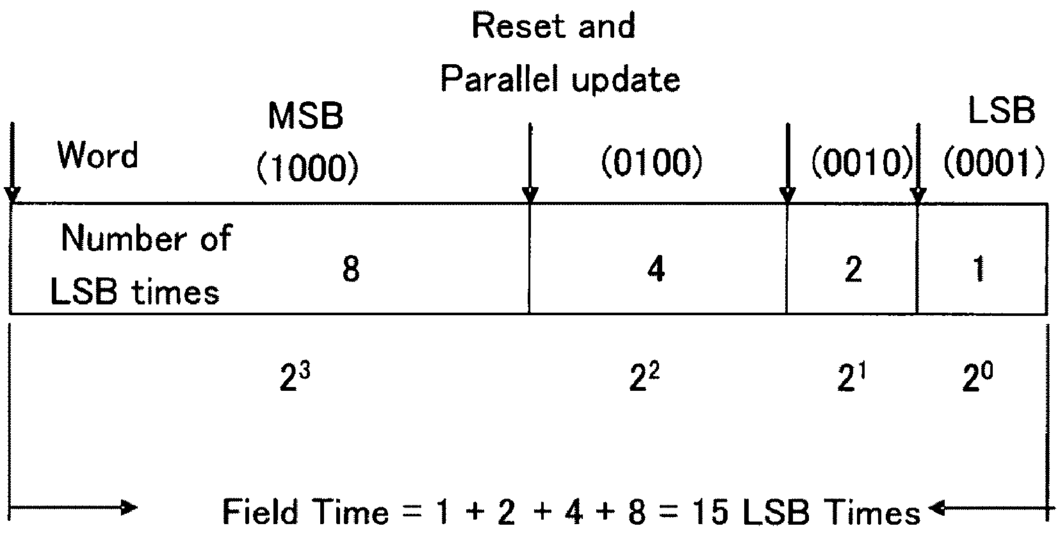
Fig. 1D (Prior Art)
FIG. 1D shows the scheme of Binary Pulse Width Modulation (Binary PWM) of conventional digital micromirrors for generating a grayscale.
Figure 2:
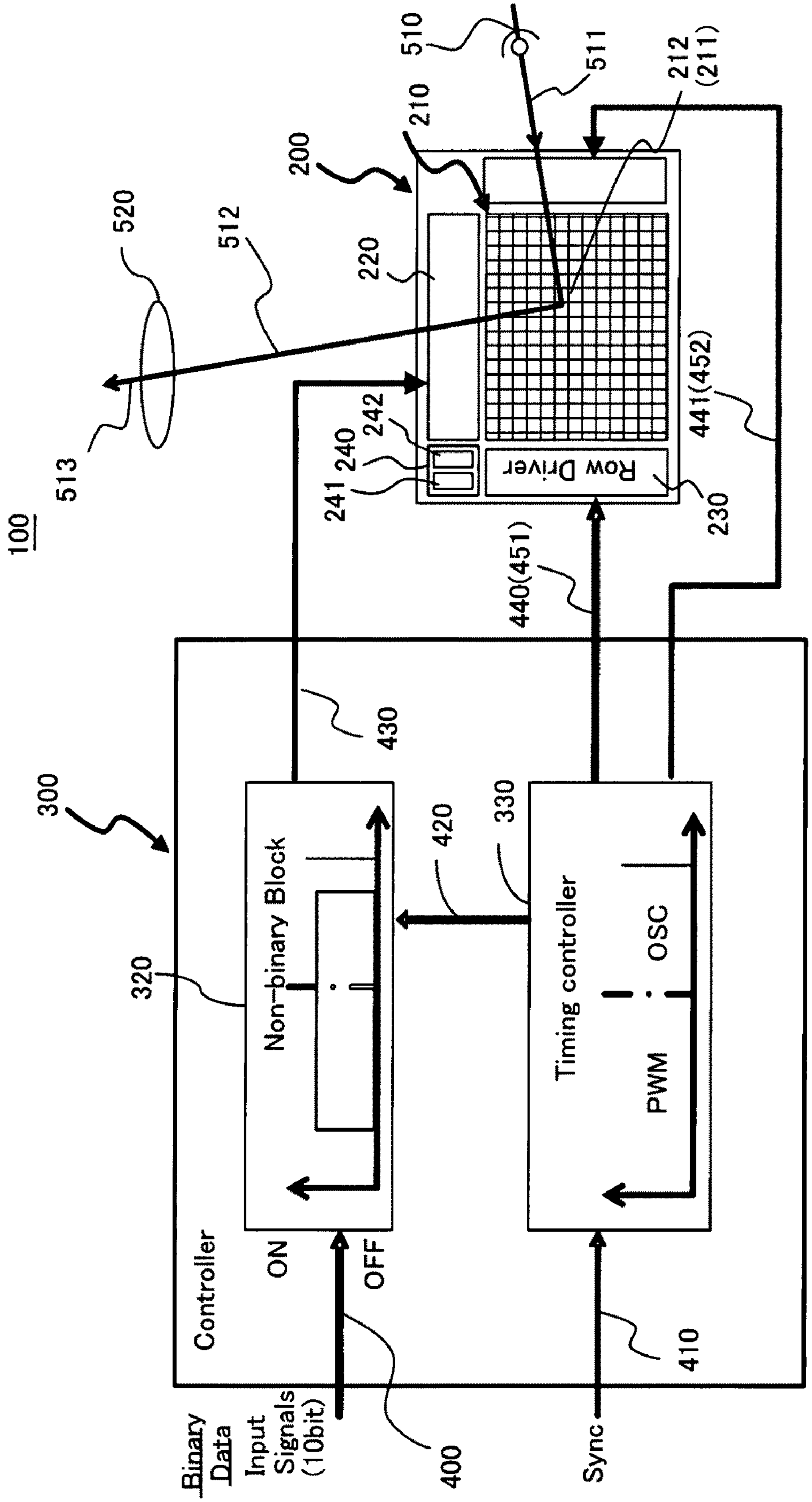
FIG. 2 is a functional block diagram showing an exemplary configuration of a display system according to a preferred embodiment of the present invention.
Figure 3:
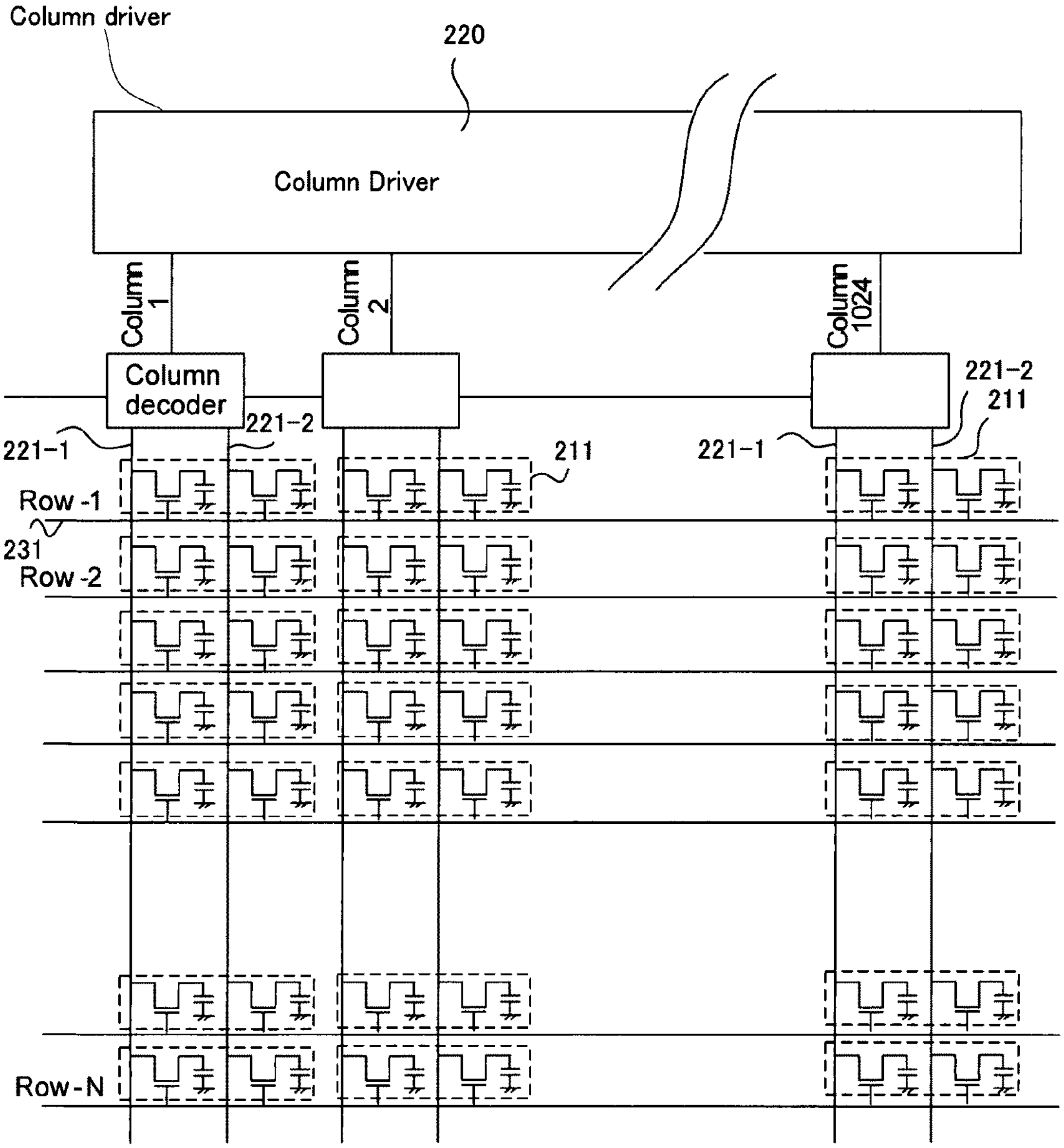
FIG. 3 is a diagram showing an exemplary configuration of a spatial light modulation element constituting a display system according to a preferred embodiment of the present invention.
Figure 4:
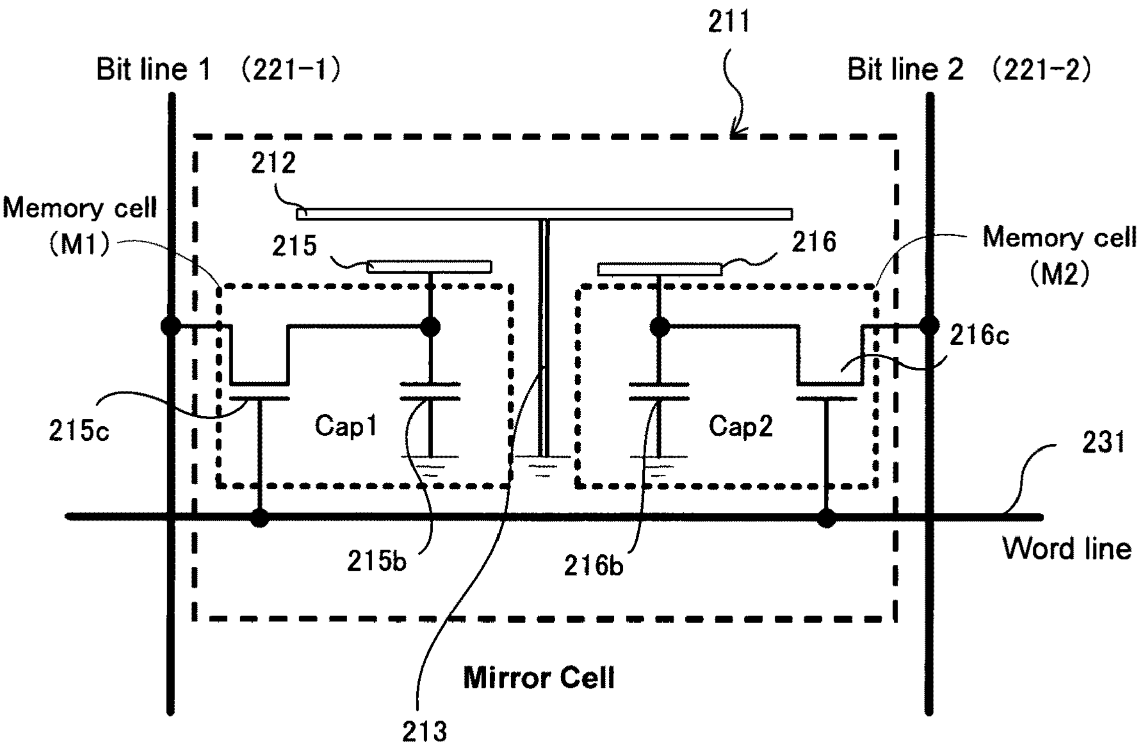
FIG. 4 is a conceptual diagram showing the configuration of an individual pixel unit constituting a spatial light modulator according to a preferred embodiment of the present invention.

FIG. 2 is a functional block diagram showing an exemplary configuration of a display system according to a preferred embodiment of the present invention. FIG. 3 is a block diagram showing an exemplary configuration of a spatial light modulation element implemented in a display system according to a preferred embodiment of the present invention. FIG. 4 is a functional circuit diagram showing an exemplary configuration of a pixel unit 211 implemented in a spatial light modulator according to the present embodiment.

An example of the basic configuration of a projection device 100 in the embodiment is initially described, and the embodiments are described thereafter.

The projection apparatus 100 according to the present embodiment comprises a spatial light modulator 200, a control apparatus 300, a light source 510 and a projection optical system 520.

Figure 5:
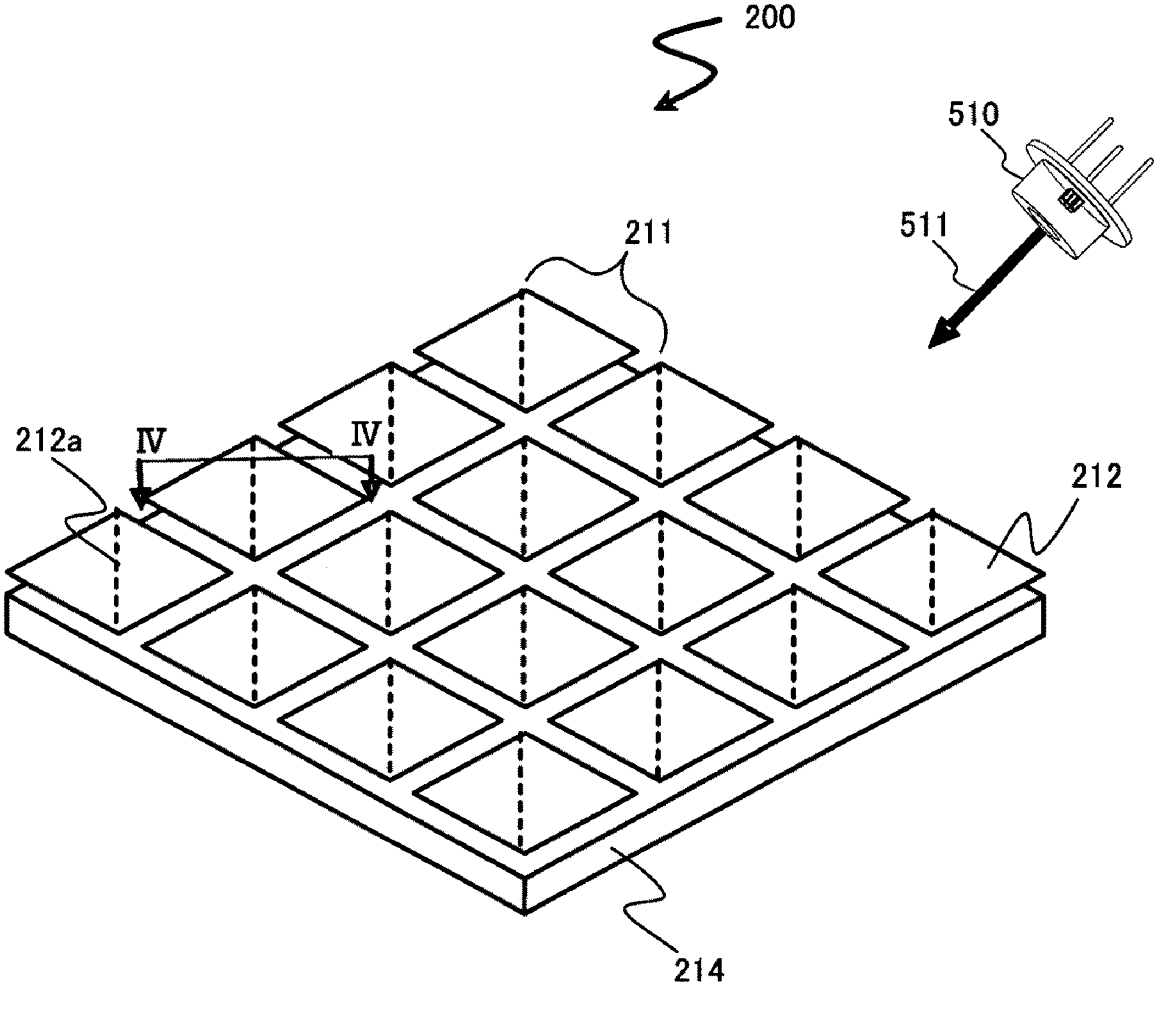
FIG. 5 is a top view for showing a diagonal perspective view of a mirror device comprised of, in two dimensions on a device substrate, a plurality of mirror elements, each controlling the reflecting direction of an incident light by the deflection a mirror

FIG. 5 is a top view diagram showing a diagonal perspective of a spatial light modulator wherein multiple mirror elements (i.e., pixel units), which control the reflecting direction of incident light by the deflection of the mirrors, are arrayed in two dimensions on a device substrate.

As shown in FIG. 5, the spatial light modulator 200 is configured by arraying pixel units 211, each of which comprises an address electrode (not shown in the drawing), an elastic hinge (not shown in the drawing), and a square mirror 212 supported by the elastic hinge, in a two-dimensional array on a substrate 214.

The mirror 212 of one pixel unit 211 is controlled by applying a voltage to an address electrode placed on the substrate 214.

Meanwhile, the pitch (i.e., the interval) between adjacent mirrors 212 is preferably set anywhere between 4 μm and 14 μm, or more preferably between 5 μm and 10 μm, in consideration of the number of pixels ranging from a super high definition television (i.e., a full HD TV) (e.g., 2048 by 4096 pixels) to a non-full HD TV, and of the sizes of mirror devices. Specifically, the pitch is defined as the distance between the deflection axes of adjacent mirrors 212.

Specifically, the area size of a mirror 212 may be anywhere between 16 square micrometers ($\mu m^2$) and 196 $\mu m^2$, more preferably anywhere between 25 $\mu m^2$ and 100 $\mu m^2$. More specifically, the shape of the mirror 212 and the pitch between the adjacent mirrors is arbitrary.

In FIG. 5, the dotted line shows the deflection axis 212*a* for deflecting the mirror 212. An incident light 511 emitted from a coherent light source 510 is incident along a perpendicular or diagonal direction relative to the deflection axis 212*a* of the mirror 212. The light source 510 may be implemented with a laser light source to emit a coherent light.

The following provides a description of the comprisal and operation of one pixel unit 211 with reference to the cross-sectional diagram thereof on the line II-II of the spatial light modulator 200 shown in FIG. 5.

FIG. 4 is an outline diagram of a cross-section, viewed as indicated by the line II-II in FIG. 5, of one mirror element of the spatial light modulator.

As shown in FIGS. 2 and 3, the spatial light modulator 200 in this embodiment includes a pixel array 210, a bit line driver unit 220, and a word line driver unit 230.

In the pixel array 210, pixel units 211 are positioned in a grid where individual bit lines 221 extending vertically from the bit line driver unit 220 cross individual word lines 231 extending horizontally from the word line driver unit 230.

As shown in FIG. 4, each pixel unit 211 comprises a mirror 212 which tilts freely while supported on the substrate 214 by a hinge 213.

An OFF electrode 215 (and an OFF stopper 215*a*) and the ON electrode 216 (and an ON stopper 216*a*) are positioned symmetrically across the hinge 213 that comprises a hinge electrode 213*a* on the substrate 214.

When a predetermined voltage is applied to the OFF electrode 215, it attracts the mirror 212 with a Coulomb force and tilts the mirror 212 so that it abuts the OFF stopper 215*a*. This causes the incident light 511 to be reflected to the light path of an OFF position, which is not aligned with the optical axis of the projection optical system 130.

When a predetermined voltage is applied to the ON electrode 216, it attracts the mirror 212 with a Coulomb force and tilts the mirror 212 so that it abuts the ON stopper 216*a*. This causes the incident light 311 to be reflected to the light path of an ON position, which is aligned with the optical axis of the projection optical system 130.

An OFF capacitor 215*b* is connected to the OFF electrode 215 and to the bit line 221-1 by way of a gate transistor 215*c* that is constituted by a field effect transistor (FET) and the like.

Further, an ON capacitor 216*b* is connected to the ON electrode 216, and to the bit line 221-2 by way of a gate transistor 216*c*, which is constituted by a field effect transistor (FET) and the like. The opening and closing of the gate transistor 215*c* and gate transistor 216*c* are controlled with the word line 231.

Specifically, one horizontal row of pixel units 211 that are lined up with an arbitrary word line 231 are simultaneously selected, and the charging and discharging of capacitance to and from the OFF capacitor 215*b* and ON capacitor 216*b* are controlled by way of the bit lines 221-1 and 221-2, and thereby the individual ON/OFF controls of the micromirrors 212 of the respective pixel units 211 of one horizontal row are carried out.

In other words, the OFF capacitor 215*b* and gate transistor 215*c* on the side of the OFF electrode 215 constitute a memory cell M1 that is a so called DRAM structure.

Likewise, the ON capacitor 216*b* and gate transistor 216*c* on the side of the ON electrode 216 constitute a DRAM-structured memory cell M2.

With this configuration, the tilting operation of the mirror 212 is controlled in accordance with the presence and absence of writing data to the respective memory cells of the OFF electrode 215 and ON electrode 216.

As shown in FIG. 2, the light source 510 illuminates the spatial light modulator 200 with the incident light 511, which is reflected by the individual micromirrors 212 as a reflection light 512. The reflection light 512 then passes through a projection optical system 520 and is projected, as projection light 513.

A control apparatus 300, according to the present embodiment, controlling the spatial light modulator 200 uses the ON/OFF states (i.e., an ON/OFF modulation) and oscillating state (i.e., an oscillation modulation) of the mirror 212, thereby attaining an intermediate gray scale.

A non-binary block 320 generates non-binary data 430 used for controlling the mirror 212 by converting an externally inputted binary video signal 400 into non-binary data. In this event, one LSB is different between the period of ON/OFF states of the mirror 212 and the period of intermediate oscillating state.

A timing control unit 330 generates, on the basis of an input synchronous signal 410 (Sync), a drive timing 420 for the non-binary block 320, a PWM drive timing 440, and an OSC drive timing 441 for the mirror 212.

Figure 6:
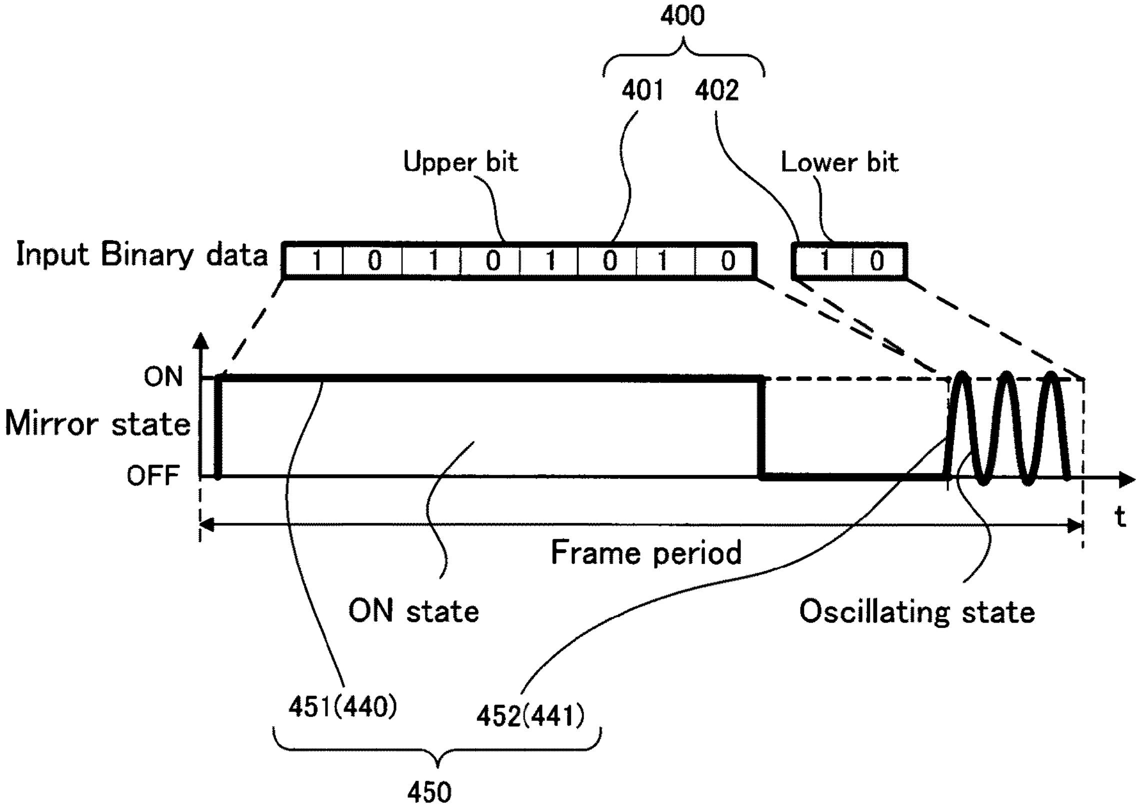
FIG. 6 is a timing diagram showing an exemplary mirror control profile used in a display system according to a preferred embodiment of the present invention.

As shown in FIG. 6, the present embodiment is configured such that a desired number of bits of the upper bits 401 of the binary video image signal 400 is assigned to the ON/OFF control for the mirror and the remaining lower number of bits 402 is assigned to the oscillation control.

Then, the control is such that the ON/OFF (positioning) state is controlled by the PWM drive timing 440 from the timing control unit 330 and the non-binary data 430, while the oscillation state is controlled by the PWM drive timing 440 and OSC drive timing 441 from the timing control unit 330 and the non-binary data 430.

Next, the fundamental control for each mirror 212 of the spatial light modulator in this embodiment is described.

More specifically, "Va (1, 0)" indicates an application of a predetermined voltage Va to the OFF electrode 215 and no application of voltage to the ON electrode 216 in the following description.

Similarly, "Va (0, 1)" indicates no application of voltage to the OFF electrode 215 and an application of a voltage Va to the ON electrode 216.

"Va (0, 0)" indicates no application of voltage to either the OFF electrode 215 or ON electrode 216.

"Va (1, 1) indicates the application of a voltage Va to both the OFF electrode 215 and ON electrode 216.

Figure 7A:
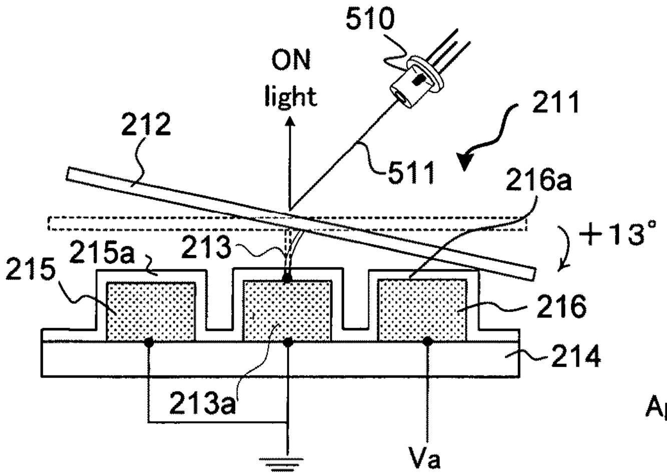
FIG. 7A is a cross-sectional diagram showing the ON state of a micromirror.
Figure 7B:
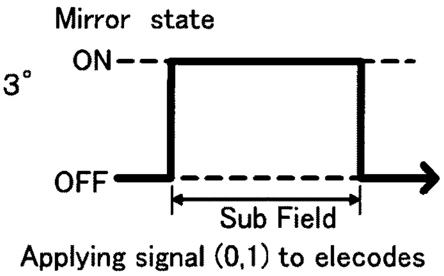
FIG. 7B is a timing diagram showing the intensity of light projected in the ON state of a micromirror.

FIGS. 7A, 7B, 7C, 7D, 7E and 7F show the configuration of the pixel unit 211 comprising the mirror 212, hinge 213, OFF electrode 215 and ON electrode 216, and a basic example wherein the mirror 212 is controlled under an ON/OFF state and under an oscillating state FIG. 7A shows the mirror 212 tilted from the neutral state to the ON state by being attracted to the ON electrode 216 as a result of applying a predetermined voltage (i.e., Va (0, 1)) to only the ON electrode 216. In the ON state of the mirror 212, the reflection light 512, by way of the mirror 212, is captured by the projection optical system 520 and projected as a projection light 513. FIG. 7B shows the intensity of light projected in the ON state.

Figure 7C:
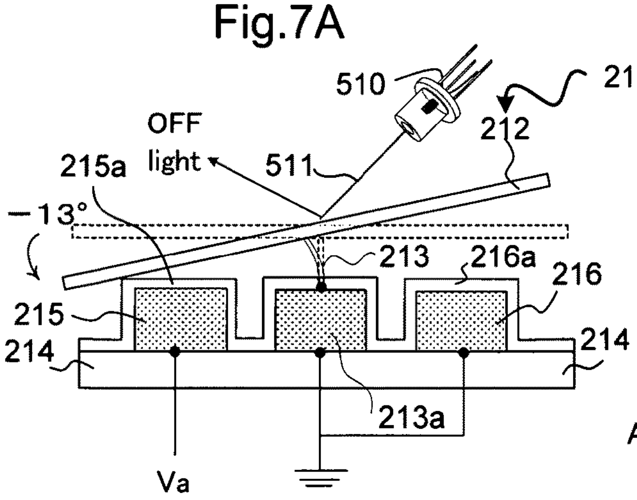
FIG. 7C is a cross-sectional diagram showing the OFF state of a micromirror.
Figure 7D:
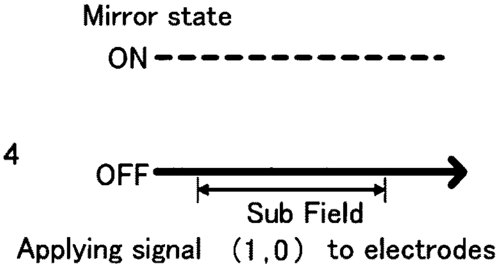
FIG. 7D is a timing diagram showing the intensity of light projected in the OFF state of a micromirror.

FIG. 7C shows the mirror 212 tilted from the neutral state to the OFF state by being attracted to the OFF electrode 215 as a result of applying a predetermined voltage (i.e., Va (1, 0)) to only the OFF electrode 215. In the OFF state of the mirror 212, the reflection light 512 is deflected from the projection optical system 520, and therefore does not constitute a projection light 513. The far right side of FIG. 7B shows the intensity of light projected in the OFF state. FIG. 7D shows the intensity of light projected in the OFF state.

Figure 7E:
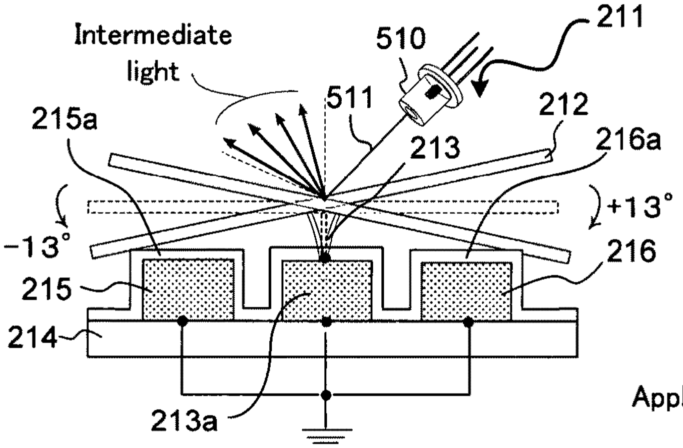
FIG. 7E is a cross-sectional diagram showing the oscillating state of a micromirror.

FIG. 7E exemplifies a case of the mirror 212 performing a free oscillation in the maximum amplitude of A0 between a tilted position (i.e., a Full ON) in contact with the ON electrode 216 and another tilted position (i.e., a Full OFF) in contact with the OFF electrode 215 (at Va (0, 0)).

Figure 7F:
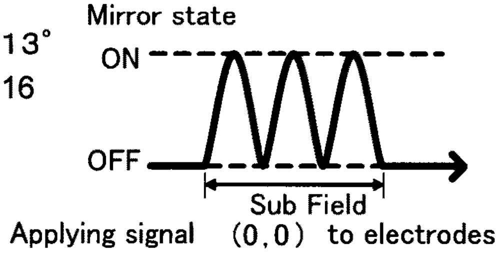
FIG. 7F is a timing diagram showing the intensity of light projected in the oscillating state of a micromirror.

An incident light 511 is illuminated on the mirror 212 at a prescribed angle, and the intensity of light resulting from the incident light 511 reflecting in the ON direction and a portion of the light (i.e. the intensity of light of the reflection light 512) reflecting in a direction that is between the ON direction and OFF direction are incident to the projection optical system 520 so as to be projected as projection light 513. FIG. 7F shows the intensity of light projected in an oscillating state.

Specifically, in the ON state of the mirror 212 shown in FIG. 7A, the flux of light of the reflected reflection light 512 is directed in the ON direction so as to be captured almost entirely by the projection optical system 520 and projected as the projection light 513.

In the OFF state of the mirror 212 shown in FIG. 7C, the reflection light 512 is directed in an OFF direction away from the projection optical system 520, and thus a light projected as a projection light 513 does not exist.

In the oscillating state of the micromirror 212 shown in FIG. 7E, a portion of the light flux of the reflection light 512, diffraction light, diffusion light and the like are captured by the projection optical system 520 and projected as a projection light 513.

More specifically, the examples shown in FIGS. 7A, 7B, 7C, 7D, 7E and 7F described above have been described for a case of applying the voltage Va represented by a binary value of "0" or "1" to each of the OFF electrode 215 and ON electrode 216. Alternatively, a more minute control of the tilting angle of the mirror 212 is available by increasing the steps of the magnitude of Coulomb force generated between the mirror 212 and the OFF electrode 215 or ON electrode 216 by increasing the steps of the voltage values Va to multiple values.

Furthermore, the examples shown in FIGS. 7A, 7B, 7C, 7D, 7E and 7F described above have been described for a case of setting the mirror 212 (i.e., the hinge electrode 213*a*) at the ground potential. Alternatively, a more minute control of the tilting angle of the mirror 212 may also be achieved by applying an offset voltage thereto.

A method for displaying a video image by using the projection device 100 in this embodiment is described below.

When a binary video image signal 400 and a synchronization signal 410 are inputted into the control device 300, the non-binary data 430, the PWM driving timing 440 and the OSC driving timing 441 are generated.

The non-binary block 320 and timing control unit 330 calculate, for each mirror of the SLM constituting a pixel of the video image of a frame, the period of time for controlling each mirror 212 under an ON state and under an oscillating state or the number of oscillations within one frame of a video image, in accordance with the binary video signal 400 and the drive timing 420 generated by the timing control unit 330 from the synchronous signal 410. The non-binary block 320 and timing control unit 330 also generate non-binary data 430, a PWM drive timing 440 and an OSC drive timing 441.

Specifically, the non-binary block 320 and timing control unit 330 that are comprised in the control apparatus 300 use the ratio of the intensity of a projection light 513 obtained by oscillating a predetermined mirror 212 in an oscillation time T to the intensity of a projection light 513 obtained by controlling the mirror 212 under an ON state during the oscillation time T, and calculate the period of time for controlling the mirror 212 under an ON state, the period of time for controlling the mirror 212 under the oscillating state or the number of oscillations during the period.

The ON/OFF control and the oscillation control for each of the mirrors 212 configuring one frame of the video image are performed by using the non-binary data 430, the PWM driving timing 440 and the OSC driving timing 441, which are based on the calculated durations or the number of times of oscillation.

Based on the above-described basic configuration, an example of the configuration of each pixel unit 211 of the pixel array 210 in the spatial light modulator 200 according to this embodiment is described with reference to FIG. 8

Figure 8:
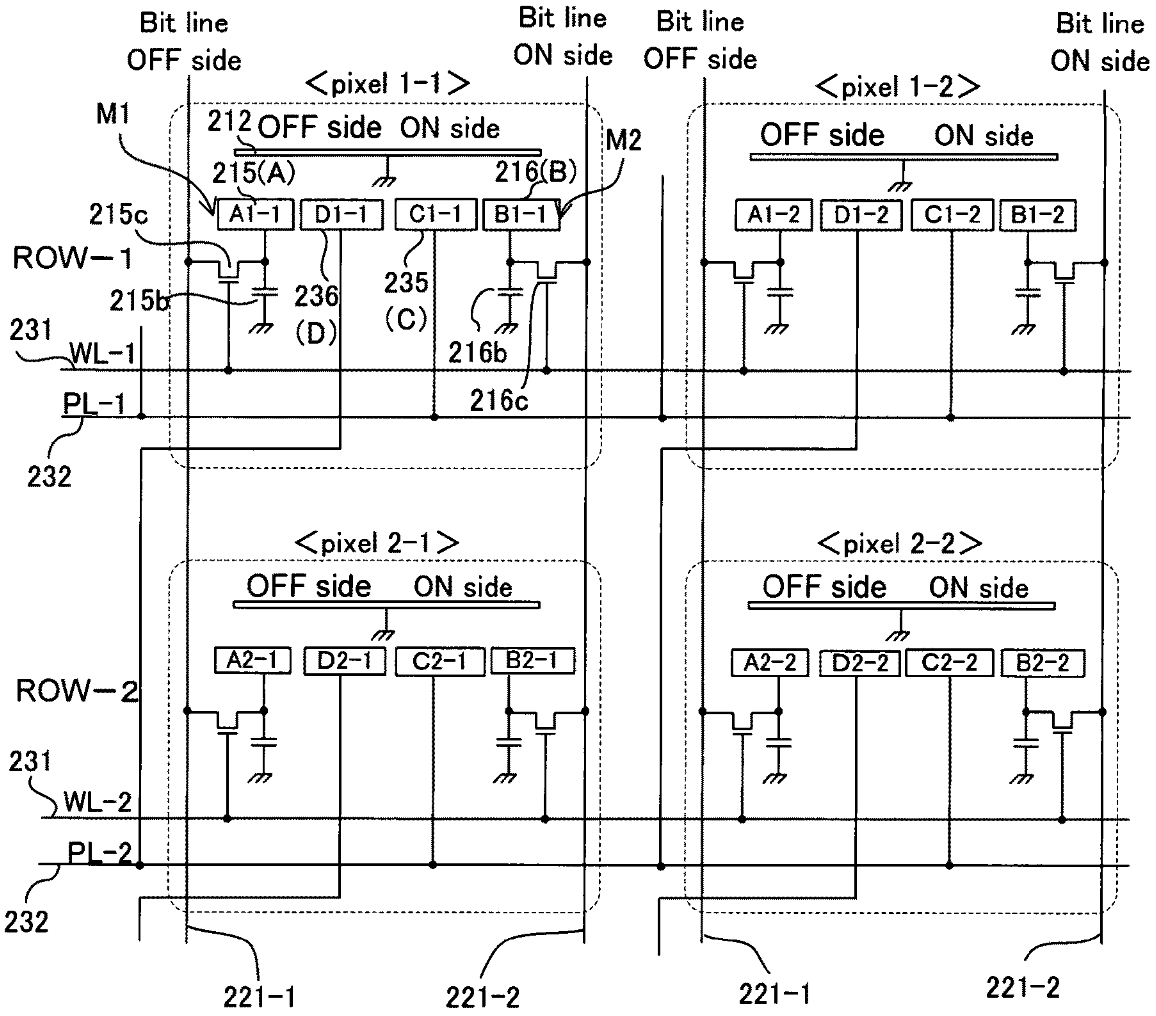
FIG. 8 is a functional circuit diagram for explaining a configuration example of a pixel unit in the display system according to the embodiment of the present invention.

The pixel unit 211 having the configuration shown in FIG. 8 is implemented by adding a second OFF electrode 236 (D) and a second ON electrode 235 (C), to the OFF and the ON sides, respectively, and by adding one plate line 232 (PL-n where "n" is the number of ROW lines) to each ROW line in the basic configuration shown in FIG. 4.

The plate line 232 (PL-2) is directly connected to the second ON electrode 235 (C2-1) in the ROW line to which the plate line 232 (PL-2) belongs, and also directly connected to the second OFF electrode 236 (D1-1) in the ROW line (ROW-1) adjacent to the ROW line (ROW-2) to which the plate line 232 (PL-2) belongs.

Unlike the above described basic configuration, in addition to the potential control performed on the ON and the OFF sides by the word line 231 and the bit line 221, the plate lines 232 can also applied to control the potential.

Accordingly, potential control by the plate lines 232 may be performed while the mirror 212 is tilting between ON and OFF. This controls the mirror 212 to freely oscillate, with its tilting amplitude smaller than the maximum amplitude between ON and OFF. As a result, using the plate lines 232, a higher gray scale, such as finer intermediate gray scale levels, can be implemented.

Additionally, the plate lines 232 are controlled independent of the word lines 231 and the bit lines 221 in the embodiment shown in FIG. 8. Therefore, the potential control can be performed irrespective of the potentials of bit lines 221.

Furthermore, the electrodes on the ON and the OFF sides can be independently controlled by the plate lines 232, whereby the ON and the OFF sides can be swapped and used depending on the placement direction of the light source. A control for the scanning direction of a plate line 232, which will be described later, can be used.

According to the conventional technique, to independently perform the potential control on the ON and the OFF side by using the plate lines 232, a total of two plate lines 232 must be added to each ROW line.

However, in this embodiment, the second OFF electrode 236 (D) and the second ON electrode 235 (C) can be independently controlled by adding as few as one plate line 232 to each ROW line, as will be described later.

As a result, the number of plate lines 232 in a spatial light modulator 200 can be reduced by the total number of ROW lines (such as 1080 lines, etc.), in comparison with the conventional technology. With a reduction in the number of plate lines 232, the space necessary for the configuration also decreases and a higher definition image with a higher gray scale can be projected using the plate lines 232.

Additionally, the space saved by reducing the plate lines 232 can be used to make the remaining plate lines 232 thicker. This increases the speed of the ON/OFF operations of the mirror by applying a higher potential to a plate line 232, and by decreasing a floating capacitance of the plate line 232, the operations can be more quickly and reliably implemented.

The configuration shown in FIG. 8 is schematically depicted to add one electrode to the ON and the OFF sides, respectively, and does not otherwise stipulate the positional relationship among the electrodes.

The second ON electrode 235 (C) and the second OFF electrode 236 (D) may be arranged on the outer side of the ON electrode 216 (B) and the OFF electrode 215 (A), respectively.

Alternately, the second ON electrode 235 (C) and the second OFF electrode 236 (D) may be arranged orthogonal to the deflection direction of the ON electrode 216 (B) and the OFF electrode 215 (A).

FIG. 8 depicts a configuration with the second ON electrode 235 (C) and the second OFF electrode 236 (D) connected to different plate lines 232.

A plate line 232 may be connected to the second OFF electrode 236 (D) in the same ROW line instead of connecting to the second ON electrode 235 (C) in the same ROW line as that shown for the plate line 232. In this case, the second ON electrode 235 (C) is connected to the plate line 232 of the adjacent ROW line.

Additionally, an electrode in a ROW line located at a different ROW from a plate line 232 and connected to the plate line 232 can also be connected to an electrode not in an adjacent ROW line. For example, the plate line 232 (PL-3, not shown) may be connected to the second OFF electrode 236 (D1-1) in the ROW line next to the adjacent line.

Furthermore, one of two adjacent plate lines 232 may be connected to an electrode in the ROW line of the other plate line 232. For example, the plate line 232 (PL-1) is connected to the second ON electrode 235 (C) in the ROW line of the plate line 232 (PL-1), and also connected to the second OFF electrode 236 (D) in the ROW line of the plate line 232 (PL-2). Moreover, the plate line 232 (PL-2) is connected to the second ON electrode 235 (C) in the ROW line of the plate line 232 (PL-2), and also connected to the second OFF electrode 236 (D) in the ROW line of the plate line (PL-1).

Figure 9A:
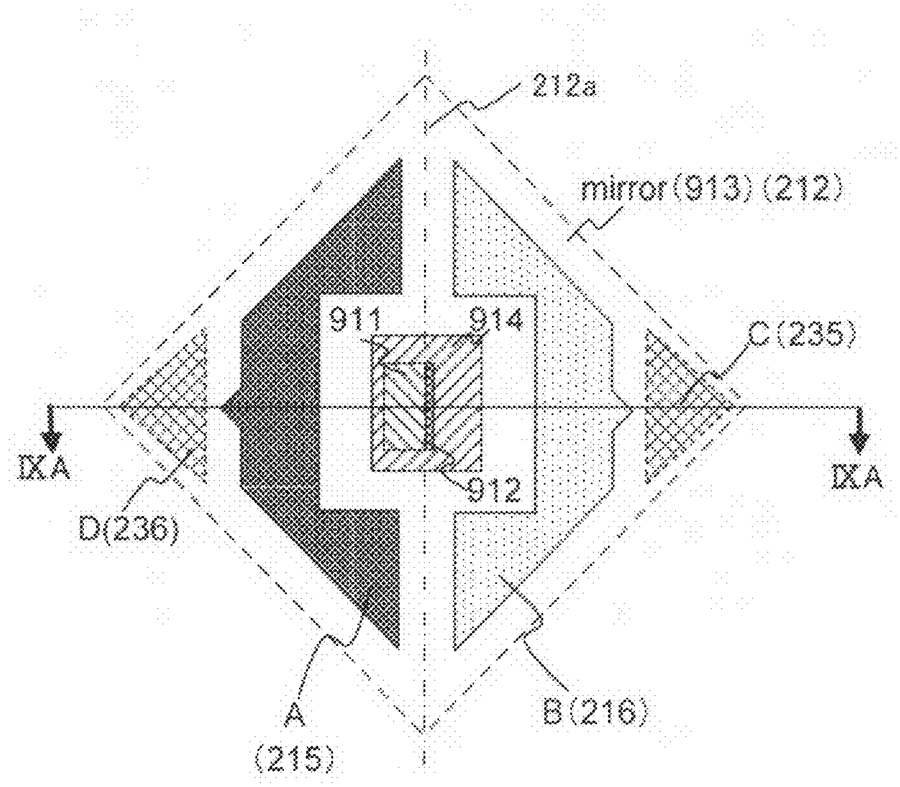
FIG. 9A is a schematic top view diagram showing an example of the layout of electrodes of the pixel unit shown in FIG. 8.
Figure 9B:
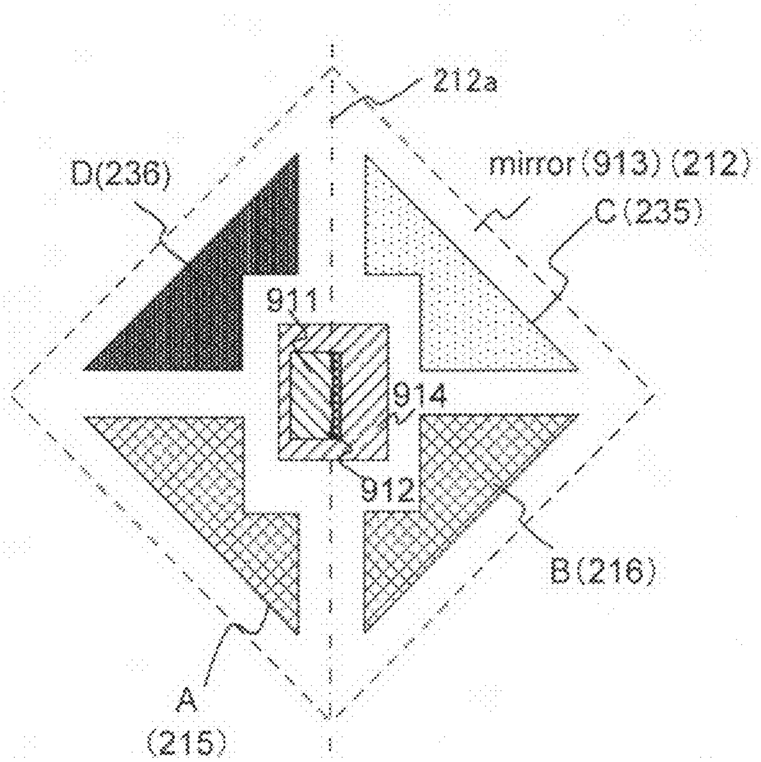
FIG. 9B is a schematic top view diagram showing another example of the layout of electrodes of the pixel unit shown in FIG. 8.
Figure 9C:
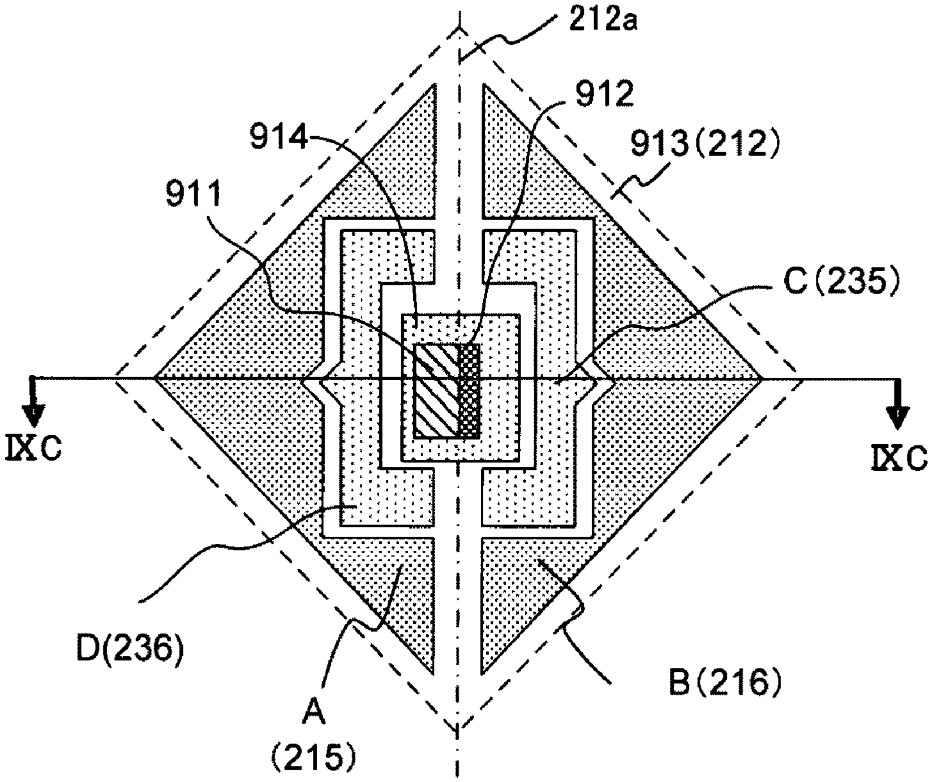
FIG. 9C is a schematic top view diagram showing a further example of the layout of electrodes of the pixel unit shown in FIG. 8.
Figure 9D:
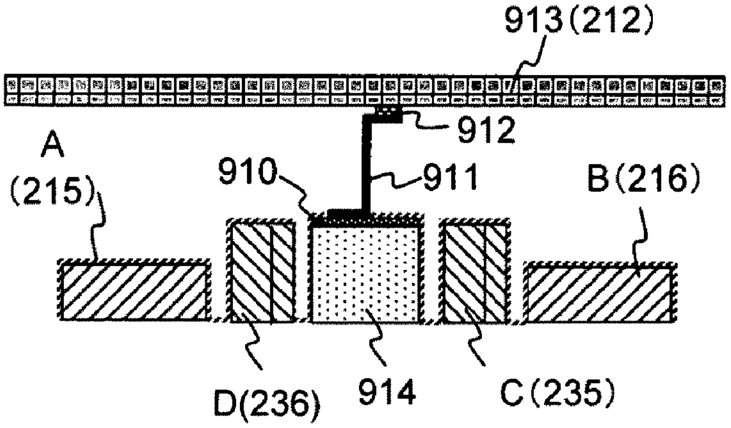
FIG. 9D is a cross sectional diagram, taken along line IXC-IXC in FIG. 9C, of the pixel unit having the layout shown in FIG. 9C

FIGS. 9A, 9B and 9C are schematic diagrams of exemplary embodiments of the layouts of the electrodes of pixel units 211 shown in FIG. 8. The common configuration of the layouts will be initially described with reference to FIG. 9D. FIG. 9D shows an example of a cross section of the pixel unit, taken along the line IXC-IXC, of the layout shown in FIG. 9C.

As shown in FIG. 9D, all of the layouts shown in FIGS. 9A, 9B and 9C are configurations wherein a hinge electrode 914 is arranged on the deflection axis 212*a*, and an elastic hinge 911 supports the mirror 212 via a metal layer 912 on the upper surface of the hinge electrode 914. Two electrodes are similarly arranged symmetrically about the hinge electrode 914. The ON electrode 216 (B) and the second ON electrode 235 (C) are arranged on one side of the hinge electrode 914, and the OFF electrode 215 (A) and the second OFF electrode 236 (D) are arranged on the other side.

FIGS. 9A, 9B and 9C show configurations obtained by varying the shapes and the sizes of the OFF electrode 215 (A), the ON electrode 216 (B), the second ON electrode 235 (C), and the second OFF electrode 236 (D).

In FIGS. 9A, 9B, and 9C, the shape of the mirror 212 is represented with a dotted line in order to represent the positional relationship among the electrodes and the mirror 212. The deflection axis 212*a* of the mirror is represented with a dashed vertical line.

In the layout of FIG. 9A, the ON electrode 216 (B) is arranged to enclose the three sides of the hinge electrode 914 on one side of the deflection axis 212*a*, and the second ON electrode 235 (C) is arranged at the corner of the mirror to the right of the ON electrode 216 (B). Similarly, the OFF electrode 215 (A) is arranged to enclose the three sides of the hinge electrode 914 on the other side of the deflection axis 212*a*, and the second OFF electrode 236 (D) is arranged at the corner of the mirror to the left of the OFF electrode 215 (A). The tips of the OFF electrode 215 (A) and the ON electrode 216 (B) are convex. These electrodes are designed so that when the mirror 212 is tilted to each side, it comes into contact with the convex protrusions of the OFF electrode 215 (A) and the ON electrode 216 (B), and the deflection angle of the mirror 212 is constant when the mirror 212 is deflected.

In the layout shown in FIG. 9A, the surface areas of the ON electrode 216 (B) and the OFF electrode 215(A) are larger than the surface areas of the second ON electrode 235 (C) and the second OFF electrode 236 (D). This layout that can generate a sufficient Coulomb force even if relatively low voltages are applied to the ON electrode 216 (B) and the OFF electrode 215 (A). In contrast, the surface areas of the second ON electrode 235 (C) and the second OFF electrode 236 (D) are small. This reduces the voltage applied to the electrodes by making the necessary Coulomb force itself relatively low, according to the principle of leverage with the arrangement of the second ON electrode 235 (C) and the second OFF electrode 236 (D) in positions away from the hinge electrode 914.

In the layout shown in FIG. 9B, the OFF electrode 215 (A), the ON electrode 216 (B), the second ON electrode 235 (C) and the second OFF electrode 236 (D) all have identical forms and are arranged around the hinge electrode 914. Since the electrodes are formed into only one shape, the manufacturing process is simplified through design simplification, improvements in manufacturing yield, and cost.

FIG. 9C shows the layout wherein the second ON electrode 235 (C) and the second OFF electrode 236 (D) are arranged on the inside, and the OFF electrode 215 (A) and the ON electrode 216 (B) are arranged on the outside. The tips of the second ON electrode 235 (C) and the second OFF electrode 236 (D) arranged on the inside are convex. These electrodes are designed so that when the mirror 212 is tilted to each side, it comes into contact with the convex protrusions of the second ON electrode 235 (C) and the second OFF electrode 236 (D), and the deflection angle of the mirror 212 is constant when the mirror 212 is deflected.

Since the OFF electrode 215 (A) and the ON electrode 216 (B), which are arranged on the outside, have larger surface areas, this layout offers an advantage in that lower voltages may be applied to the OFF electrode 215 (A) and the ON electrode 216 (B), as compared to those in the other layouts.

Figure 9E:
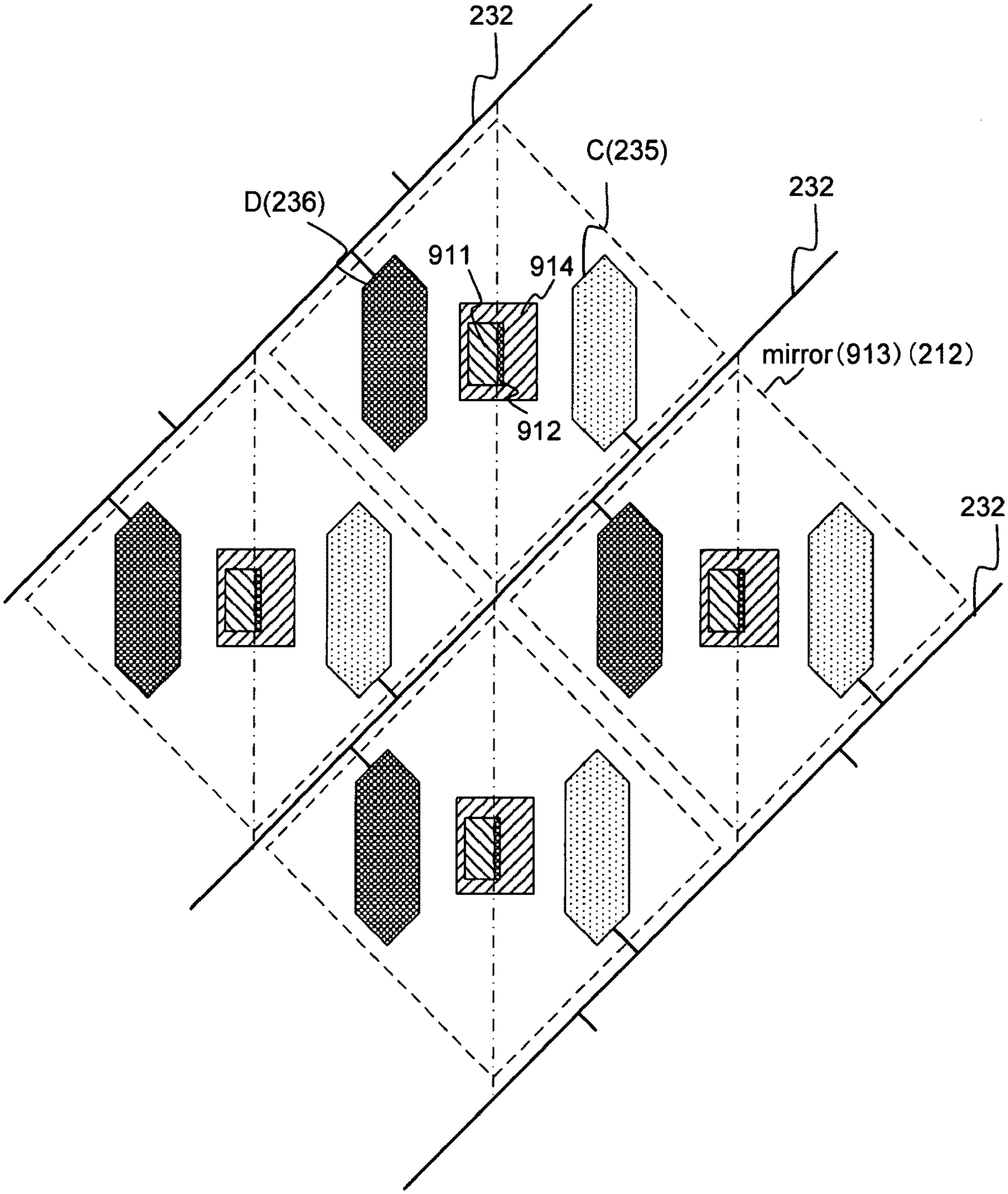
FIG. 9E is a schematic top view diagram showing a further example of the layout of electrodes of the pixel units shown in FIG. 8.
Figure 9F:
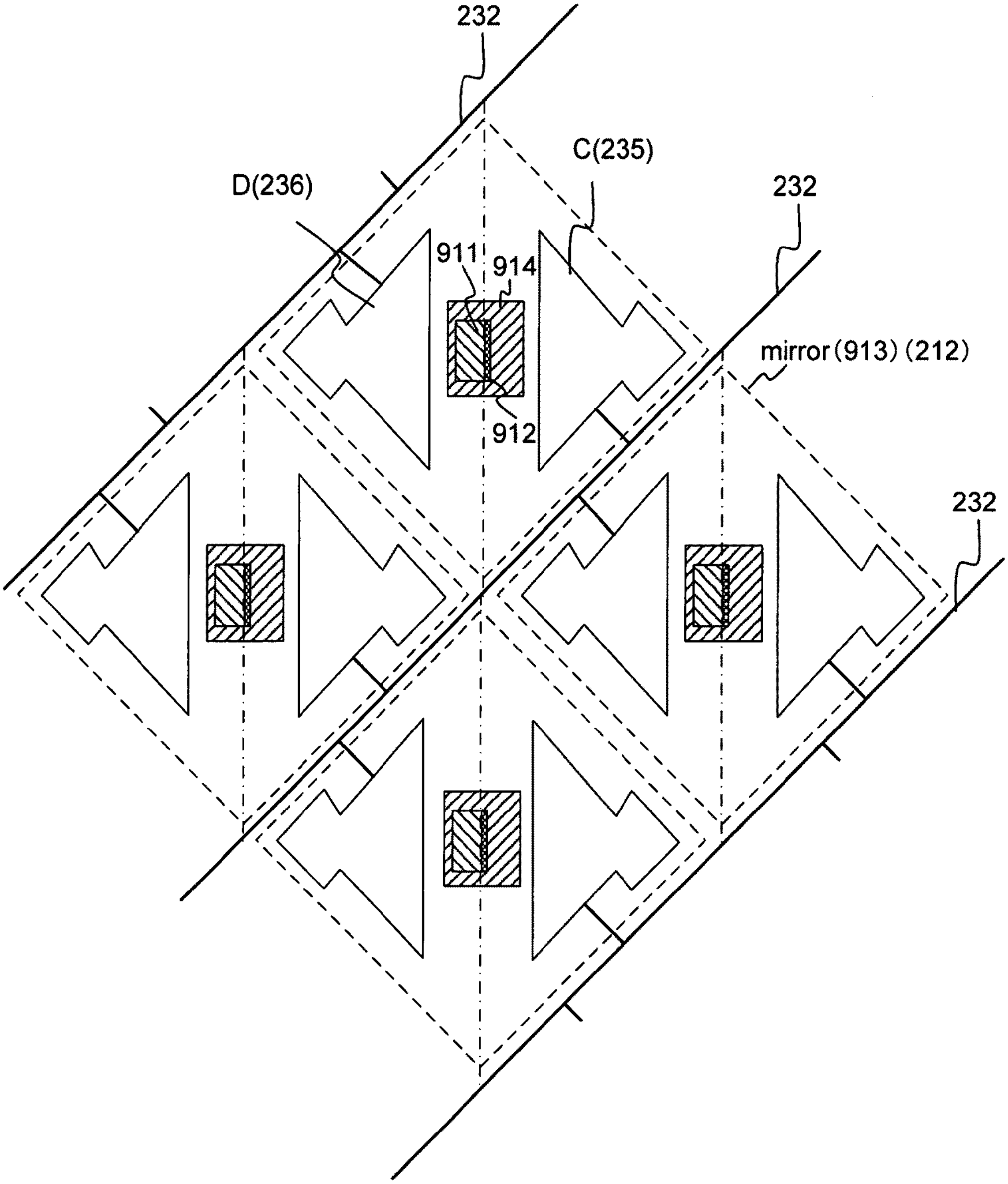
FIG. 9F is a schematic top view diagram showing a further example of the layout of electrodes of the pixel units shown in FIG. 8.

The layouts shown in FIGS. 9E and 9F are configured with only the second ON electrode 235 (C) and the second OFF electrode 236 (D).

Figure 10:
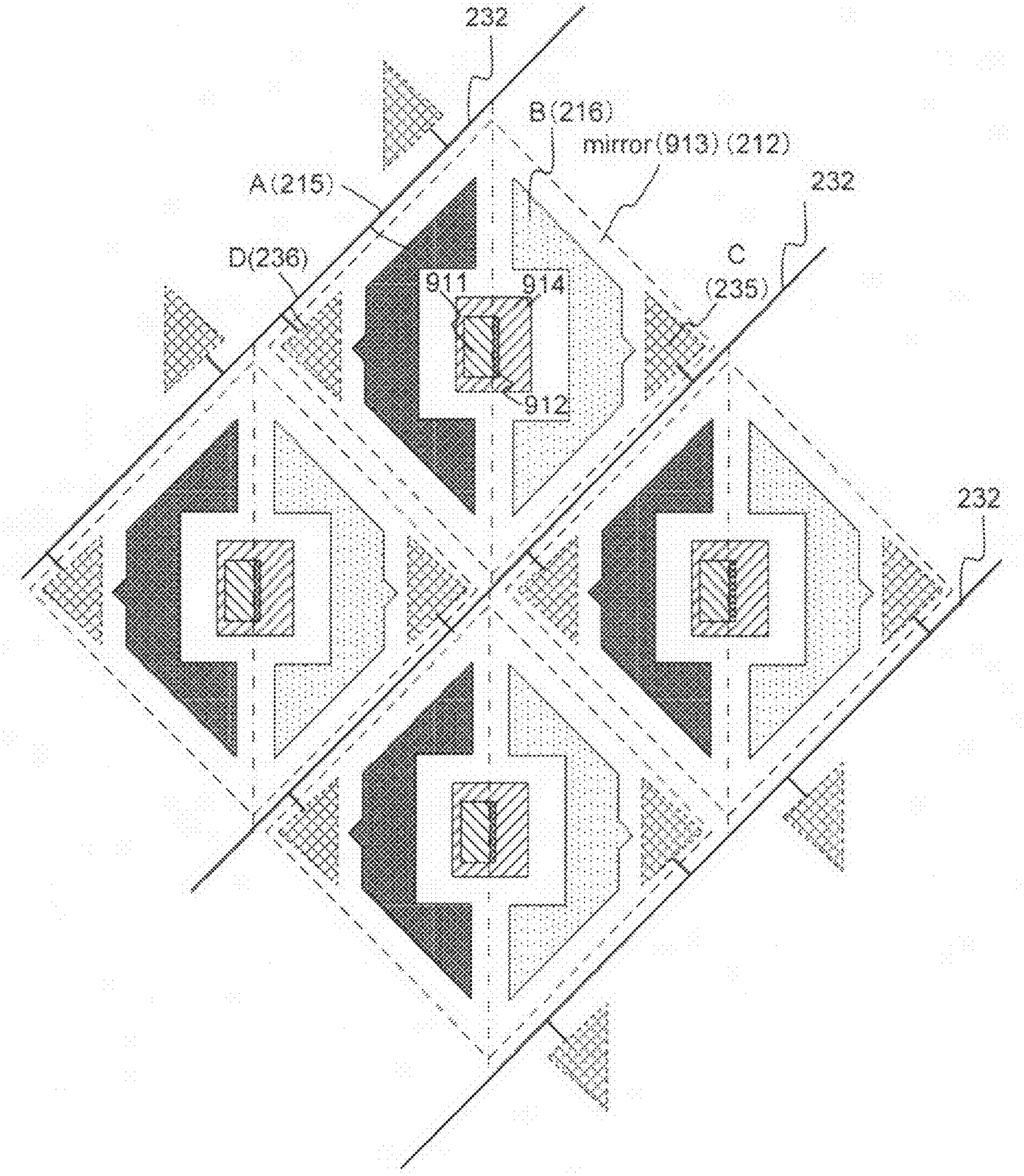
FIG. 10 is a top view diagram showing an example of the connections of the pixel units and plate lines, which are shown in FIG. 8.

FIG. 10 is a simplified diagram showing an example of the connections between the pixel units 211 and the plate lines 232, which are shown in FIG. 8. The layout shown in FIG. 10 is described with reference to the electrode layout shown in FIG. 9A. However, the layout of the electrodes is not limited to this particular layout.

As shown in FIG. 10, each of the plate lines 232 is connected to the electrodes of ROW lines on both sides of the plate line 232. The plate line 232 is connected to the second OFF electrode 236 (D) in the ROW line on one side of the plate line 232 and to the second ON electrode 235 (C) in the ROW line on the other side of the plate line 232. Specifically, one plate line 232 is simultaneously connected to the electrodes in two ROW lines. This means that two different ROW lines share one plate line 232.

Figure 11A:
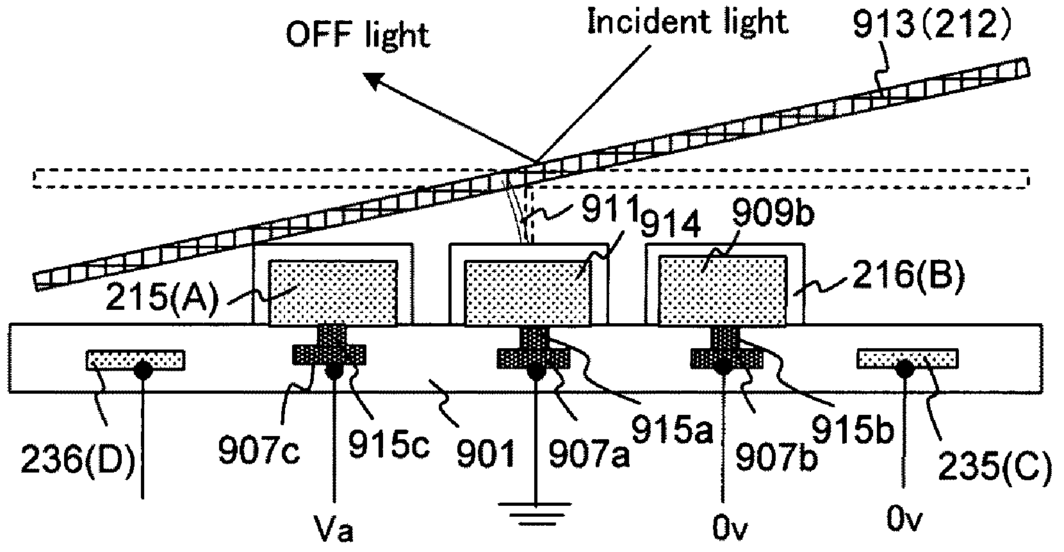
FIG. 11A is a cross-sectional view showing an example of the OFF state of the pixel unit having the layout shown in FIG. 9A.
Figure 11B:
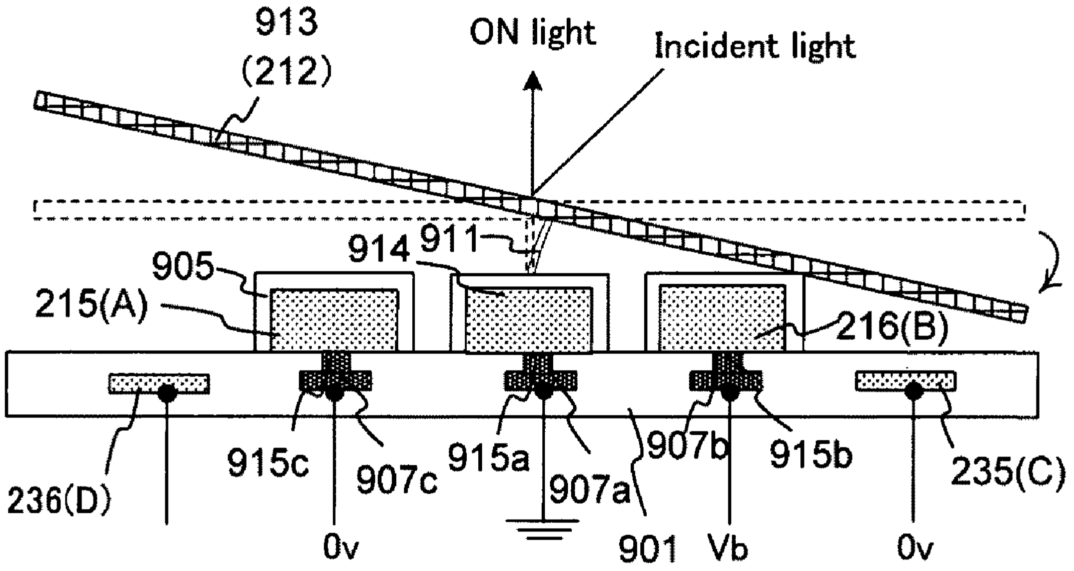
FIG. 11B is a cross-sectional view showing an example of the ON state of the pixel unit having the layout shown in FIG. 9A.
Figure 11C:
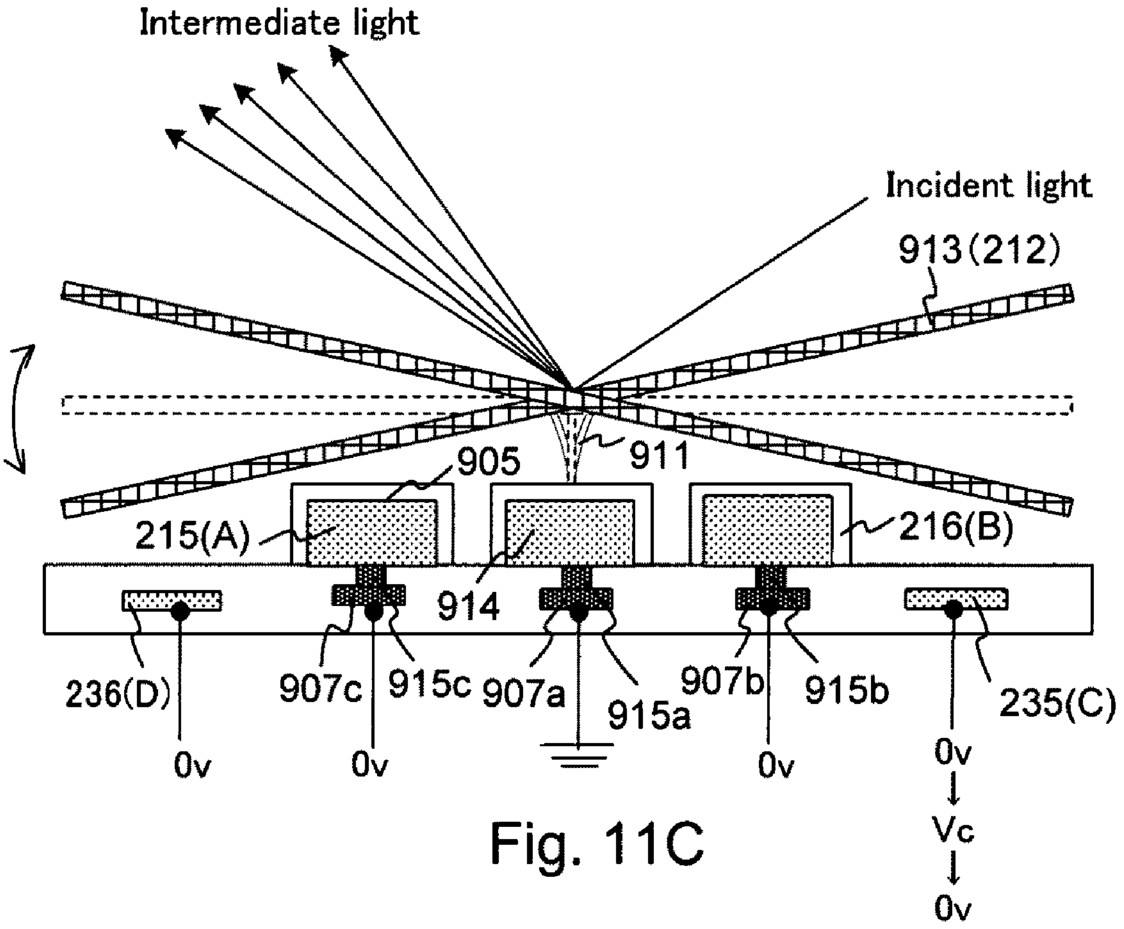
FIG. 11C is a cross-sectional view showing an example of the intermediate oscillation state of the pixel unit having the layout shown in FIG. 9A.

FIGS. 11A, 11B and 11C are cross-sectional views of the pixel unit 211 taken along the line IXA-IXA in the layout shown in FIG. 9A. In this layout, the hinge electrode 914, the ON electrode 216 (B) and the OFF electrode 215 (A) are arranged on the surface of a substrate 901, whereas the second ON electrode 235 (C) and the second OFF electrode 236(D) are buried in the substrate 901.

FIGS. 12A, 12B, 12C and 12D are functional circuit diagrams which correspond to the states shown in FIGS. 11A, 11B and 11C, respectively, in which voltages are applied to the bit lines 221, the word line 231, the plate lines 232 and the electrodes.

An example of the operations of the pixel unit 211 having the configuration shown in FIG. 8 is described below with reference to FIGS. 11A, 11B, 11C, 12A, 12B, 12C and 12D.

The following is a description of the operations for changing the mirror 212 to the OFF state, which is shown in FIG. 11A.

Figure 12A:
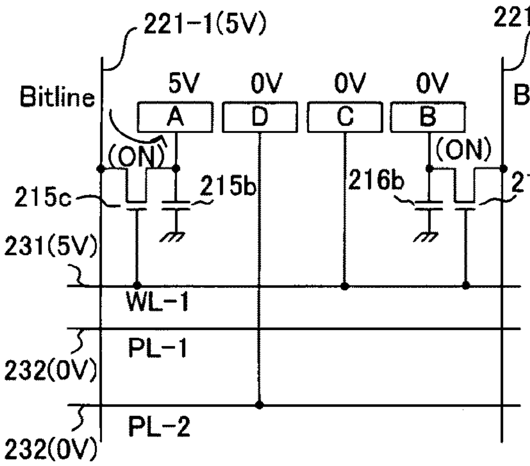
FIG. 12A is a functional circuit diagram for explaining the action of the pixel unit shown in FIG. 8.

As shown in FIG. 12A, an H level (5V) is applied to the word line 231 while an H level (5V) and an L level (0V) are applied to the bit lines 221-1 and 221-2, respectively. As a result, gate transistors 215*c* and 216*c* are turned on, and the potentials of the OFF electrode 215(A) and the ON electrode 216 (B) become identical to the bit lines 221-1 and 221-2, respectively. Specifically, 5V and 0V are respectively applied to the OFF electrode 215(A) and the ON electrode 216 (B).

Since the plate lines 232 (PL-1, PL-2) remain at 0V, both the second ON electrode 235(C) and the second OFF electrode 236(D) are driven to 0V. As a result, a Coulomb force is generated only between the OFF electrode 215(A), to which 5V is applied, and the mirror 212. The mirror 212 is tilted by being drawn by the OFF electrode 215(A) and changes to the OFF state, as shown in FIG. 11A.

The following is a description of the operations for changing the mirror 212 to the ON state, which is shown in FIG. 11B.

Figure 12B:
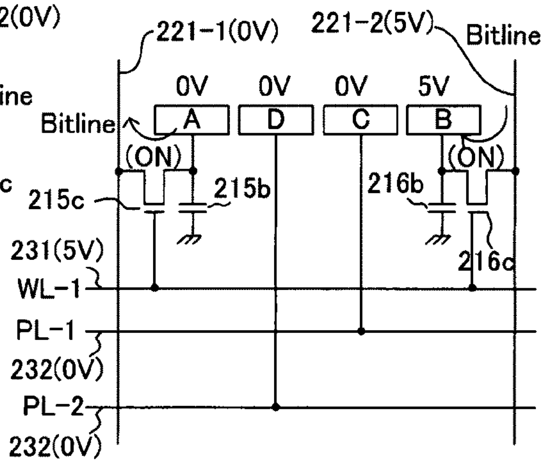
FIG. 12B is a functional circuit diagram for explaining the action of the pixel unit shown in FIG. 8.

As shown in FIG. 12B, the H level (5V) is applied to the word line 231 while the L level (0V) and the H level (5V) are applied to the bit lines 221-1 and 221-2, respectively. As a result, the gate transistors 215*c* and 216*c* are turned on, and the potentials of the OFF electrode 215 (A) and the ON electrode 216 (B) become identical to the bit lines 221-1 and 221-2, respectively. Specifically, 0V and 5V are respectively applied to the OFF electrode 215(A) and the ON electrode 216 (B). Since the plate lines 232 (PL-1, PL-2) remain at 0V, both the second ON electrode 235(C) and the second OFF electrode 236(D) are driven to 0V. As a result, a Coulomb force is generated only between the ON electrode 216(B), to which 5V is applied, and the mirror 212. The mirror 212 is tilted by being drawn by the ON electrode 216(B) and changes to the ON state, as shown in FIG. 11B.

The following is a description of the operations for changing the mirror 212 to the intermediate oscillation state, which is shown FIG. 11C.

Figure 12C:
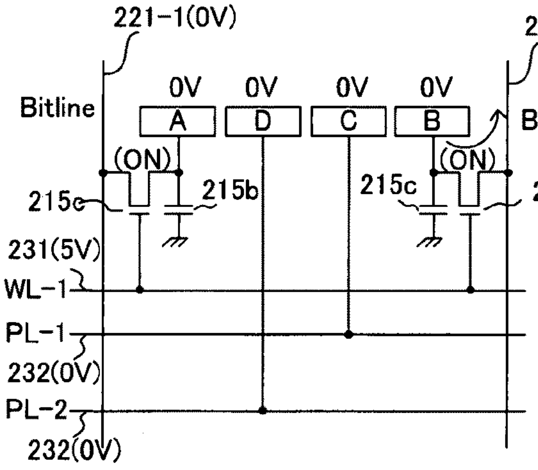
FIG. 12C is a functional circuit diagram for explaining the action of the pixel unit shown in FIG. 8.

To cause the mirror 212 to make an intermediate oscillation, the H level (5V) is applied to the word line 231 while the L level (0V) is applied to both the bit lines 221-1 and 221-2, as shown in FIG. 12C. As a result, the gate transistors 215*c* and 216*c* are turned on, and the potentials of the OFF electrode 215 (A) and the ON electrode 216 (B) become identical to the bit lines 221-1 and 221-2, respectively. Specifically, 0V is applied to both of the electrodes. Additionally, since the plate lines 232 (PL-1, PL-2) remain at 0V, both the second ON electrode 235(C) and the second OFF electrode 236(D) are driven to 0V. As a result, no voltages are applied to the electrodes, and the mirror 212 tilts away from the ON electrode 216 by the restoring force of the elastic hinge 911 and starts to freely oscillate towards the OFF side.

Figure 12D:
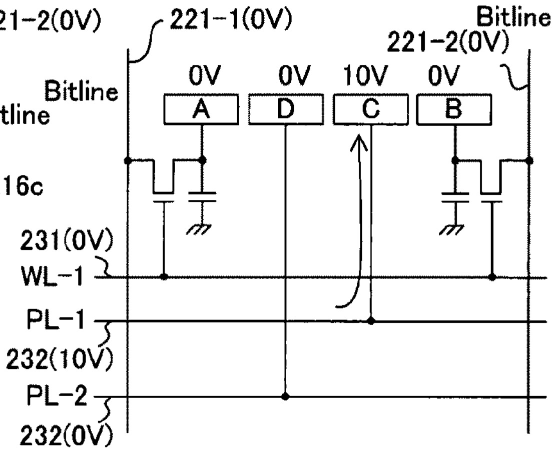
FIG. 12D is a functional circuit diagram for explaining the action of the pixel unit shown in FIG. 8.

While the mirror 211 is tilting towards the OFF side with the free oscillation, the H level (10V) is applied to the plate line 232 (PL-1), as shown in FIG. 12D. At this time, the bit lines 221-1 and 221-2, the word line 231, and the plate line 232 (PL-2) are at 0V. As a result, a Coulomb force is generated in a direction reverse to the direction in which the mirror 212 is moving, between the second ON electrode 235(C), to which 10 V is applied, and the mirror 212. This reduces the tilting force of the mirror 212 towards the OFF side.

Furthermore, as shown in FIG. 12C when all of the electrodes are driven to 0V, the operation state is restored, by applying the L level to the plate line 232 (PL-1) before the mirror 212 is prevented from tilting toward the OFF side by the Coulomb force generated between the second ON electrode 235 (C) and the mirror 212.

As a result, the mirror 212 changes to the intermediate oscillation state shown in FIG. 11C with an amplitude smaller than the maximum amplitude.

The operations of the pixel unit 211 are described with the assumption that the H levels of the bit lines 221-1 and 221-2 and the word line 231 are 5V, and the H level of the plate line 232 is 10V. However, the applied voltages are not limited these specific values. The voltages may be adjusted according to the Coulomb force required by the weight of the mirror, the distance from the bary center to the rotational center, and the thickness, width, length, material, or the shape of the cross section of the elastic hinge.

The change of the mirror 212 from the ON state to the intermediate oscillation state is illustrated as an example of operations. A change from the OFF state to the intermediate oscillation state can be similarly implemented by using the second OFF electrode 236 (D).

The above described operation example refers to the change made to the intermediate oscillation state as an example of using the plate lines 232. However, the usage of the plate lines 232 is not limited to this example. For example, the plate lines 232 can be used to assist change operations by temporarily applying a voltage equal to or higher than that applied from the bit line 221-1 or 221-2 at the start of a state change, (i.e., from the ON state to the OFF state, from the OFF state to the ON state, from the oscillation state to the ON state, from the oscillation state to the OFF state, etc.)

Figure 13A:
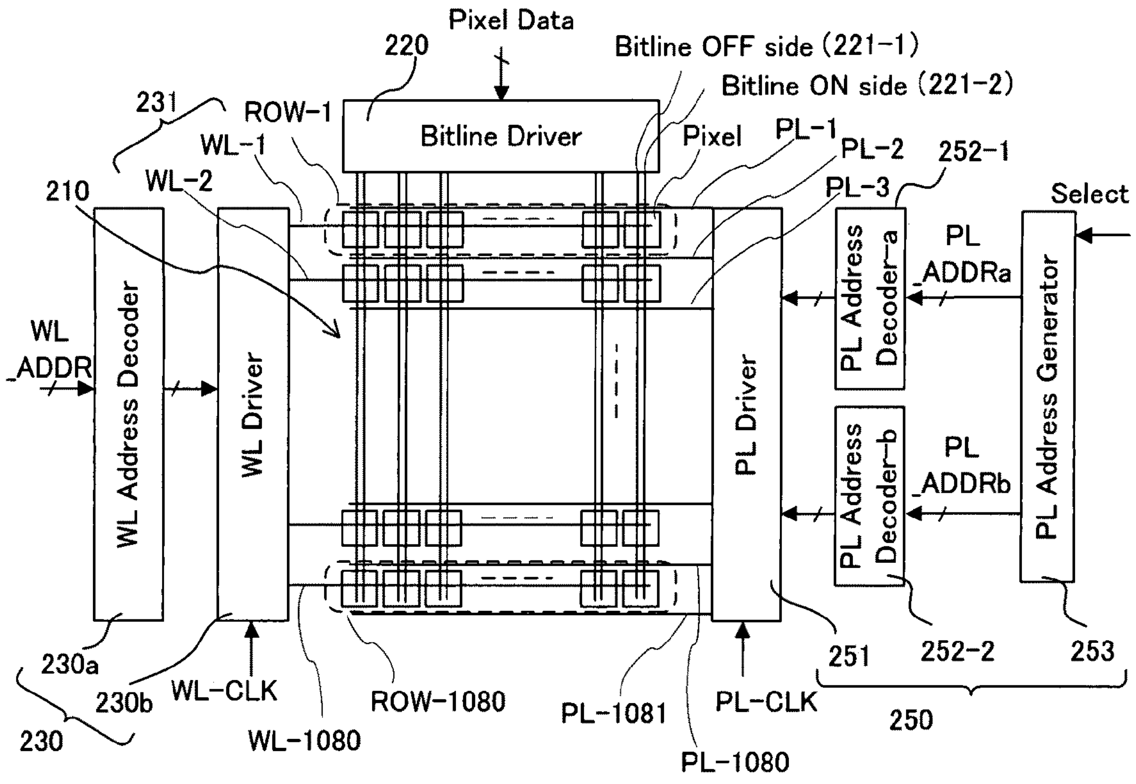
FIG. 13A is a functional circuit diagram showing an example of the layout of peripheral circuits of a pixel array in the display system according to the embodiment of the present invention.

FIG. 13A shows an example of a layout of the configuration of the control circuit for the pixel array 210, where the pixel units 211 shown in FIG. 8 are arranged as an array.

A plate line driver unit 250 for controlling the plate lines 232, added to the basic configuration of the pixel array 21 shown in FIG. 3, is added.

Specifically, the present embodiment is configured to add the plate line driver unit 250 in the vicinity of the pixel array 210, in addition to the provision of the bit line driver part 220 and word line driver unit 230.

The word line driver unit 230 comprises a first address decoder 230*a* and a word line driver 230*b* that are used for selecting word lines 231 (WL).

The plate line driver unit 250 comprises a plate line driver 251, plate line address decoders 252-1 and 252-2, all of which are used for selecting plate lines 232 (PL).

Furthermore, the plate lines 232 are arranged so that the number of plate lines 232 is greater than the number of ROW lines by one line. The one extra plate line 232 is required to make the configurations of the pixel units 211 identical in the configuration according to this embodiment.

Each pixel unit 211 is connected to the bit lines 221-1 and 221-2 of the bit line driver unit 220 (Bitline driver) so that data is written to the pixel units 211 belonging to the ROW line selected by a word line 231 (WL).

A signal produced by an external input data though a serial word line (WL_ADDR 1) is connected in parallel to an address decoder 230*a* (WL Address Decoder). A word line driver 230*b* (WL Driver) converts the input data into a designated voltage and applies the voltage to the word line 231 (WL).

In addition to the control processes carried out by the signals transmitted on the word line 231 (WL), the electrodes on the ON and the OFF sides of each of the pixel units 211 are also controlled by the plate line 232 (PL). For the plate lines 232 (PL), serial data PL_ADDRa and PL_ADDRb, provided from the plate line address generator 253 (PL Address Generator) are made parallel by a plate line address decoder 252-1 (PL Address Decoder-a) and a plate line address decoder 252-2 (PL Address Decoder-b). The data is converted into a necessary voltage by the plate line driver 251 (PL Driver).

Here, the number of ROW lines can be set to, for example, 720 lines or more.

In this case, data signals respectively inputted from the bit lines 221-1 and 221-2 to the memory cells M1 and M2 are transmitted to all memories in one ROW line within 23 nsec (nanoseconds).

Figure 13B:
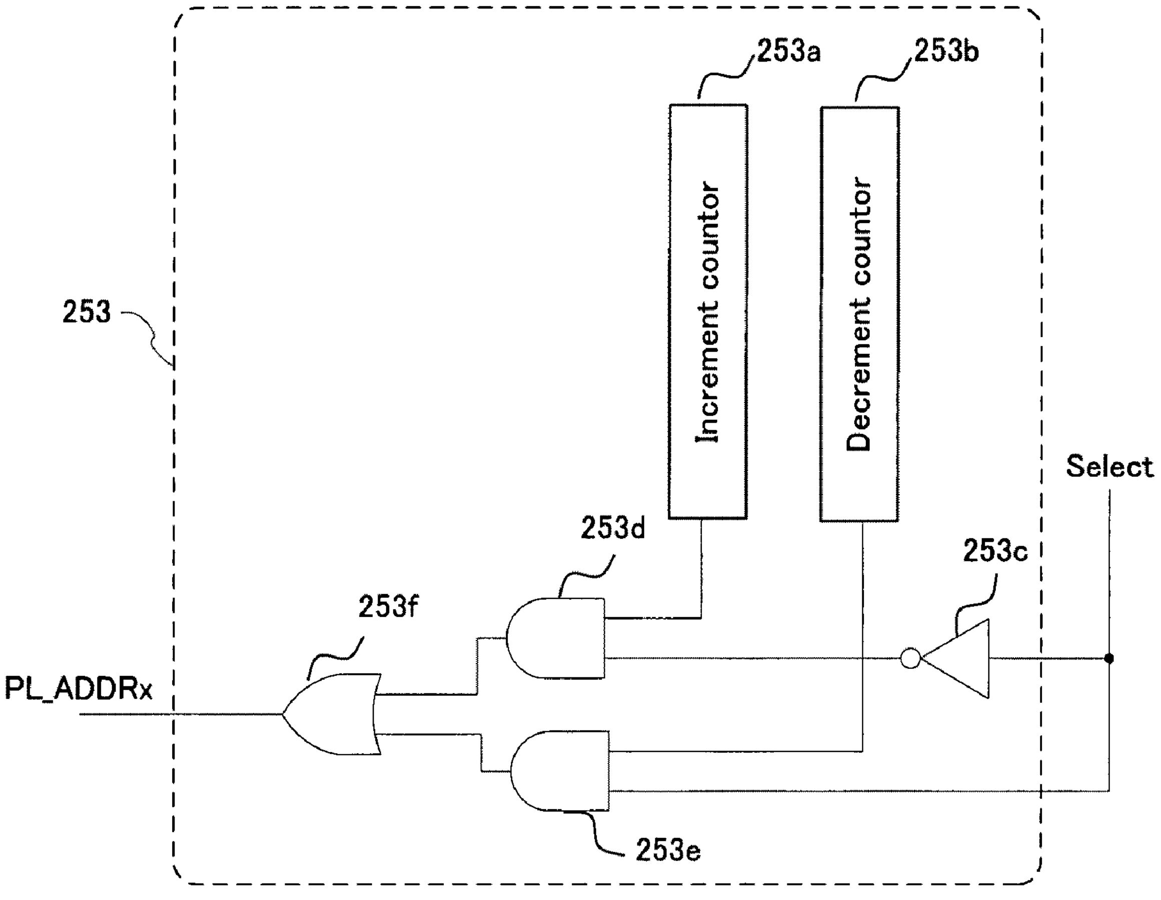
FIG. 13B is a functional circuit diagram showing an example of the internal configuration of a plate line address generator (PL Address Generator) shown in FIG. 13A.

Namely, 720 ROW lines are processed by partitioning a display duration into four periods and assigning the four periods to the four colors of R, G, B and W, each of which has 256 gray scale levels, in 60 frames per second, 1/60 sec/partitioned into 4/256 gray scale levels/720 lines=22.6 nsec Additionally, 1080 ROW lines are processed by partitioning a display duration into three periods and assigning the three periods to the three colors of R, G and B, each of which has 256 gray scale levels, in 60 frames per second, 1/60/3/256/1080=20 nsec FIG. 13B is a conceptual diagram showing an example of the internal configuration of the above described plate line address generator 253 (PL Address Generator) shown in FIG. 13A. The plate line address generator 253 may be configured as part of the plate line driver unit 250, as shown in FIG. 13A, or as a module different from the module configuring the pixel array.

Within the plate line address generator 253, an increment counter 253*a*, used when the scanning direction of the plate line 232 is a forward direction, and a decrement counter 253*b*, used when the scanning direction of the plate line 232 is a reverse direction, are arranged along with a NOT circuit 253*c*, AND circuits 253*d* and 253*e*, and an OR circuit 253*f*.

The plate line address generator 253 can selectively output an address signal by using the increment counter 253*a* or the decrement counter 253*b* according to an externally inputted selection signal (Select).

More specifically, the externally inputted selection signal (Select) is inputted to the AND circuits 253*d* and 253*e*. However, since the signal input to the AND circuit 253*d* is inputted after being inverted by the NOT circuit 253*c*, the externally inputted selection signal (Select) enables either the AND circuits 253*d* or the 253*e*. Specifically, the AND circuit 253*d* is enabled when the selection signal (hereinafter referred to as a forward direction signal), which specifies the scanning direction of the plate line 232 to be the forward direction, is inputted, or the AND circuit 253*e* is enabled when the selection signal (hereinafter referred to as a reverse direction signal), which specifies the scanning direction of the plate line 232 to be the reverse direction, is inputted.

As a result, an address signal (PL_ADDRx) is outputted from the OR circuit 253*f* on the basis of the address information of the plate line 232, which is recorded in the increment counter 253*a*, when the forward direction signal is inputted.

Similarly, the address signal (PL_ADDRx) is outputted from the OR circuit 253*f* on the basis of the address information of the plate line 232, which is recorded in the decrement counter 253*b*, when the reverse direction signal is inputted.

Figure 14:
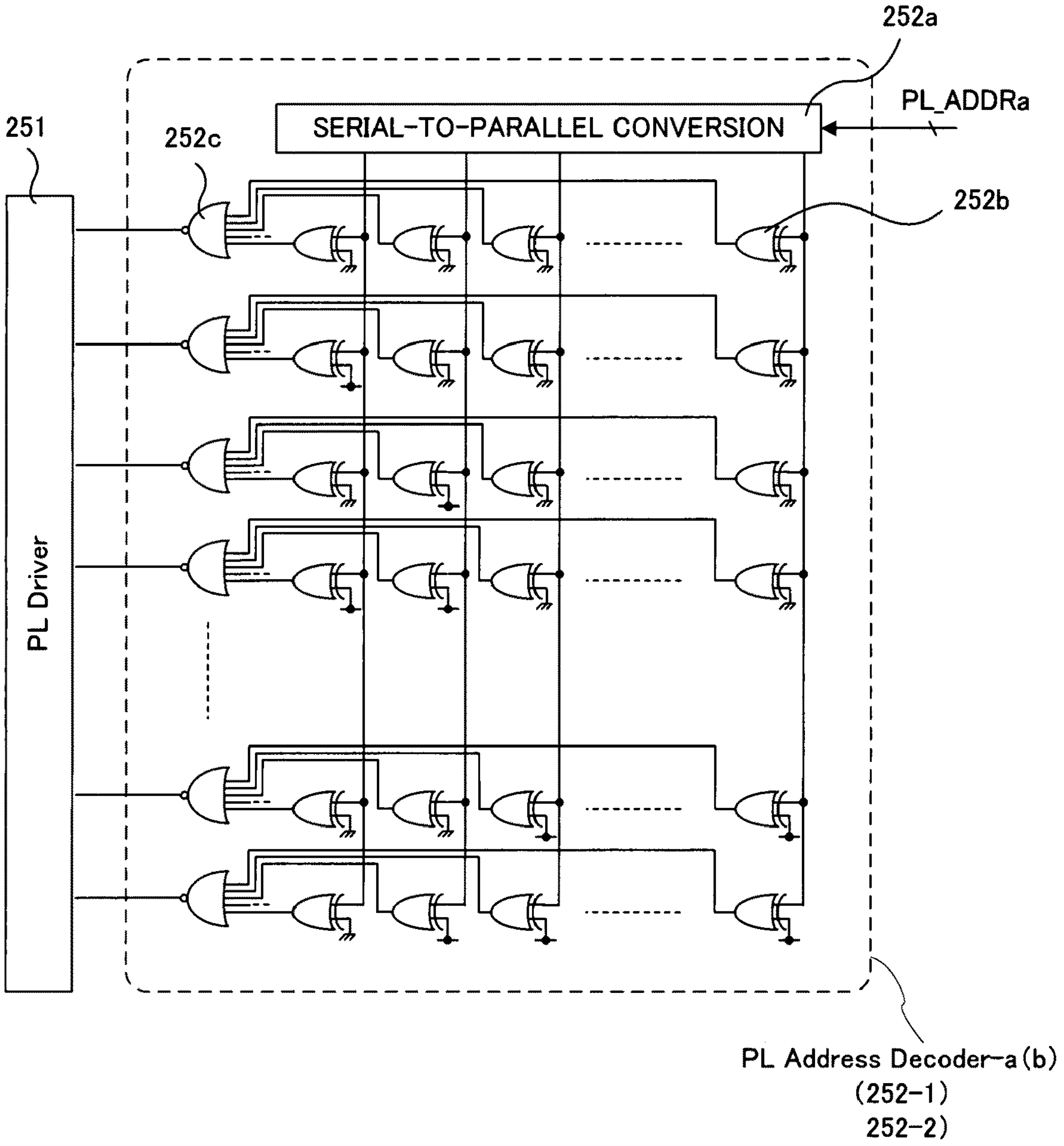
FIG. 14 is a functional circuit diagram showing an example of the internal configuration of a plate line address decoder (PL Address Decoder-a) shown in FIG. 13A.

FIG. 14 shows an example of the internal configuration of the plate line address decoder 252-1 (PL Address Decoder-a) shown in FIG. 13A.

The plate line address decoder 252-1 comprises a serial-parallel conversion circuit 252*a* for serial-to-parallel converting an externally serially inputted address signal (PL_ADDRa) into the number of bits of the plate lines 232, and an address detection unit constituted by EXOR circuits 252*b* and NOR circuits 252*c*, all of which are equipped for the number of bits of the PL_ADDRa.

An externally inputted address signal (PL_ADDRa) is serial-to-parallel converted by the serial-parallel conversion circuit 252*a* and is inputted in parallel to the respective EXOR circuits 252*b*.

If a plate line (PL) is the same as a plate line 232 (PL) selected by the parallel-converted value, the present PL is selected by the address detection unit (i.e., the EXOR circuit 252*b* and NOR circuit 252*c*) corresponding to the individual plate line 232.

Although not specifically shown in a drawing, the internal configurations of the plate line address decoder 252-2 (PL Address Decoder-b) and first address decoder 230*a* (WL Address Decoder) can be similar to that of the above described plate line address decoder 252-1.

Figure 15:
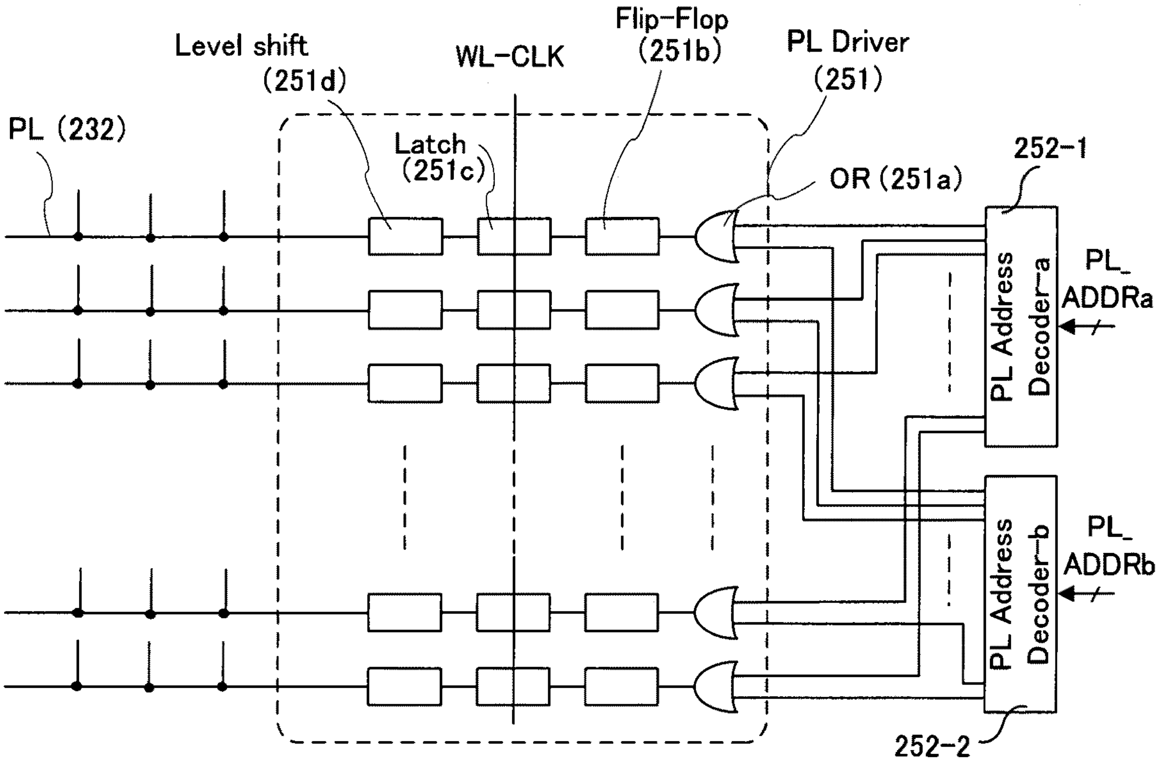
FIG. 15 is a functional circuit diagram showing an example of the internal configuration of a plate line driver (PL Driver) shown in FIG. 13A.

FIG. 15 is a conceptual diagram showing an example of the internal configuration of the plate line driver 251 (PL Driver) shown in FIG. 13A.

The internal configuration of the plate line driver 251 (PL Driver) is comprised of circuits provided correspondingly to the plate lines 232 (PL).

In the plate line driver 251, an OR circuit 251*a* is equipped on the initial stage so as to enable either the plate line address decoder 252-1 (PL Address Decoder-a) or the plate line address decoder 252-2 (PL Address Decoder-b) to select a plate line 232 (PL).

The output of the OR circuit 251*a* is inputted to the flip-flop 251*b* (Flip-Flop), and the output value is retained therein.

Then, the output value is latched at the latch 251*c* (Latch) with a PL-CLK in order to synchronize with the bit line driver part 220 (Bitline driver). It is then converted by the level shift circuit 251*d* (Level shift) into the required voltage applied to the ON electrode 216.

Figure 16:
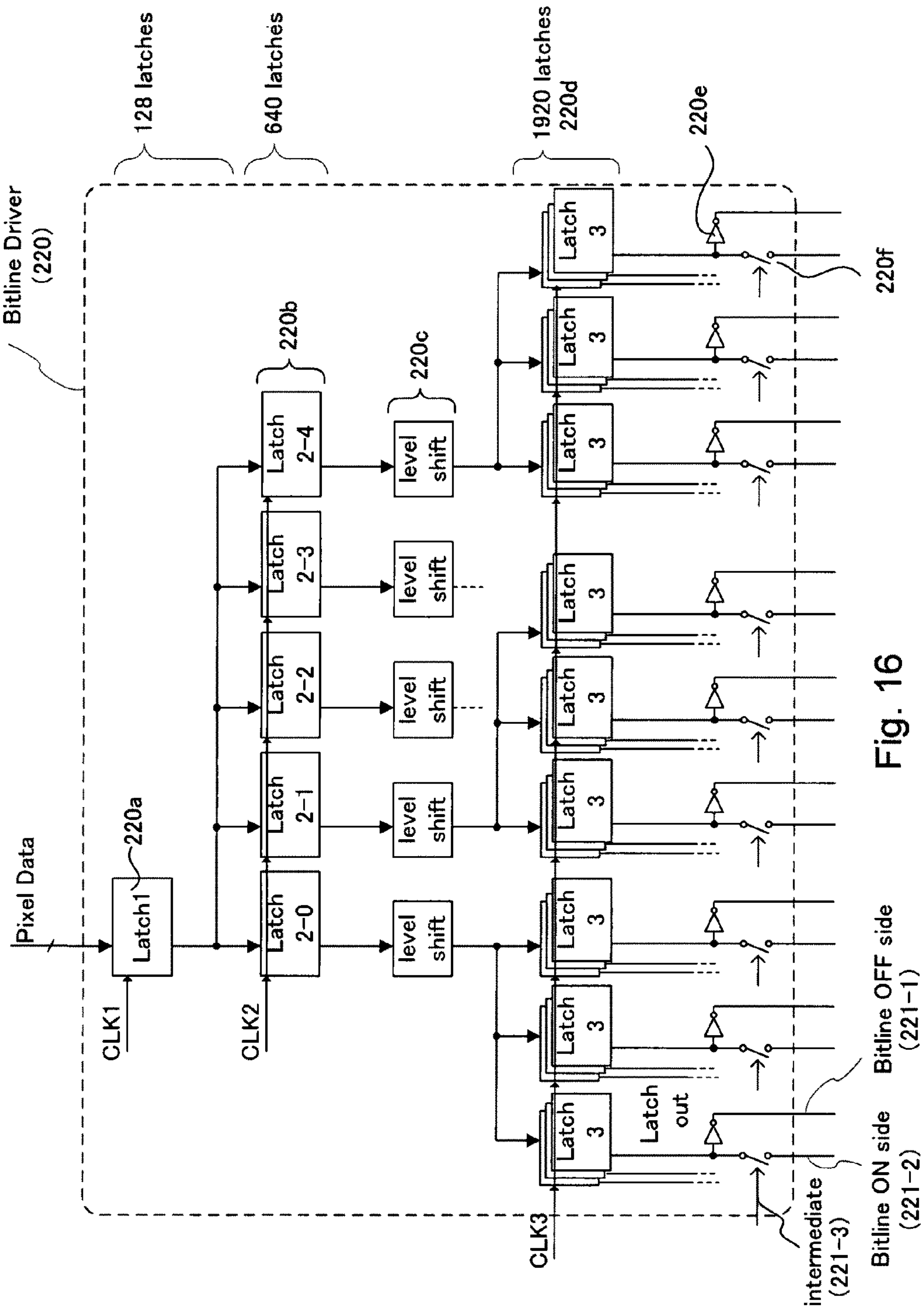
FIG. 16 is a functional circuit diagram showing an example of the internal configuration of a bit line driver (Bitline Driver) shown in FIG. 13A.

FIG. 16 shows an example of the internal configuration of the bit line driver unit 220 (Bitline Driver) shown in FIG. 13A.

The bit line driver unit 220 in this embodiment includes a first stage latch 220*a*, second stage latches 220*b*, level shift circuits 220*c*, third stage latches 220*d*, inverters 220*e*, and mode switches 220*f*.

The inverter 220*e* and mode changeover switch 220*f* function as column decoder for controlling the bit lines 221-1 and 221-2.

Specifically, the inverter 220*e* logically inverts the output (latch-out) from the third stage latch 220*d* to branch out as a bit line 221-1, while the mode changeover switch 220*f* turns ON/OFF the latch-out output to the pre-branched bit line 221-2.

If one ROW is, for example, 1920 bits, the bit line driver part 220 receives an external input that is 15 times of 128-bit pixel data.

The bit line driver part 220 latches this volume of data in three stages as follows:

First stage: 128 latches (at the first stage latch 220*a*)

↓

Second stage: 640 latches (at the second stage latch 220*b*)

↓

Voltage conversion (level shift) (at the level shift circuit 220*c*)

↓

Third stage: 1920 latches (at the third stage latch 220*d*)

The logic states of the bit lines 221-1 and 221-2 are decided according to a logic determined based on a table shown in FIG. 17, when the data is transmitted to the ON (bit line 221-2) side and the OFF (bit line 221-1) side of bit line after 1920 latches are made by the third stage latches 220*d*, as described above.

Figure 18:
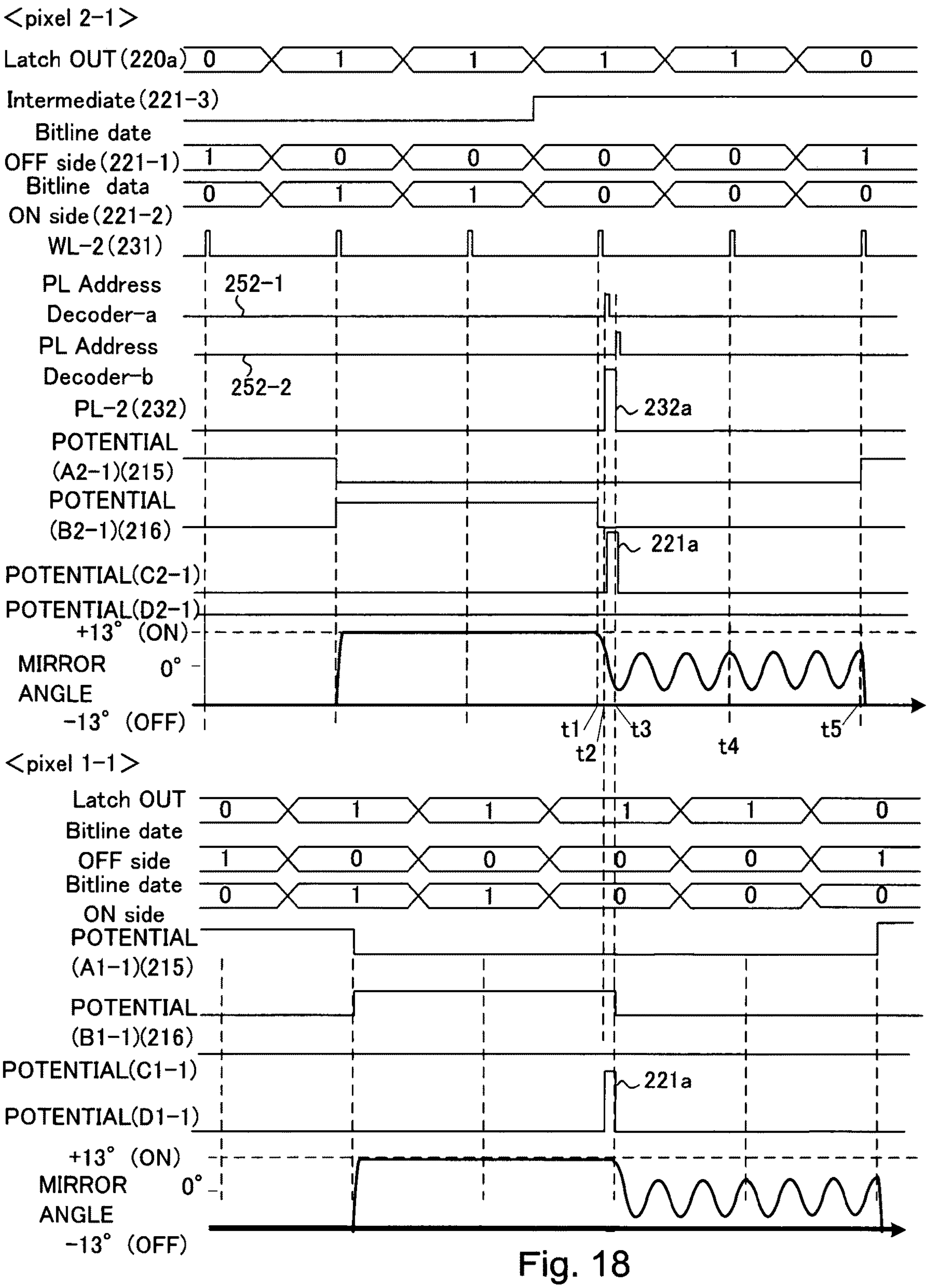
FIG. 18 is a timing chart showing an example of operations of the pixel array of the spatial light modulator configuring the display system according to the embodiment of the present invention.

FIG. 18 is a timing chart showing the operational timings of <pixel 1-1> (pixel unit 211) and <pixel 2-1> (pixel unit 211), which share the plate line 232, and the corresponding state of the mirror 212, in the pixel array 210 shown in FIG. 8.

The following descriptions of FIG. 18 for using the plate lines 232 in different ROW lines provide one of the common characteristics of the spatial light modulator in this embodiment. FIG. 18 shows the case where the plate line 232 is used to generate an intermediate oscillation, and the influence on <pixel 1-1> (pixel unit 211) by the control of plate line 232 (PL-2), which is used to generate the intermediate oscillation in <pixel 2-1> (pixel unit 211).

Additionally, the scanning directions of the word line 231 and the plate line 232 are assumed to be in a direction proceeding from larger to smaller numbers assigned to ROW lines (hereinafter referred to as the reverse direction). For example, ROW-1081, ROW-1080, ROW-1079, . . . , ROW-3, ROW-2, and ROW-1 are sequentially accessed in this order.

The scanning direction of the plate line 232 can be also controlled by the above described plate line address generator 253 having the internal configuration shown in FIG. 13B. Moreover, a similar control can be performed for the word line 231 by providing an address generator having a configuration similar to the plate line address generator 253, although this is not described here.

As shown in FIG. 18, the two focused pixel units 211 (<pixel 2-1> and <pixel 1-1>) belong to different ROW lines. Therefore, a mode switch signal 221-3 (Intermediate) and the signals of the word line 231 and the plate line 232 of each pixel unit are different signals. However, only the effects of the control for the pixel unit 211 <pixel 2-1> exerted on <pixel 1-1> will be described here. Therefore, the mode switch signal 221-3 (Intermediate) and the signals of the word line 231 and the plate line 232 of <pixel 1-1> are omitted. The bit lines 221 (the bit line 221-1, the bit line 221-2) common to the two focused pixel units 211 are used, unlike the word line 231, the plate line 232, etc. However, since the ROW lines to which the pixel units 211 belong are different, different signals are provided at the timing when the word line 231 in each ROW line is sequentially accessed. FIG. 18 illustrates the case where the same signal is. Therefore, the two focused pixel units 211 are displayed in gray.

The following is a description of the operations of the pixel unit 211 <pixel 2-1>.

The signal of the word line 231 (WL-2) operates at predetermined time intervals (in this case, the interval between control timings t1 and t4 is assumed to be one cycle) in order to control the selection of the bit lines 221-1 and 221-2.

In the meantime, the signal of the plate line 232 (PL-2) starts to operate with a delay from the signal of the word line 231 (WL-2) by an interval (between the control timings t1 and t2) that is shorter than one cycle of the signal of the word line 231 (WL-2). In the example shown in FIG. 18, the signal of the plate line 232 operates two successive times during one cycle of the word line (WL-2) (see the changes of the potential 232*a* that becomes ON with the pulse of the plate line address decoder 252-1 and becomes OFF with the pulse of the plate line address decoder 252-2).

Accordingly, the transmission speed (frequency) of the signal in the plate line 232 (PL-2) is faster than that of the signal in the word line 231 (WL-2).

The mirror 212 of <pixel 2-1> stays stationary on the side of the ON electrode 216 (B2-1) if LatchOUT (the output of the third stage latch 220*d*) is 1, or stays stationary on the side of the OFF electrode 215 (A2-1) if the LatchOUT is 0 before the control timing t1, when the mode switch signal 221-3 (Intermediate) is "L". Namely, the operations of the mirror 212 are controlled with pulse width modulation (PWM) like a PWM control profile 451 before the control timing t1.

If LatchOUT is "1" at and after the control timing t1 when the mode switch signal 221-3 (Intermediate) is "H", the OFF electrode 215 (A2-1) and the ON electrode 216 (B2-1) are driven to 0V, and the mirror starts to freely oscillate as a result.

As described above, the mode conversion between the pulse width modulation (PWM) and the intermediate oscillation (OSC) is controlled with the mode switch signal 221-3 (Intermediate). At control timing t1 and after, there is a switch to the intermediate oscillation mode, when the signal of the word line 231 (WL-2) is initially inputted after the mode switch signal 221-3 is driven to the H level. Before the control timing t1, there is a switch to the PWM mode.

At the control timing t2, the plate line 232 (PL-2) is selected by the plate line address decoder 252-1 (PL Address Decoder-a) and driven to the potential 232*a* of the H level. The plate line 232 (PL-2) remains high until the selection of the plate line 232 (PL-2) is cancelled by the plate line address decoder 252-2 (PL Address Decoder-b) at the control timing t3.

Between control timing t2 and control timing t3, during which the level of the plate line 232 (PL-2) is high, the second ON electrode 235 (C2-1) is driven to the potential 221*a* of H-level, and a Coulomb force is applied to the mirror 212 in the direction of the second ON electrode 235 (C2-1). As a result, the intermediate oscillation (OSC) like an intermediate oscillation control profile 452 is generated.

At the control timing t5, the OFF electrode 215 (A2-1) is driven to the H level by the bit line 221-1 (Bitline). As a result, the mirror 212 is drawn by the OFF electrode 215 (A2-1), changes from the intermediate oscillation state to the OFF state, and remains stationary.

The following is a description of the operations of the pixel unit 211 <pixel 1-1> with a focus on the effects the operations of the pixel unit 211 <pixel 2-1>.

The signal of the word line 231 (WL-1) operates at predetermined time intervals similar to the word line 231 (WL-2). However, the word line 231 (WL-1) is sequentially accessed after the word line 231 (WL-2), according to the above described scanning direction. Therefore, its signal is inputted with a delay from the signal of the word line 231 (WL-2). Accordingly, the mirror 212 of <pixel 1-1> starts an intermediate oscillation with a delay from the mirror 212 of <pixel 2-1>, although the mirror 212 of <pixel 1-1> has a control profile similar to <pixel 2-1>.

The potential 221*a* of the second OFF electrode 236 (D1-1) in <pixel 1-1>, which is generated by the voltage applied to the plate line 232 (PL-2) in order to control <pixel 2-1>, occurs while <pixel 1-1> is in the PWM mode due to a delay of the sequential access to the word lines 231. In this case, the mirror 212 of <pixel 1-1> remains on the side of the ON electrode 216 (B1-1) with the Coulomb force generated by the potential of the ON electrode 216 (B1-1), as shown in FIG. 18. Accordingly, the mirror 212 of <pixel 1-1> continues to stay on the side of the ON electrode 216 (B1-1) because the Coulomb force generated between the second OFF electrode 236 (D1-1) and the mirror 212 is temporary.

In FIG. 18, the two focused pixel units 211 are displayed in gray. However, similar results can be obtained even if <pixel 1-1> is displayed in another state.

For example, if <pixel 1-1> is displayed in black, the mirror 212 of <pixel 1-1> remains on the side of the OFF electrode 215 (A1-1) of <pixel 1-1>, while the potential of the second OFF electrode 236 (D1-1) in <pixel 1-1> is the potential 221*a*. Accordingly, the Coulomb force generated by the potential 221*a* of the second OFF electrode 236 (D1-1) is applied in the direction of maintaining the stationary state. Therefore, the control operations of <pixel 2-1> do not affect <pixel 1-1>.

More specifically, a delay of the sequential access to the word line 231 can also be adjusted by using the control for making a sequential access to the plate lines 232 while skipping them, which will be described later. As a result, the control for the intermediate oscillation by the plate line 232 can be more reliably performed.

Figure 19A:
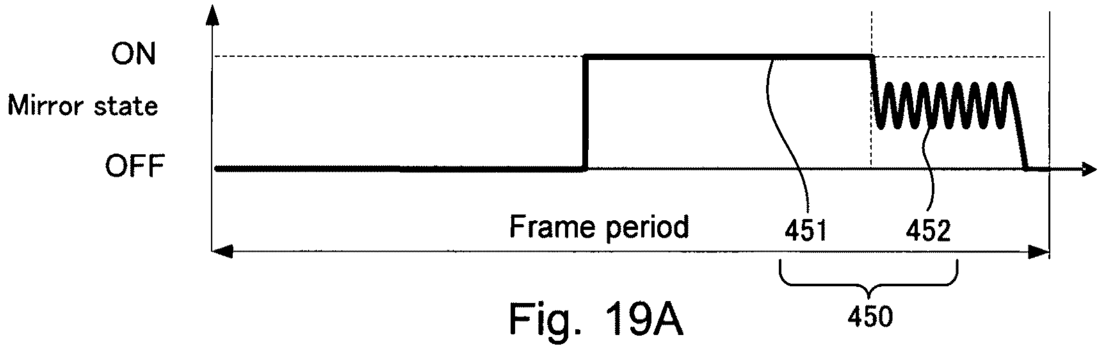
FIG. 19A is a timing diagram showing an example of the settings of a mirror control profile of the spatial light modulator configuring the display system according to the embodiment of the present invention.
Figure 19B:
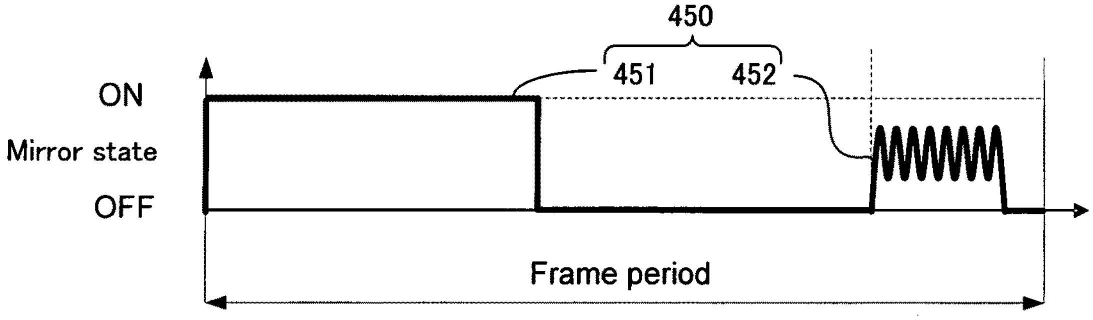
FIG. 19B is a timing diagram showing an example of the settings of the mirror control profile of the spatial light modulator configuring the display system according to the embodiment of the present invention.
Figure 19C:
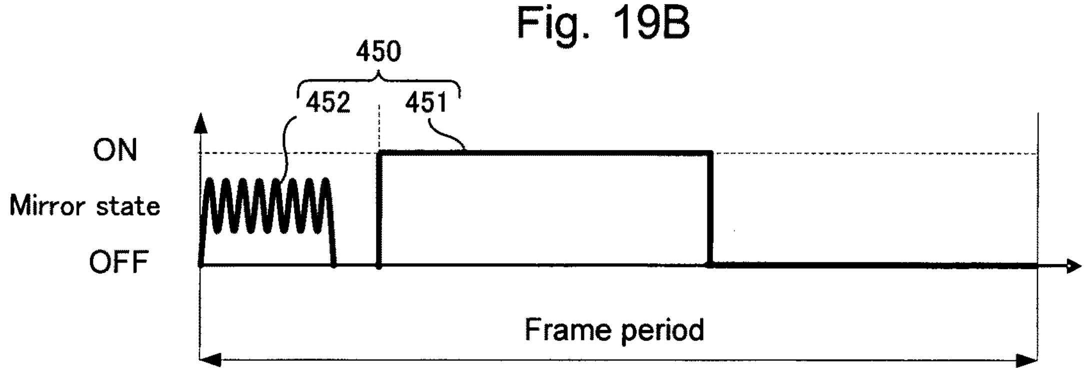
FIG. 19C is a timing diagram showing an example of the settings of the mirror control profile of the spatial light modulator configuring the display system according to the embodiment of the present invention.
Figure 19D:
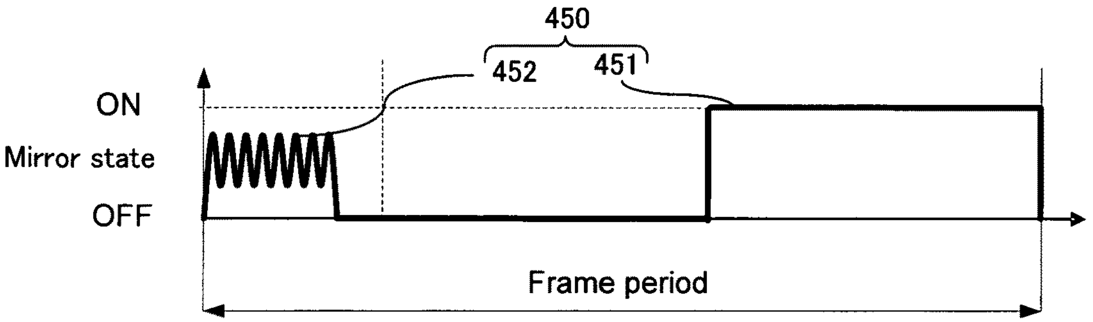
FIG. 19D is a timing diagram showing an example of the settings of the mirror control profile of the spatial light modulator configuring the display system according to the embodiment of the present invention.

FIGS. 19A, through 19D are charts showing various exemplary placements of a PWM control profile 451 (PWM drive timing 440) and an intermediate oscillation control profile 452 (OSC drive timing 441 in the mirror control profile 450) for one frame period of a mirror.

The mirror control profile shown in FIG. 19A exemplifies the case of sequentially generating a PWM control profile 451 and an intermediate oscillation control profile 452 in the latter part of one frame.

FIG. 19B exemplifies the case of generating the PWM control profile 451 in the beginning of one frame and generating the intermediate oscillation control profile 452 towards the end of the same frame.

FIG. 19C exemplifies the case of generating the intermediate oscillation control profile 452 in the first half of one frame and then generating the PWM control profile 451.

FIG. 19D exemplifies the case of generating the intermediate oscillation control profile 452 at the start of one frame and generating the PWM control profile 451 at the end thereof.

FIG. 19E exemplifies the case of aligning the ON position of the PWM control profile 451 with the beginning of one frame and aligning the end of the intermediate oscillation control profile 452 with the end of the same frame.

The pattern (mirror control profile 450) of the behaviors of the mirror 212 in the aforementioned pixel units <pixel 1-1> and <pixel 2-1>), which are displayed in gray in FIG. 18, corresponds to FIG. 19A.

For any of the mirror control profiles 450 shown in FIGS. 19A to 19D, the start timing of the intermediate oscillation control profile 452 is identified within one frame period. Therefore, sharing of a plate line 232 by different ROW lines in this embodiment can be implemented when the plate line 232 is controlled to generate the intermediate oscillation.

Since the mirror 212 changes from the ON state to the intermediate oscillation state in the cases shown in FIGS. 19A and 19D, the second ON electrode 235 (C) is used. Additionally, since the mirror 212 changes from the OFF state to the intermediate oscillation state in the cases shown in FIGS. 19B and 19C, the second OFF electrode (D) is used.

Figure 20:
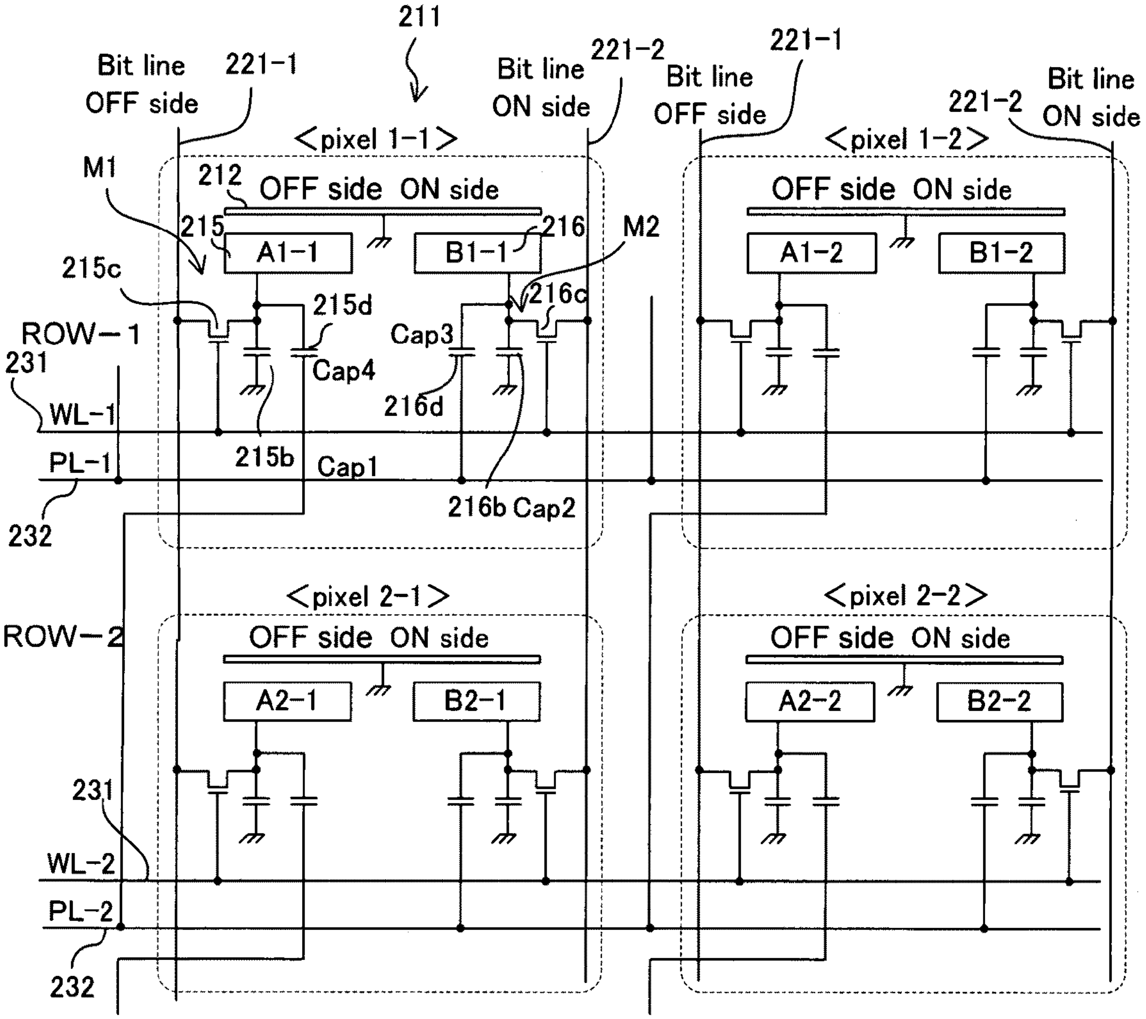
FIG. 20 is a functional circuit diagram showing another modification example of the pixel unit in the display system according to the embodiment of the present invention.

FIG. 20 is a functional circuit diagram showing a modification example of the pixel unit 211 described in FIG. 8.

The modification example shown in FIG. 20 represents the configuration in which one ON electrode 216 and one OFF electrode 215 are respectively arranged on the ON and the OFF sides.

A plate line 232 is connected to the ON electrode 216, which is arranged in the same ROW line as the plate line 232, via a second ON capacitor 216*d* (Cap3). The plate line 232 is also connected to the OFF electrode 215, which is arranged in a ROW line different from the plate line 232, via a second OFF capacitor 215*d* (Cap4).

This configuration enables the potential control for the ON and the OFF sides by using as few as one plate line 232 for each ROW line, in addition to the potential control using the word line 231 and the bit lined 221.

Figure 21:
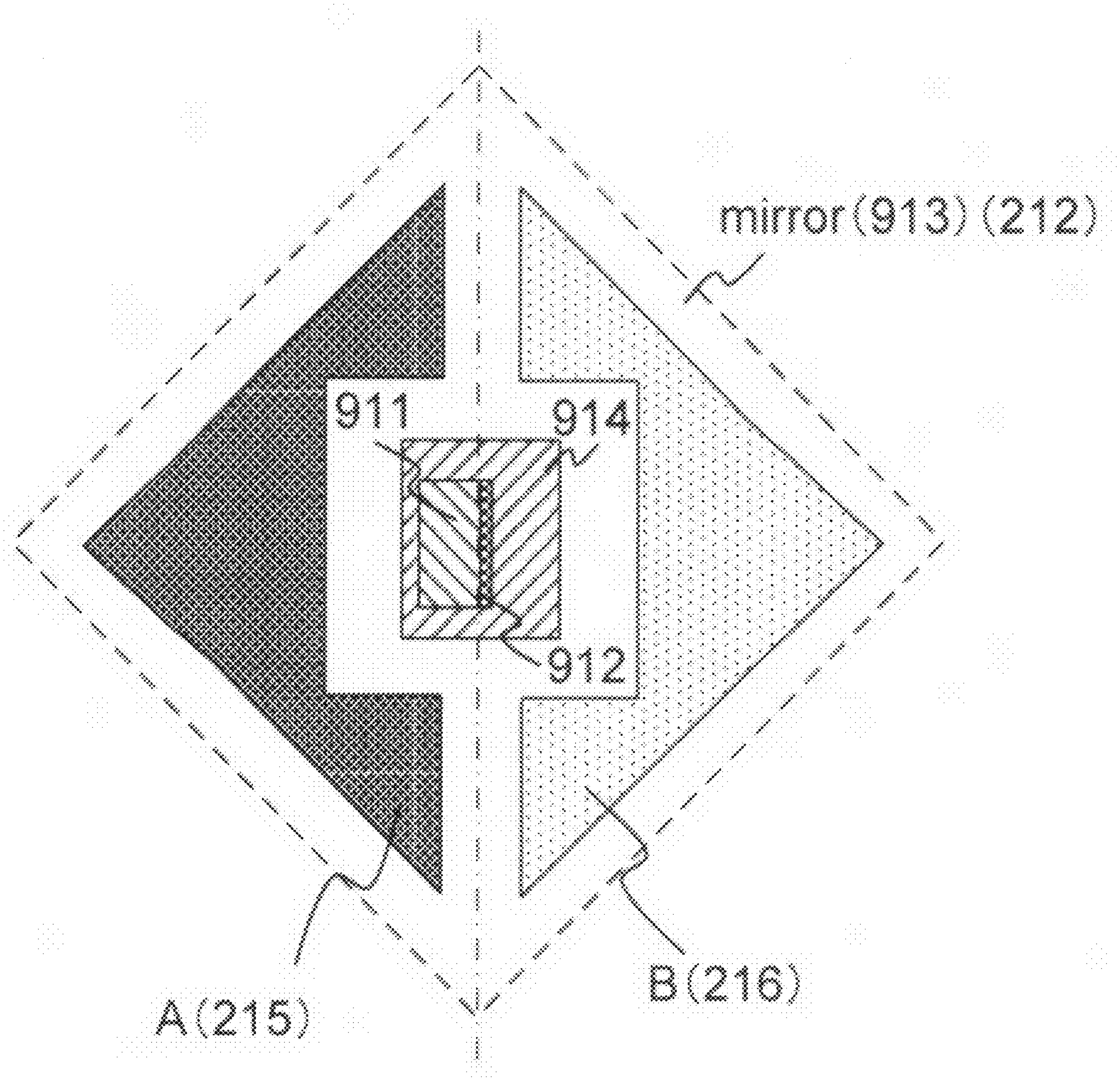
FIG. 21 is a schematic top view diagram showing the layout of electrodes of the pixel unit shown in FIG. 20.

FIG. 21 is a schematic diagram for explaining an example of a layout of the electrodes in the pixel unit 211 shown in FIG. 20.

On one side, the ON electrode 216 (B) is arranged to enclose the three sides of the hinge electrode 914 at the center of the deflection axis 212*a*, represented with a vertical dashed line. The OFF electrode 215 (A) is similarly arranged to enclose the three sides of the hinge electrode 914 on the other side of the deflection axis 212*a*.

In this layout, the electrodes controlled with the word line 231 and the bit lines 221, and the electrodes controlled with the plate line 232 are the same. Accordingly, the size of the electrodes can be increased, in comparison with the configuration shown in FIG. 8, thus a Coulomb force can be efficiently generated.

Figure 22:
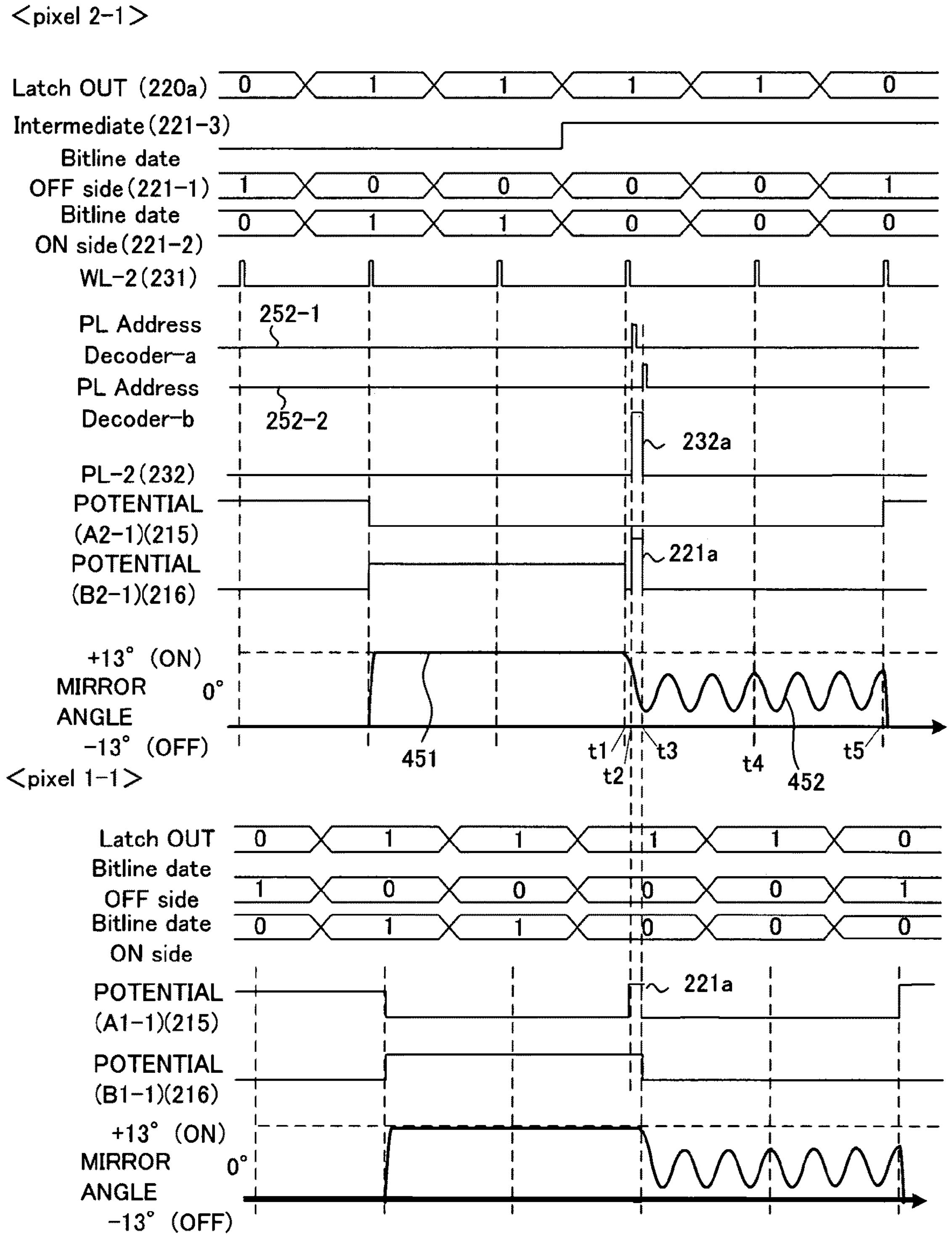
FIG. 22 is a timing chart showing an example of operations of the pixel array of the spatial light modulator configuring the display system according to the embodiment of the present invention.

FIG. 22 is a timing chart showing the operational timings of <pixel 1-1> (pixel unit 211) and <pixel 2-1> (pixel unit 211), which share the plate line 232 in the pixel array 210 with the configuration shown in FIG. 20, and the state of the mirror 212 corresponding to the timings is also described. Here, the effect on <pixel 1-1>, when <pixel 2-1> is controlled to make the intermediate oscillation by applying a voltage to the plate line 232, is described.

Additionally, the scanning directions of the word line 231 and the plate line 232 are assumed to be a direction (hereinafter referred to as the reverse direction) proceeding from larger to small numbers assigned to the ROW lines. For example, ROW-1081, ROW-1080, ROW-1079, . . . , ROW-3, ROW-2, ROW-1 are sequentially accessed in this order.

As shown in FIG. 22, the two focused pixel units 211 (<pixel 2-1> and <pixel 1-1>) are assumed to be displayed in gray.

The following is a description of the operations of <pixel 2-1>.

Fundamentally, the operations are similar to those described in FIG. 18. However, since the plate line 232 (PL-2) is connected to the ON electrode 216 (B2-1) via the second ON capacitor 216*d*, the voltage is applied to the ON electrode 216 (B2-1) between control timing t2 to control timing t3, and the ON electrode 216 (B2-1) is therefore driven to the potential 221*a* of H level. As a result, the mirror 212 performs an intermediate oscillation (OSC), like the intermediate oscillation control profile 452, with the Coulomb force generated between the ON electrode 216 (B2-1) and the mirror 212.

The potential 221*a* of the ON electrode 216 (B2-1) is determined by an applied voltage and the ratio of the capacitance of the ON capacitor 216*b* to that of the second ON capacitors 216*d*.

The following is a description of the operations of pixel unit 211<pixel 1-1> with a focus on the effects of the above described operations of pixel unit 211 <pixel 2-1>.

The operations of pixel unit 211 <pixel 2-1> are fundamentally similar to those in the case shown in FIG. 18. However, the voltage applied to the plate line 232 (PL-2) generates the potential 221*a* at the OFF electrode 215 (A1-1) of <pixel 1-1>. During this time, the mirror 212 of <pixel 1-1> remains on the side of the ON electrode 216 (B1-1) with a Coulomb force generated by the potential of the ON electrode 216 (B1-1), as shown in FIG. 22. Accordingly, the mirror 212 of <pixel 1-1> remains on the side of the ON electrode 216 (B1-1) because the Coulomb force generated between the OFF electrode 215 (A1-1) and the mirror 212 of <pixel 1-1> is temporary.

Similar results are obtained even if <pixel 1-1> is displayed in another state.

For example, if <pixel 1-1> is displayed in black, the mirror 212 of <pixel 1-1> remains on the side of the OFF electrode 215 (A1-1) during the period in which the voltage is applied by the plate line 232 (PL-2). Accordingly, the mirror 212 continues to stay on the side of the OFF electrode 215 (A1-1) of <pixel 1-1> even if the voltage is applied to the OFF electrode 215 (A1-1) by the plate line 232 (PL-2). Accordingly, the control operations for <pixel 2-1> do not affect <pixel 1-1>.

Figure 23:
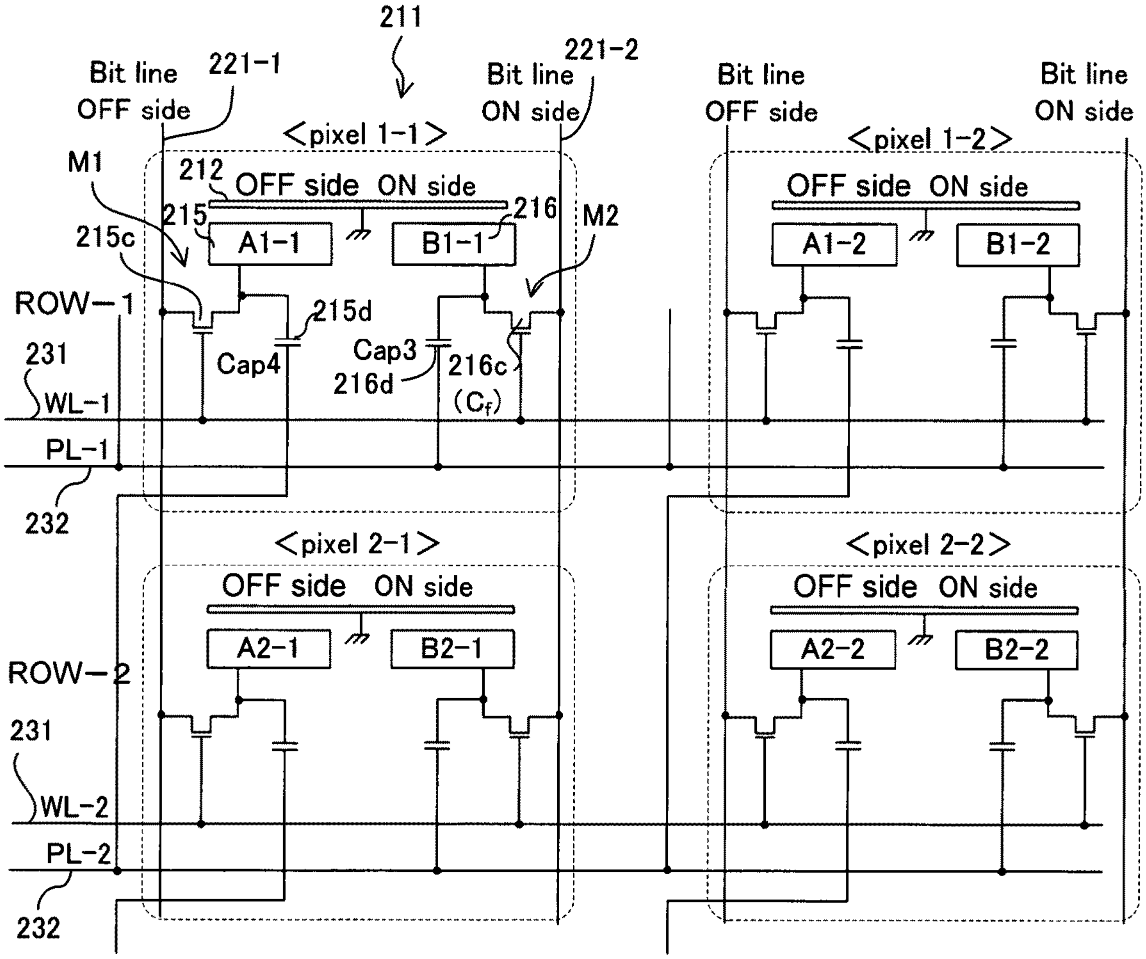
FIG. 23 is a functional circuit diagram showing a further modification example of the pixel unit in the display system according to the embodiment of the present invention.

FIG. 23 shows another modification example of the above described pixel unit 211 shown in FIG. 8.

FIG. 23 shows the configuration obtained by omitting (from the configuration shown in FIG. 20) the OFF capacitor 215*b* (Cap1) and the ON capacitor 216*b* (Cap2) from the sides of the OFF electrode 215 and the ON electrode 216, respectively. However, the gate transistors 215*c* and 216*c* each have a floating capacitance Cf at their source terminals connected to the OFF electrode 215 and the ON electrode 216, respectively, and the floating capacitance Cf achieves an effect similar to the omitted Cap1 and Cap2.

In this case, the capacitance of the second ON capacitor 216*d* is set almost equal to the capacitance of the OFF capacitor 215*b* (Cap3=Cap1). Since the floating capacitance Cf is normally very small, Cap3>> Cf, and the potential of the ON electrode 216 becomes close to the voltage of the plate line 232 (PL).

In the configuration shown in FIG. 23, the operational timings of <pixel 1-1> (pixel unit 211) and <pixel 2-1> (pixel unit 211), which share the plate line 232, and the corresponding state of the mirror 212 are similar to the timing chart shown in FIG. 22. Therefore, further descriptions are omitted here.

Figure 24:
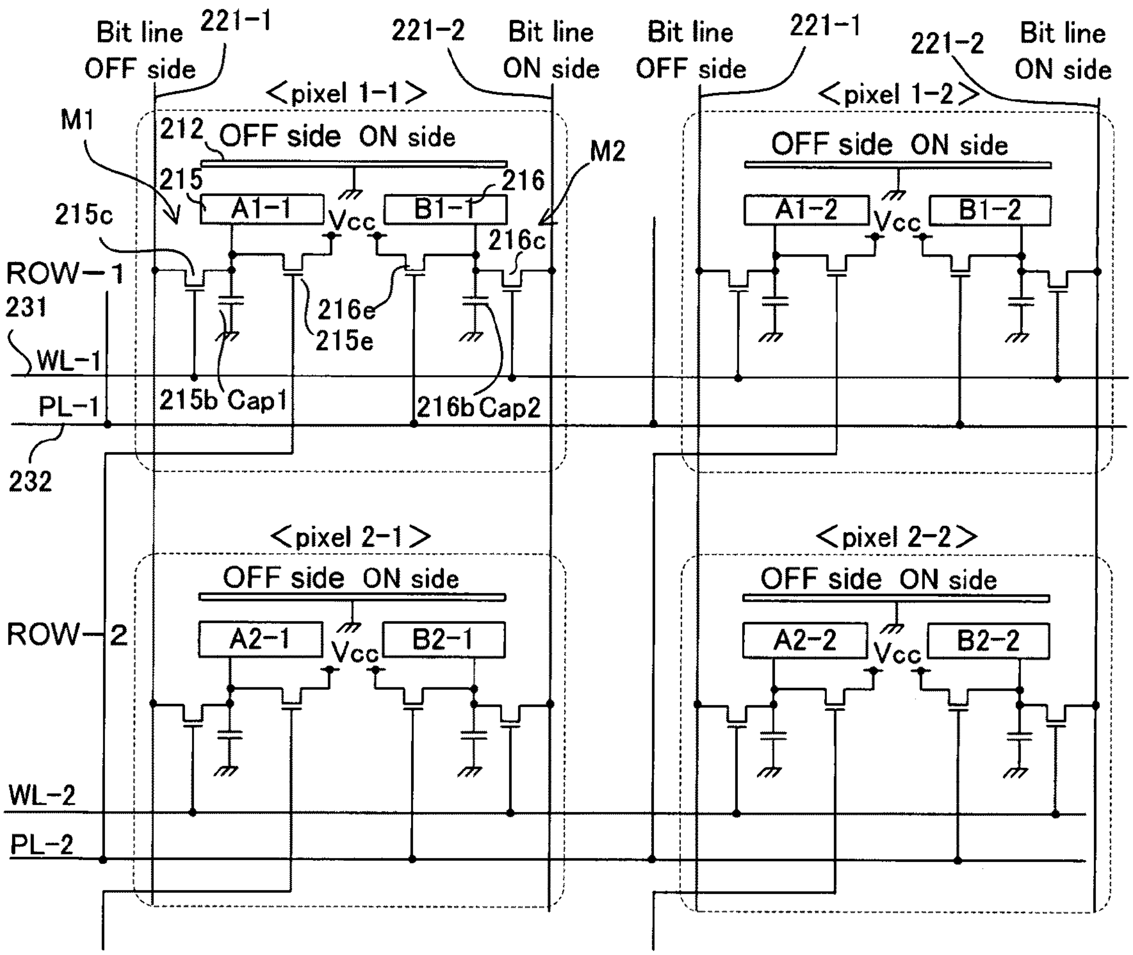
FIG. 24 is a functional circuit diagram showing a further modification example of the pixel unit in the display system according to the embodiment of the present invention.

FIG. 24 shows a further modification example of the above described pixel unit 211 shown in FIG. 8.

In the configuration shown in FIG. 24, an ON gate transistor 216*e* (and OFF gate transistor 215*e*) is arranged as a replacement for the second ON capacitor 216*d* (and second OFF capacitor 215*d*) in the pixel unit 211 shown in FIG. 20. Specifically, the plate line 232 is connected to the gate electrode of the ON gate transistor 216*e* (and OFF gate transistor 215*e*), and the application of a power supply voltage Vcc, to which the drain of the ON gate transistor 216*e* (and OFF gate transistor 215*e*) is connected, to the ON capacitor 216*b* (and OFF capacitor 215*b*) is controlled with the voltage applied from the plate line 232.

Figure 25:
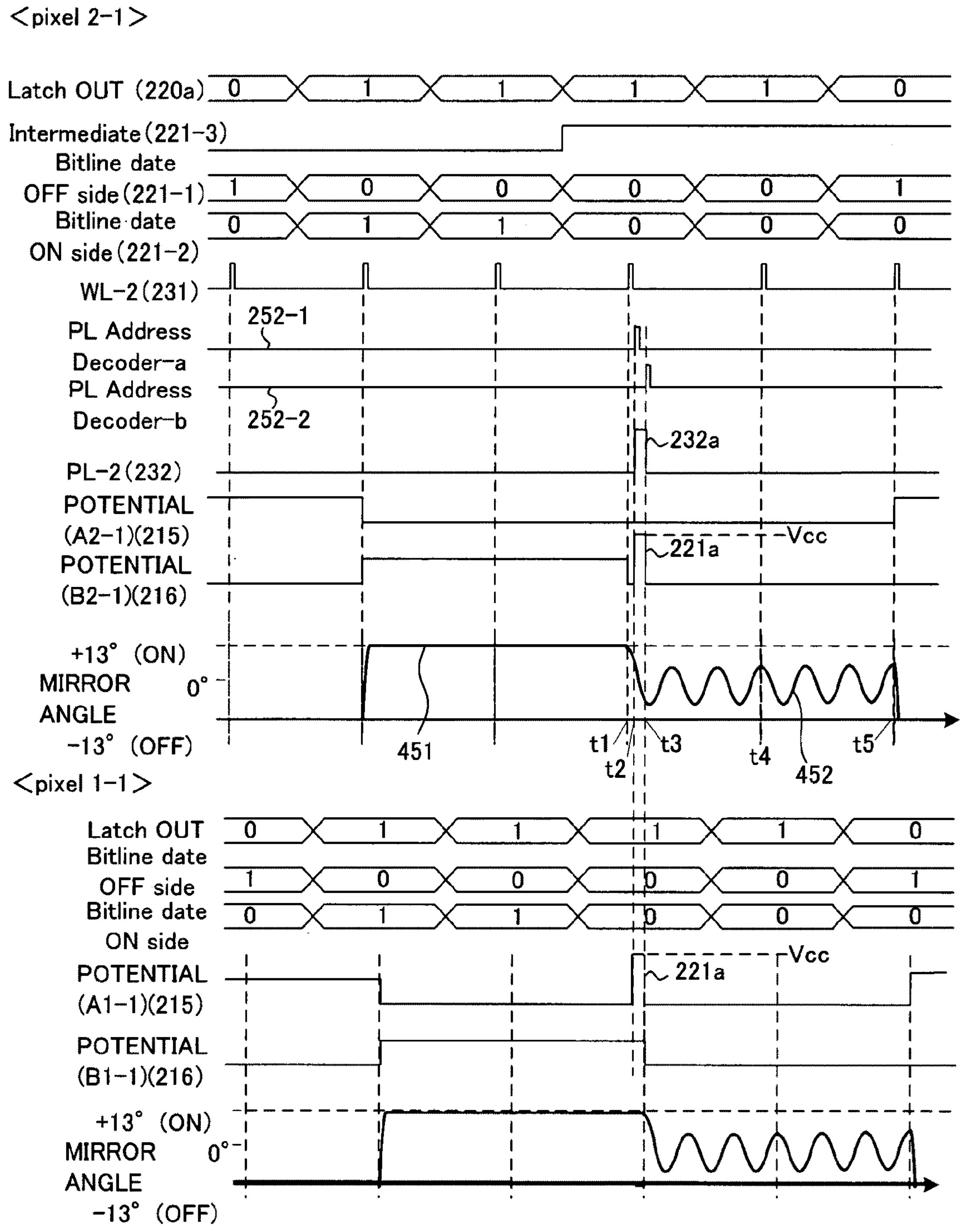
FIG. 25 is a timing chart showing an example of operations of the pixel array of the spatial light modulator configuring the display system according to the embodiment of the present invention.

FIG. 25 is a timing chart showing the operational timings of <pixel 1-1> (pixel unit 211) <pixel 2-1> (pixel unit 211), which have the configuration including the ON gate transistor 216*e* (and OFF gate transistor 215*e*) and sharing the plate line 232, and the corresponding state of the mirror 212.

Although the timings and the state of the mirror are fundamentally similar to the case of FIG. 22, there is a difference in that the potential 221*a* applied to the ON electrode 216, according to the control for the plate line 232 (PL-2), is determined not with the voltage of the plate line 232 (PL-2) but with the power supply voltage Vcc connected to the drain of the ON gate transistor 216*e*.

Also the effects of the control for the plate line 232 on the pixel unit 211 <pixel 1-1> is similar to that in the case of FIG. 22.

Figure 26:
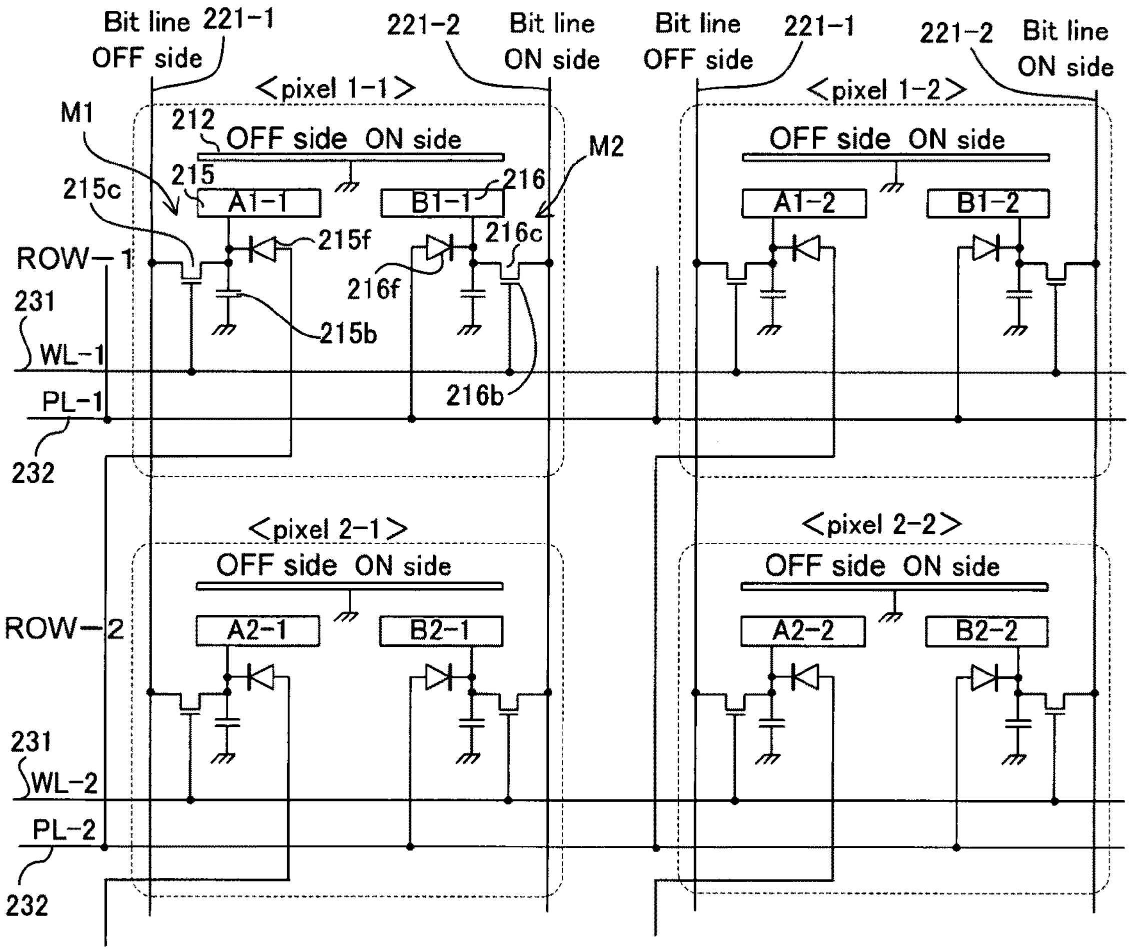
FIG. 26 is a functional circuit diagram showing a further modification example of the pixel unit in the display system according to the embodiment of the present invention.

FIG. 26 shows a further modification example of the pixel unit 211 shown in FIG. 8. This figure shows a configuration in which an ON diode 216*f* is arranged as a replacement for the second ON capacitor 216*d* (Cap3) on the ON side in the configuration of the modification example shown in FIG. 20. Also on the OFF side, an OFF diode 215*f* is arranged as a replacement for the second OFF capacitor 215*d* (Cap4).

Operations of <pixel 2-1> and <pixel 1-1> are described with reference to FIG. 27.

Figure 27:
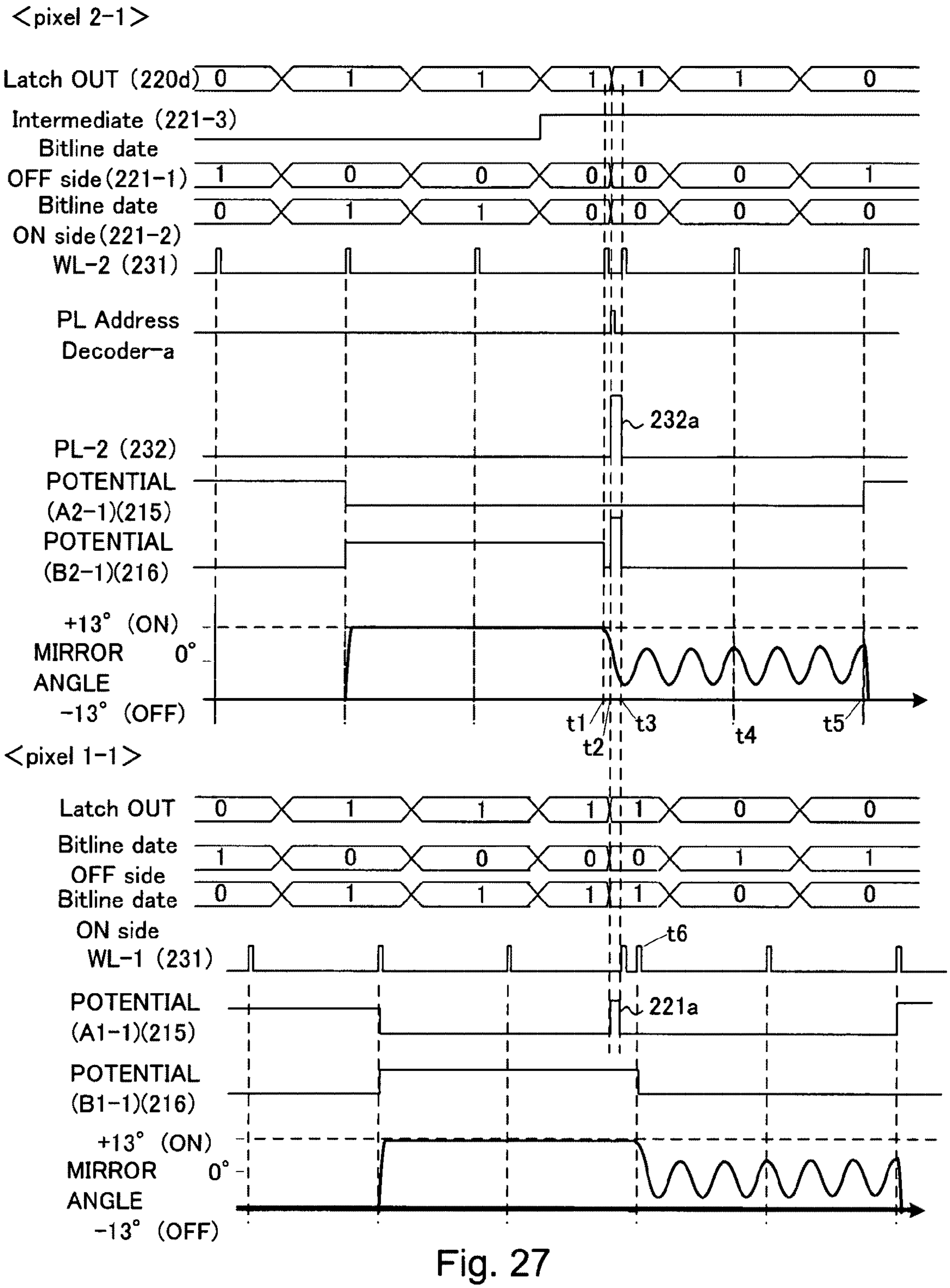
FIG. 27 is a timing chart showing an example of operations of the pixel array of the spatial light modulator configuring the display system according to the embodiment of the present invention.

The control example shown in FIG. 27 is different from the control example of FIG. 25 in that the potentials of the ON electrode 216 (B2-1) and the OFF electrode 215 (A1-1) at the control timing t3 are discharged by the bit lines 221-2 (bitline) and 221-1 (bitline) and the word line 231 (WL-2) (see the waveform at the control timing t3 in the word line 231).

Accordingly, only one PL Address Decoder 252-1 (plate line address decoder 252-1, plate line address decoder 252-2) is sufficient. An example of the layout of the control circuit in the periphery of the pixel array 210 in this case is shown in FIG. 28.

Figure 28:
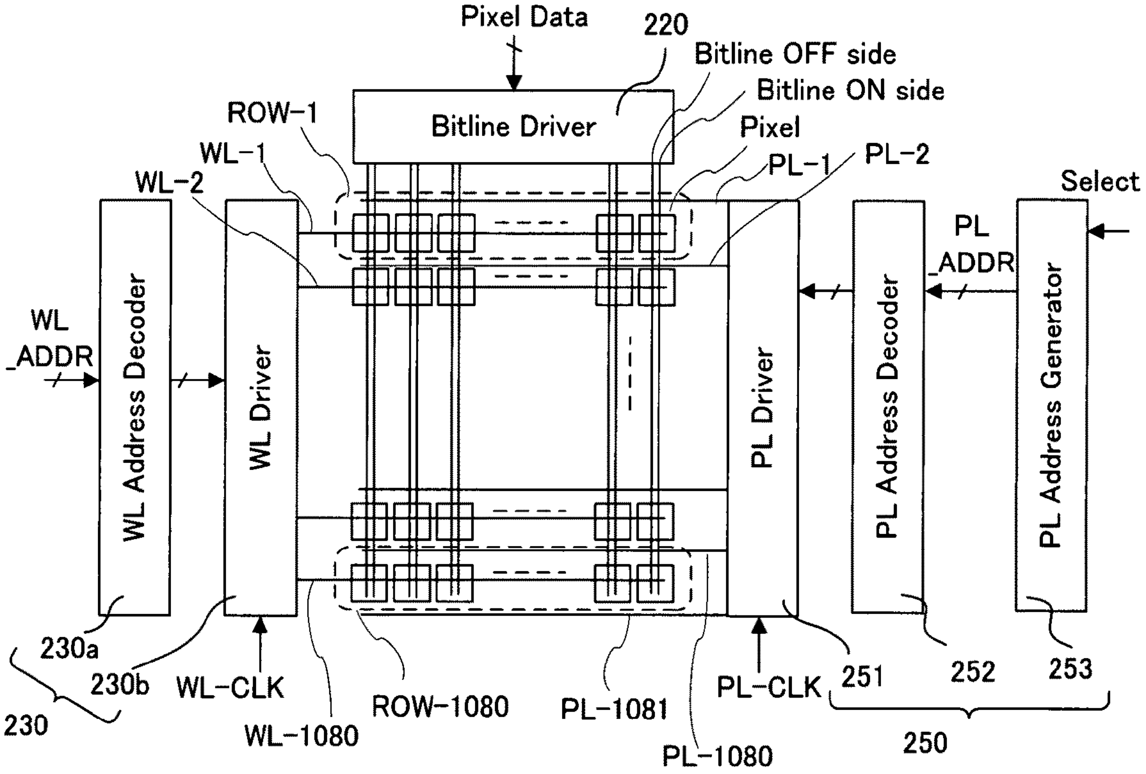
FIG. 28 is a functional circuit diagram showing a modification example of the layout of peripheral circuits of the pixel array in the embodiment of the present invention.

As shown in FIG. 28, this is a simpler configuration in which one plate line address decoder 252 is connected to the plate line driver 251 instead of the two plate line address decoders 252-1 and 252-2 shown in FIG. 13A.

Namely, in this configuration, the word lines 231 (WL-1, WL-2) are operated to discharge the voltage applied by the plate line 232 (PL-2) via the ON diode 216*f*, in addition to periodical operation at predetermined time intervals.

Furthermore, the voltage of the pixel unit 211 <pixel 1-1> can also be discharged by the operations of the word line (WL-1) that are performed at predetermined time intervals depending on conditions such as the size of the applied potential 221*a*, etc.

In this case, the voltage that the plate line 232 (PL-2) applies to the OFF electrode 215 (A1-1) of <pixel 1-1> at the control timing t2 is discharged at the initial control timing t6, which occurs at predetermined time intervals in the word line 231 (WL-1) after the control timing t2. Accordingly, the voltage is applied to both of the OFF electrode 215 (A1-1) and the ON electrode (B1-1) from the control timing t2 to the control timing t6 in the pixel unit 211 <pixel 1-1>. However, since the mirror 212 of <pixel 1-1> remains stationary on the side of the ON electrode 216 at the control timing t2, a relatively high Coulomb force is applied between the ON electrode 216 and the mirror 212. If the Coulomb force applied between the mirror 212 and the ON electrode 216 of <pixel 1-1> is higher than the Coulomb force applied between the mirror 212 and the OFF electrode 215 of <pixel 1-1> and the restoring force of the elastic hinge 911, the mirror 212 of <pixel 1-1> will remain on the side of the ON electrode 216 (B1-1) for the duration of control timing t2 to control timing t6.

By using the control for making a sequential access while also skipping the plate lines 232, which will be described later, a delay of the sequential access to the word lines 231 is adjusted. Consequently, the interval from the control timing t2 to the control timing t6 can be adjusted. As a result, the above described operations can be performed more reliably.

Figure 29:
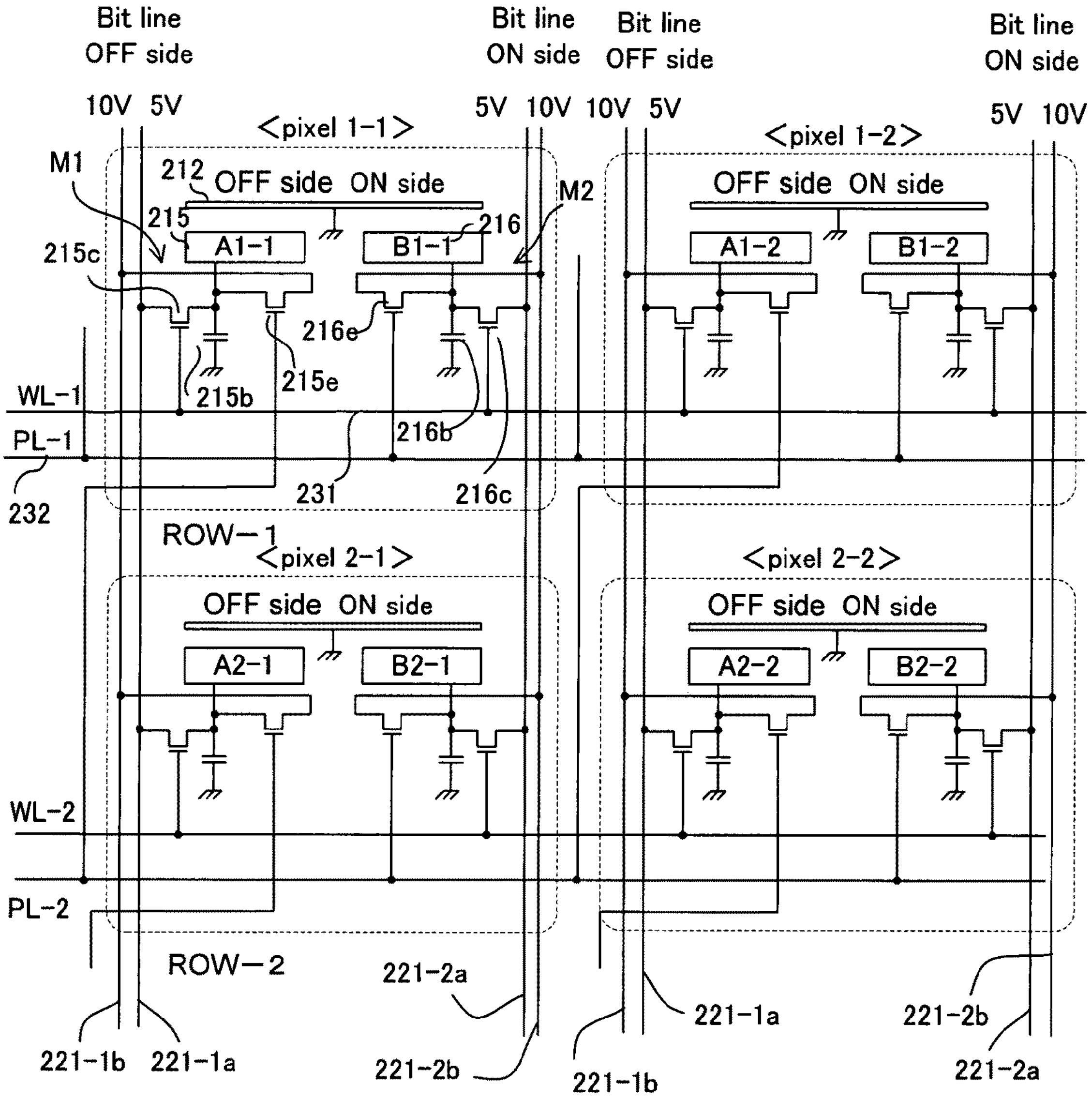
FIG. 29 is a functional circuit diagram showing a further modification example of the pixel unit in the display system according to the embodiment of the present invention.

FIG. 29 shows a further modification example of the pixel unit 211 shown in FIG. 8. There are a total of four bit lines; specifically, two bit lines 221 (bit line 221-1*a*, bit line 221-2*b*), the only difference being the applied voltages, are provided on the ON side, and two bit lines 221 (bit line 221-2*a*, bit line 221-2*b*), the only difference being the applied voltages, are provided on the OFF side.

FIG. 29 shows the configuration where the drain of the ON gate transistor 216*e* (OFF gate transistor 215*e*) is connected to the added bit lines 221 (bit line 221-1*b*. The bit line 221-2*b*) replaces the power supply voltage Vcc in the configuration of the modification example shown in FIG. 24.

Figure 30:
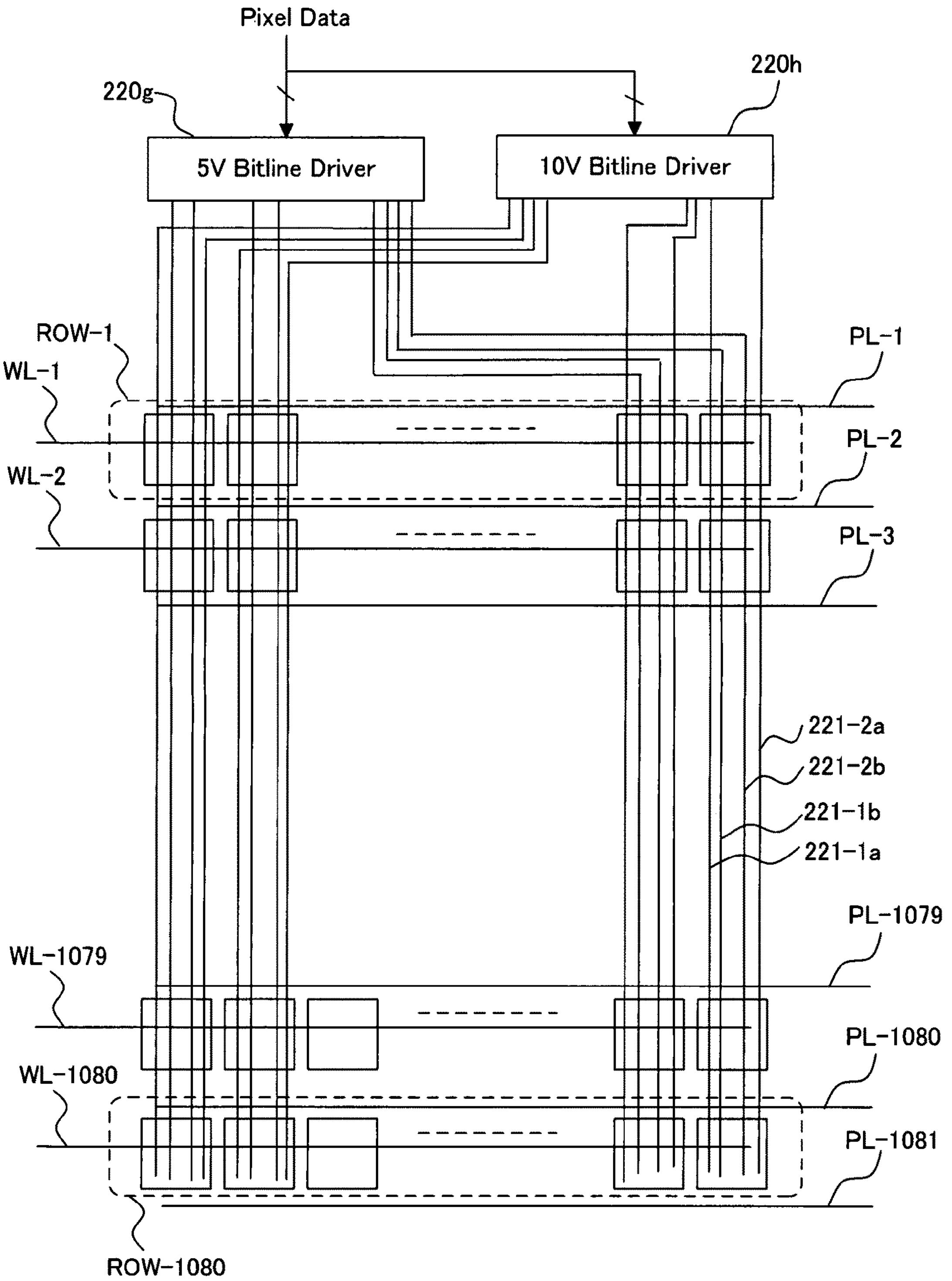
FIG. 30 is a functional circuit diagram showing an example of a configuration added to the bit line driver unit (Bitline Driver) in the pixel array having the configuration shown in FIG. 29.

From the two bit lines 221 provided on the ON side, identical signals, which only vary in terms of H-level voltage differences, are outputted. The two bit lines 221 provided on the OFF side operate in a similar manner. Accordingly, the above described bit line driver unit 220 shown in FIG. 13A can be replaced with a 5V bit line driver unit 220*g* and a 10V bit line driver unit 220*h*, which are shown in FIG. 30. The internal configurations of the 5V bit line driver unit 220*g* and the 10V bit line driver unit 220*h* are similar to that of the bit line driver unit 220 shown in FIG. 16. However, the only difference is that voltages converted by the level shift circuit 220*c* are 5V and 10V, respectively.

As a result, the two bit lines, in which the only difference is the voltage, are provided on the ON and the OFF sides of each pixel unit 211.

Figure 31:
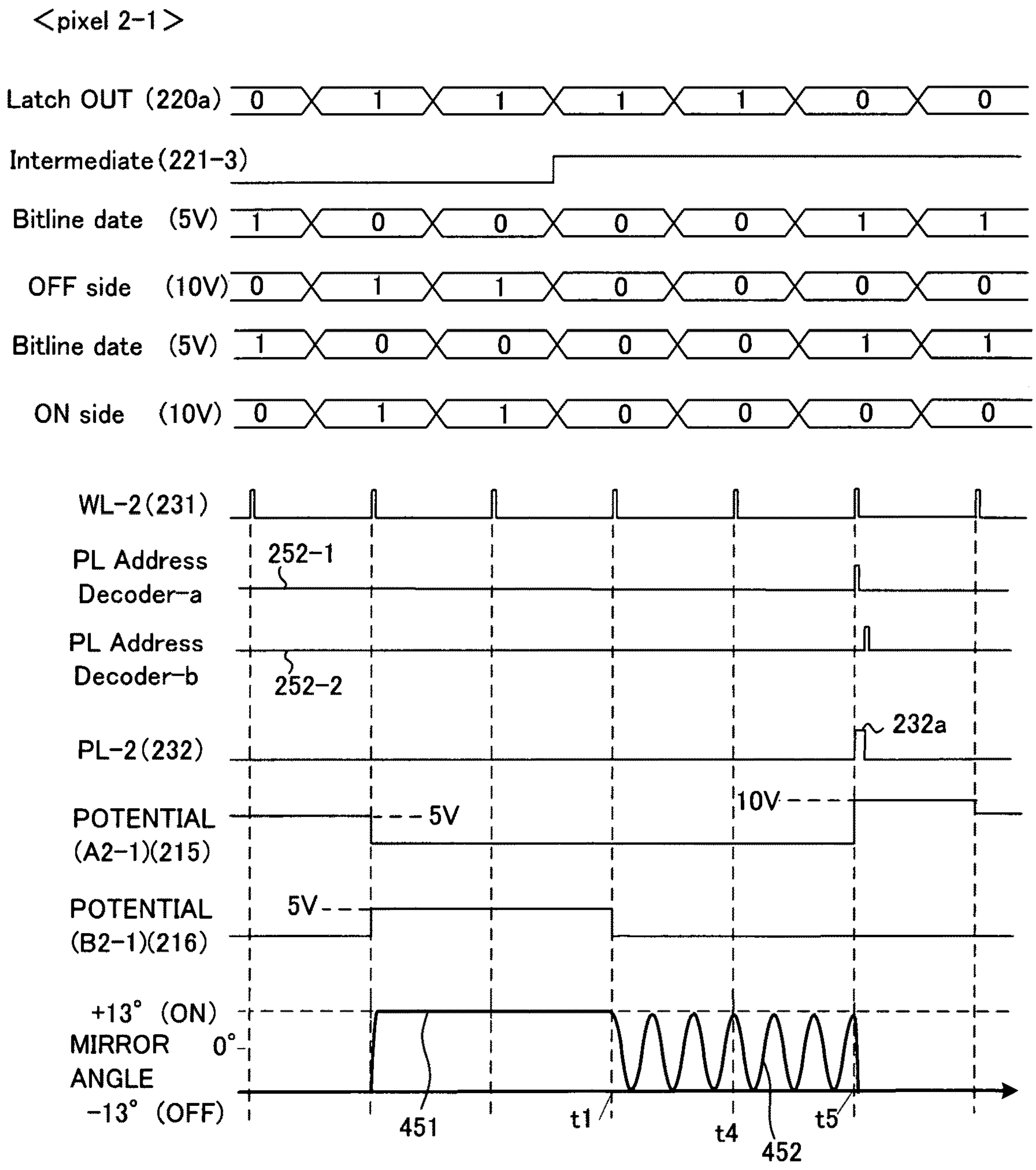
FIG. 31 is a timing chart showing an example of operations of the pixel array of the spatial light modulator configuring the display system according to the embodiment of the present invention.

FIG. 31 is a timing chart showing the operational timings of <pixel 2-1> (pixel unit 211) and the state of the mirror 212 in the configuration shown in FIG. 29. In FIG. 31, the plate line 232 is used to change the mirror 212 from the oscillation state to the stationary state.

Before the control timing t1, when the mode switch signal 221-3 (Intermediate) is "L", both of the two bit lines 221 on the ON side are "1" and both of the two bit lines 221 on the OFF side are "0" if LatchOUT is 1. As a result, the mirror 212 remains on the side of the ON electrode 216 (B2-1). In contrast, if LatchOUT is "0", both of the two bit lines 221 on the OFF side are "1" and both of the two bit lines 221 on the ON side are "0". As a result, the mirror 212 remains on the side of the OFF electrode 215 (A2-1). Specifically, before the control timing t1, the operations of the mirror 212 are controlled like the PWM control profile 451 with the pulse width modulation (PWM).

At and after the control timing t1, when the mode switch signal 221-3 (intermediate) is "H", all of the bit lines 221 on the ON and the OFF sides are 0, and the OFF electrode 215 (A2-1) and the ON electrode 216 (B2-1) are driven to 0V if LatchOUT is "1". As a result, the mirror 212 starts to freely oscillate.

Thereafter, at the control timing t5, the plate line address decoder 252-1 (PL Address Decoder-a) and the plate line address decoder 252-2 (PL Address Decoder-b) are sequentially selected synchronously with the operations of the word line 231 (WL-2).

As a result, the plate line 232 (PL-2) operates and the OFF gate transistor 215*e* is opened, whereby the potential of the OFF electrode 215 (A2-1) becomes the same as the bit line 221-1*b*, to which the higher voltage is applied. Moreover, the ON electrode 216 is driven to 0V because both of the two connected bit lines 221 (bit line 221-2*a*, bit line 221-2*b*) are 0V.

Consequently, it becomes possible to switch the mirror 212 more quickly towards the OFF electrode 215 with a higher Coulomb force, as compared with the case of operating only with the word line 213 (WL-2). As a result, the state change time is reduced, and a more ideal gray scale level can be represented.

Figure 32:
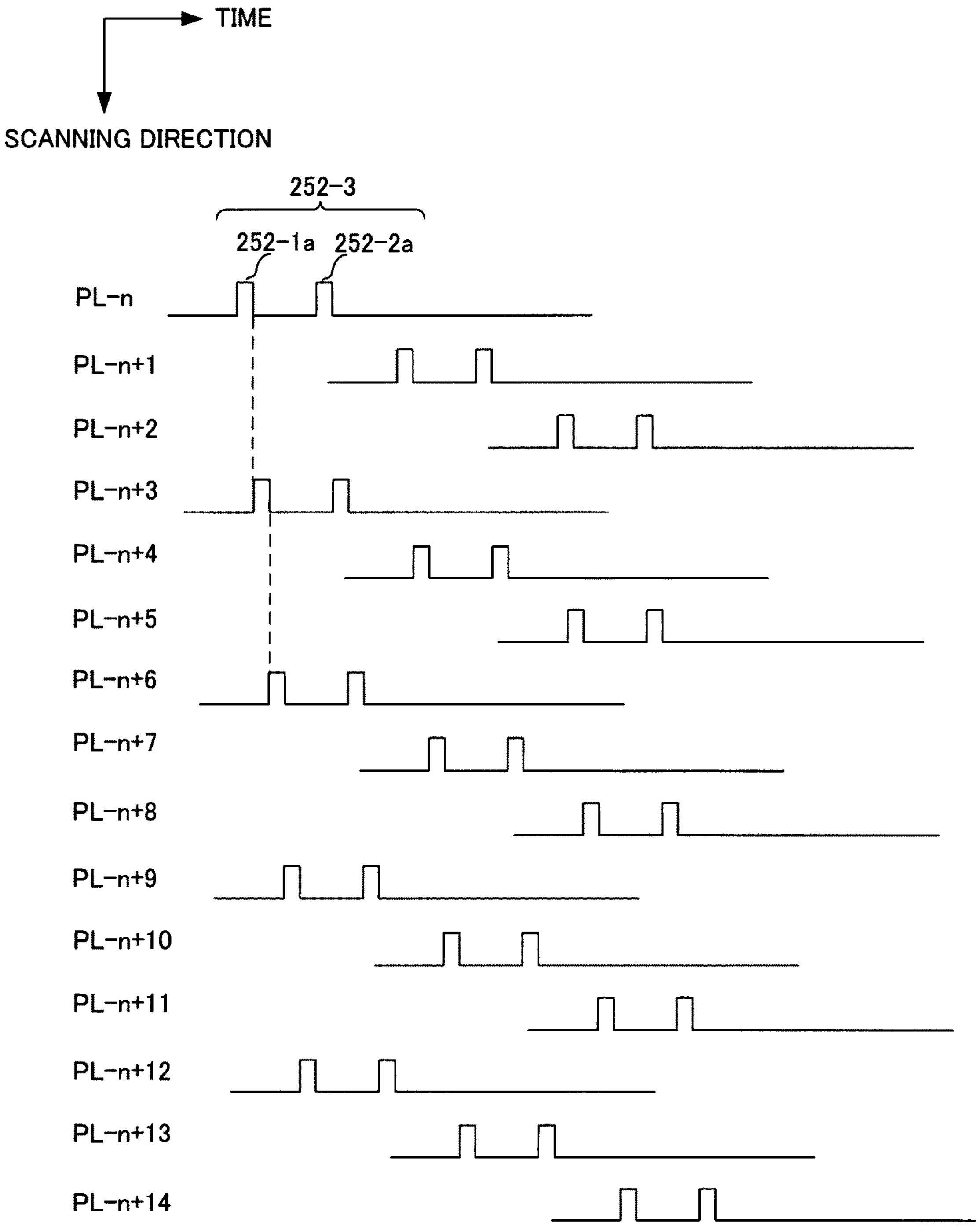
FIG. 32 is a conceptual diagram showing an example of a control for making a sequential access to plate lines while skipping a plurality of rows in the spatial light modulator configuring the display system according to the embodiment of the present invention.

FIG. 32 is a conceptual diagram showing the state where the sequential access to the plate lines 232 is controlled. This figure shows the state where the sequential access is made to the plate lines 232 while skipping two lines.

By performing the above described sequential access control, the effects on other ROW lines, which accompany the selection of a plate line 232 in this embodiment, can be more reliably avoided, as will be described later.

FIG. 32 shows an example in which the plate lines 232 are used to generate the intermediate oscillation. A pulse signal 252-3 represents a signal for selecting a plate line 232. The pulse signal 252-3 is composed of a selection start signal 252-1*a*, outputted from the plate line address decoder 252-1 shown in FIG. 13A, and a selection cancel signal 252-2*a*, outputted from the plate line address decoder 252-2 shown in FIG. 13A.

In FIG. 32, the selection start signal 252-1*a* and the selection cancel signal 252-2*a* are depicted for each plate line 232, and the timing differences of pulse signals 252-3 inputted to the plate lines 232 are also depicted.

Specifically, after an access is made to an arbitrary plate line 232 (PL-n), the access is made to the plate lines 232 by skipping every two lines such as plate line 232 (PL-n+3) and plate line 232 (PL-n+6).

As a result, a higher gray scale and a higher definition image can be projected by implementing the diverse operations of the mirror 212 with signals applied to the plate lines 232, without being restricted by the cycle of access to the memory cells M1 and M2 of each pixel unit 211.

Figure 33:
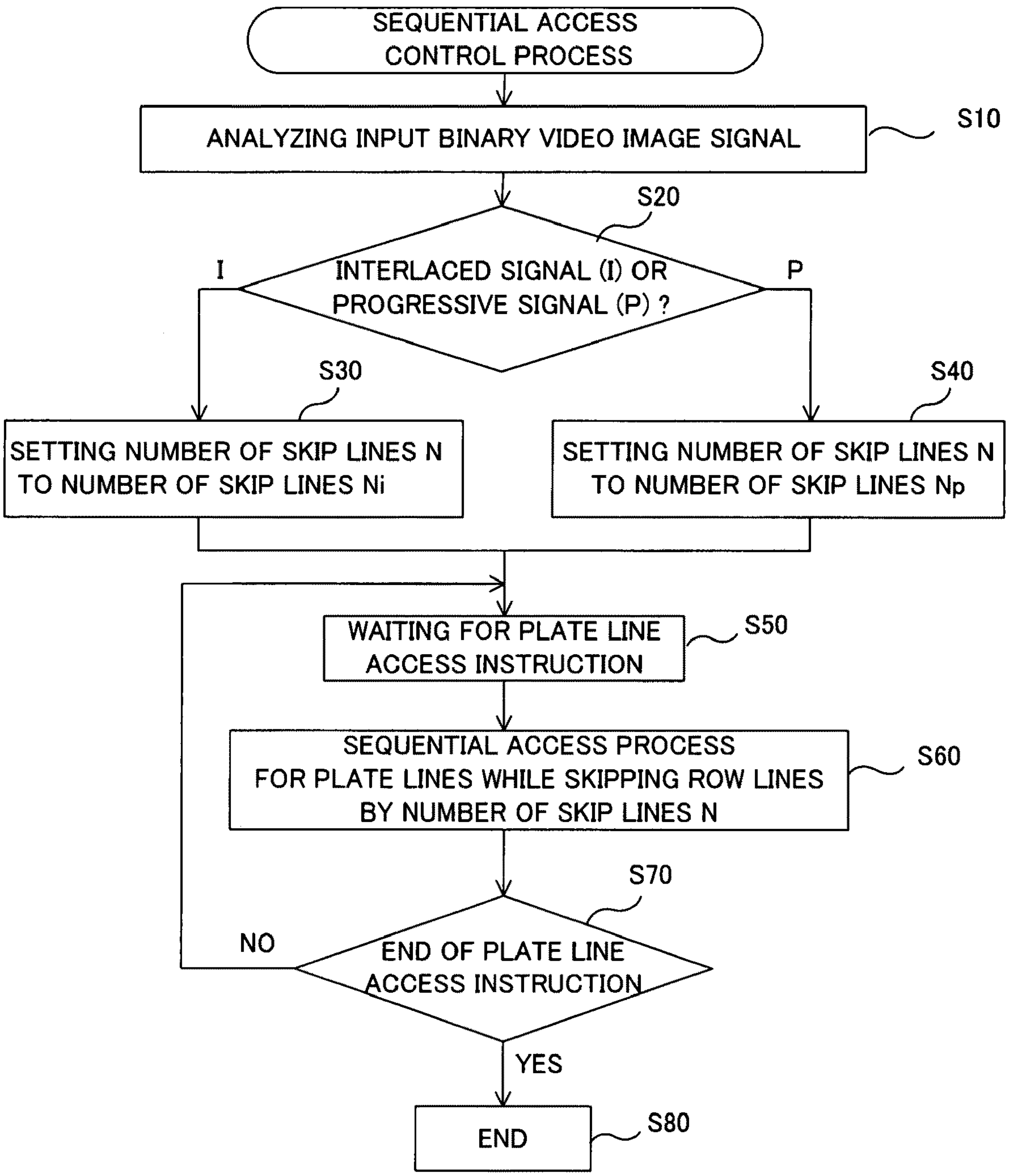
FIG. 33 is a flowchart showing an example of the sequential access control for the plate lines in the spatial light modulator configuring the display system according to the embodiment of the present invention.

FIG. 33 is a flowchart showing an example of the sequential access control for the plate lines in the spatial light modulator comprising the display system, according to the embodiment of the present invention.

A process for the sequential access control is invoked by externally inputting a binary video image signal 400. This access control is performed by the control device 300.

Initially, in step S10, the type of the binary video image signal 400 is analyzed. Whether the binary video image signal 400 is an interlaced signal or a progressive signal is determined based on the analysis result in step S20.

If the binary video image signal 400 is determined to be the interlaced signal in step S20, the process proceeds to step S30, in which the number of skip lines N is set to the number of skip lines Ni (Ni is an integer equal to or larger than 1) of the plate lines 232, which is optimized for the interlaced signal.

With the interlaced signal, in order to reproduce one binary video image signal 400, even-numbered fields obtained by collecting remaining even-numbered ROW lines are scanned after all the odd-numbered fields obtained by collecting odd-numbered ROW lines are scanned.

This causes a significant difference between the scanning timings of adjacent ROW lines, and the even-numbered ROW lines are scanned with a sufficient delay from the odd-numbered ROW lines.

Because of this, the PWM mode may be applied to an adjacent ROW line if a plate line 232 is used to generate the intermediate oscillation in the configuration in which, as in this embodiment, the plate line 232 is shared by adjacent ROW lines.

Accordingly, the number of skip lines N may be set to 1, the original number of skip lines of an interlaced signal. As a result, the effect on other ROW lines can be more reliably prevented.

Alternately, the number of skip lines N may be set to an odd number other than 1.

If the binary video image signal 400 is determined to be the progressive signal in step S20, the process proceeds to step S40, in which the number of skip lines N is set to the number of skip lines Np (an integer equal to or larger than 0) of the plate lines 232, which is optimized for the progressive signal.

With the progressive signal, the ROW lines are sequentially scanned without being skipped in order to reproduce one binary video image signal 400.

Since the scanning timing of an adjacent ROW line is delayed, the PWM mode may be applied to the adjacent ROW line. Accordingly, the number of skip lines N is normally set to 0. However, if the above described delay is not sufficient, the number of skip lines N, which causes the PWM mode to be executed for an adjacent ROW line, is set.

In step S50, the pulse signal 252-3 that instructs the timing of an access to the plate line 232 waits to be inputted.

In step S60, the sequential access is made to the plate lines 232, while skipping the plate lines 232 by the number of skip lines N set in step S30 or S40.

If the sequential access reaches the plate line 232 that cannot be skipped any more, a similar sequential access is made after shifting the plate line 232 to be scanned from the scanned plate line 232 by one line.

The variables are internally used to manage the plate lines 232 to be sequentially accessed. However, the above described variables may be separately controlled for the case where the pulse signal 252-3 is the selection start signal 252-1*a* and the case where the pulse signal 252-3 is the selection cancel signal 252-2*a*, resulting in mutually independent sequential access controls for the plate lines 232.

In step S70, it is determined whether or not a series of pulse signals 252-3 for the binary video image signal 400 has been inputted.

If the determination result in step S70 is "NO", the process proceeds to step S50, in which the sequential access is continuously made by waiting for the next pulse signal 252-3 to be inputted.

If the determination result in step S70 is "YES", the process proceeds to step S80, in which the sequential access control process is terminated.

By performing the above described sequential access control, the effects on other ROW lines, which accompany the selection of a plate line 232 shared by a plurality of ROW lines as in this embodiment, can be more reliably prevented.

Additionally, the sequential access control can handle the binary video image signal 400, whether it is an interlaced signal or a progressive signal.

The above described sequential access control for the plate lines 232, skipping the plate lines by a predetermined number, has another advantage in that the sequential access control itself for the plate lines 232 is simplified.

In the example shown in FIG. 32, the sequential access for inputting the selection cancel signal 252-2*a* occurs after the scanning of the sequential access of one time for inputting the selection start signal 252-1*a* is terminated. Accordingly, a complicated control process, for example, when one signal starts to scan while another signal is under the scanning process, can be avoided. This can be implemented because the scanning of the sequential access can be terminated within the short interval after the selection start signal 252-1*a* is inputted to the time when the selection cancel signal 252-2*a* is inputted. This can be realized by changing the number of the skip-lines N.

Figure 34:
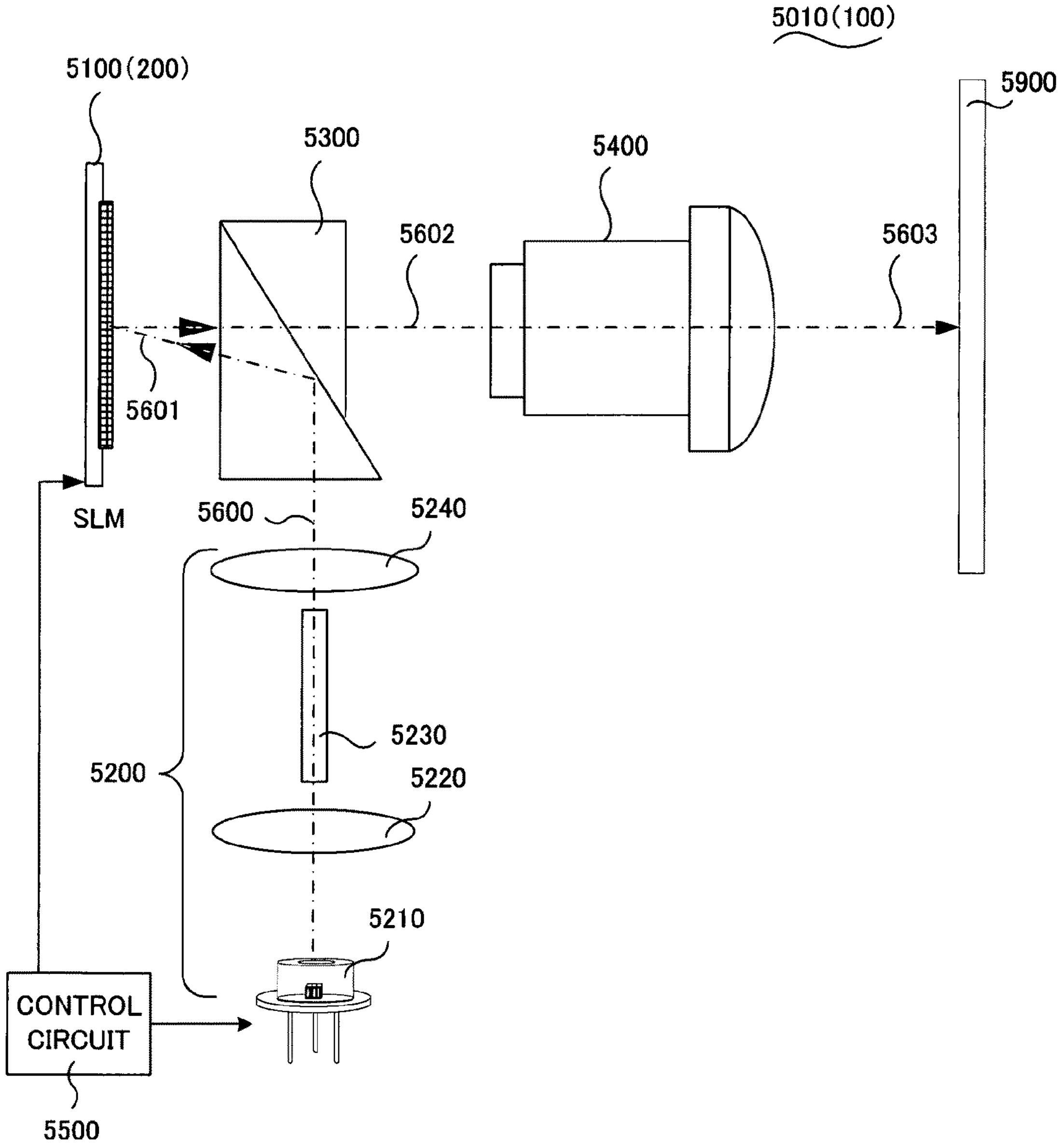
FIG. 34 is a functional block diagram showing an example of a configuration of a projection device in an embodiment of the present invention.

FIG. 34 is a functional block diagram showing the configuration of a projection device including the spatial light modulator according to an embodiment of the present invention. As shown in FIG. 34, the projection device 5010 according to this embodiment includes a spatial light modulator 5100 (spatial light modulator 200), a control unit 5500 (control device 300), a TIR (Total Internal Reflection) prism 5300, a projection optics system 5400, and a light source optics system 5200. The projection apparatus 5010 is a so-called single-panel projection apparatus 5010 comprising a single spatial light modulator 5100.

The spatial light modulator 5100 is configured with the above described spatial light modulator 200 having the plate lines 232.

The projection optical system 5400 is equipped with the spatial light modulator 5100 and TIR prism 5300 in the optical axis of the projection optical system 5400, and the light source optical system 5200 is equipped in such a manner that the optical axis matches that of the projection optical system 5400.

The TIR prism 5300 causes the illumination light 5600, incoming from the light source optical system 5200 placed onto the side, to enter the spatial light modulator 5100 at a prescribed inclination angle as incident light 5601 and causes a reflection light 5602, reflected by the spatial light modulator 5100, to transmit to the projection optical system 5400.

The projection optical system 5400 projects the reflection light 5602 as projection light 5603 to a screen 5900.

The light source optical system 5200 comprises a variable light source 5210 for generating the illumination light 5600, a condenser lens 5220 for focusing the illumination light 5600, a rod type condenser body 5230, and a condenser lens 5240, all of which are sequentially placed in the aforementioned order in the optical axis of the illumination light 5600, which is emitted from the variable light source 5210 and incident to the side face of the TIR prism 5300.

The projection apparatus 5010 employs a single spatial light modulator 5100 for implementing a color display on the screen 5900 by means of a sequential color display method.

Specifically, the variable light source 5210, comprising a red laser light source 5211, a green laser light source 5212 and a blue laser light source 5213 (which are not shown in the drawing), allows independent controls for the light emission states and divides one frame of display data into a plurality of sub-fields (i.e., three sub-fields, that is, red (R), green (G) and blue (B) in the present case). It further causes each of the red 5211, green 5212 and blue 5213 laser light sources to emit each respective light in a time series at the time band corresponding to the sub-field of each color.

Figure 35:
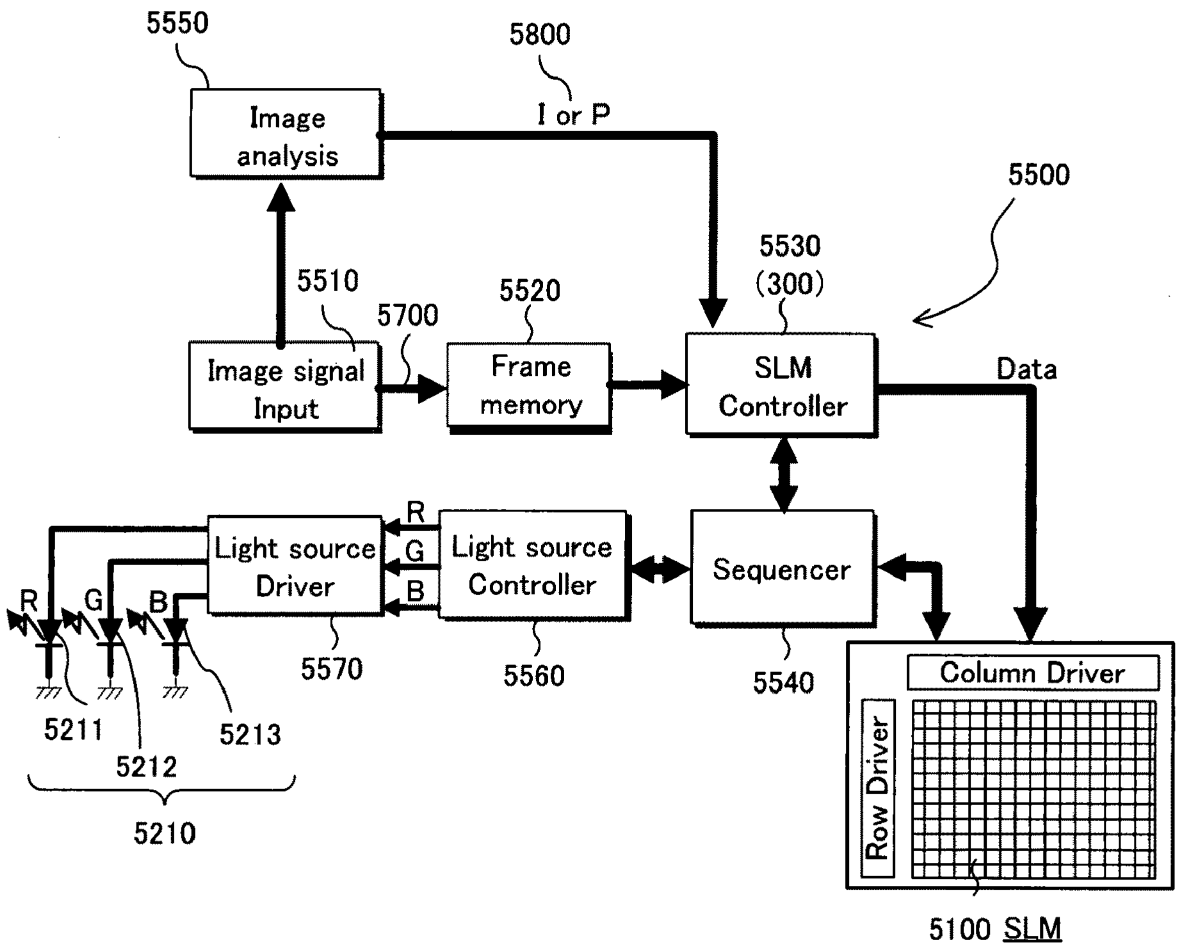
FIG. 35 is a functional block diagram showing an example of a configuration of a control unit included in the projection device in the embodiment of the present invention.

FIG. 35 is a functional block diagram showing an example of the configuration of the control unit 5500 in the above described projection device 5010. This control unit 5500 includes a frame memory 5520, an SLM controller 5530, a sequencer 5540, a video image analyzing unit 5550, a light source controlling unit 5560, and a light source driving circuit 5570.

The sequencer 5540 is configured with a microprocessor and controls the operational timings of the entire control unit 5500 and the spatial light modulator 5100.

The frame memory 5520 holds an input image signal 5700 (binary video image signal 400) of, for example, one frame, inputted from an external device (not shown) and connected to a video image signal input unit 5510. The input image signal 5700 is updated each time one frame has been displayed.

The SLM controller 5530 processes the input image signal 5700 read from the frame memory 5520, partitions the signal into a plurality of subfields, and outputs the partitioned data to the spatial light modulator 5100 as control data for implementing the ON/OFF control and the oscillation control for a mirror 5112 of the spatial light modulator 5100. The control data also includes the control data of the plate line 232 on the basis of the type 5800 of the input image signal 5700.

The sequencer 5540 outputs a timing signal to the spatial light modulator 5100 in synchronization with the generation of data in the SLM controller 5530.

The video image analyzing unit 5550 outputs a video image analysis signal 6800 for generating diverse light source pulse patterns on the basis of the input image signal 5700 inputted from the video image signal input unit 5510, and notifies the SLM controller 5530 of the type 5800 of the input image signal 5700.

The light source controlling unit 5560 controls operations for emitting the illumination light 5600, which are performed by the variable light source 5210, via the light source driving circuit 5570 on the basis of the video image analysis signal 6800 obtained from the video image analyzing unit 5550 via the sequencer 5540.

The light source driving circuit 5570 drives the red laser light source 5211, the green laser light source 5212, and the blue laser light source 5213 of the variable light source 5210 to emit light according to an instruction issued from the light source controlling unit 5560.

According to the present invention, the projection technique, which uses the spatial light modulator element, for achieving both of a higher gray scale and a higher definition of a projected image can be provided without increasing the number of wires.

What is claimed is:

1. A spatial light modulator, comprising:

a pixel array including a plurality of pixel elements arranged as a matrix of multiple columns and rows of pixel elements;

a plurality of bit lines each extending along and connected to the pixel elements in one of said columns;

a plurality of word lines each extending along and connected to the pixel elements in one of said rows; and a plurality of drive lines each for transmitting additional modulating signals in addition to said word lines and bit lines to said pixel array extended along one of said rows and connected to the pixel elements of two different rows.

2. The spatial light modulator according to claim 1, wherein:

the drive lines are connected to the pixel elements of two of said rows adjacent to each other.

3. The spatial light modulator according to claim 1, wherein:

each of the pixel elements includes a first and a second memories each including a capacitor and a transistor, a first electrode connected to the first memory, a second electrode connected to the second memory, a third electrode connected to the a first drive line extended along one of the rows including the pixel element, and a fourth electrode connected to a second drive line extended along another of the rows not including the pixel element.

4. The spatial light modulator according to claim 1, wherein:

each of the pixel elements includes a first memory including first and second capacitors, and a first transistor, a second memory including third and fourth capacitors, and a second transistor, a first electrode connected to the first memory, and a second electrode connected to the second memory;

the second capacitor is connected to the first drive line extended along one of the rows including the pixel element; and the fourth capacitor is connected to the second drive line extended along another of the rows not including the pixel element.

5. The spatial light modulator according to claim 1, wherein:

each of the pixel elements includes a first memory including a first capacitor and a first transistor, a second memory including a second capacitor and a second transistor, a first electrode connected to the first memory, and a second electrode connected to the second memory;

the first capacitor is connected to the first drive line extended along one of the rows including the pixel element; and the second capacitor is connected to the second drive line extended along another of the rows not including the pixel element.

6. The spatial light modulator according to claim 1, wherein:

each of the pixel elements includes a first memory including a first capacitor, and first and second transistors, a second memory including a second capacitor, and third and fourth transistors, a power supply connected to the second and the fourth transistors, a first electrode connected to the first memory, and a second electrode connected to the second memory;

the second transistor is connected to the drive line extended along one of the rows including the pixel element; and the fourth transistor is connected to the drive line extended along another of the rows not including the pixel element.

7. The spatial light modulator according to claim 1, wherein:

each of the plurality of pixel elements includes a first memory including a first capacitor, a first transistor and a first diode, a second memory including a second capacitor, a second transistor and a second diode, a first electrode connected to the first memory, and a second electrode connected to the second memory;

the first diode is connected to the drive line extended along one of the rows first row including the pixel element; and the second diode is connected to the drive line extended along another of the rows not including the pixel element.

8. The spatial light modulator according to claim 1 further comprising:

a mirror device wherein each of said pixel elements includes a micromirror.

9. The spatial light modulator according to claim 8, wherein:

the drive line is controlled for defecting the micromirrors of the pixel elements in one of the rows in an ON direction, and the drive line is controlled simultaneously for deflecting the micromirrors of the pixel elements in another of the rows in an OFF direction.

10. The spatial light modulator according to claim 1, further comprising:

a driver circuit for simultaneously transmitting a signal to the pixel elements in two different rows.

11. The spatial light modulator according to claim 1, further comprising:

a driver circuit for transmitting a signal through the drive line to to drive the pixel element.

12. The spatial light modulator according to claim 1, further comprising:

a driver circuit for transmitting a signal through the drive line for applying a potential on the bit line in the pixel element.

13. The spatial light modulator according to claim 1, further comprising:

a driver circuit for transmitting a signal through a drive line with a shorter transmission duration than a an access cycle to the pixel element through the word line.

14. The spatial light modulator according to claim 1, further comprising:

a driver circuit for transmitting a signal through a drive line with a shorter transmission duration almost equal to an access cycle to the pixel element through the word line.

15. The spatial light modulator according to claim 1, further comprising:

each of the plurality of pixel element elements includes a first memory including a first capacitor, and first and second transistors, a second memory including a second capacitor, and third and fourth transistors, a first electrode connected to the first memory, and a second electrode connected to the second memory;

the first transistor is connected to the word line and a first bit line;

the second transistor is connected to the drive line in one of the rows including the pixel element , and a second bit line;

the third transistor is connected to the word line and a third bit line;

the fourth transistor is connected to the drive line extended along another of the rows not including the pixel element, and a fourth bit line;

a driver circuit for synchronously transmitting signals in the first and the second bit lines of different voltages; and the driver circuit further synchronously transmits signals in the third and the fourth bit lines of different voltages.

16. The spatial light modulator according to claim 1, further comprising:

a scanning direction switching unit for switching a scanning direction of scanning through the drive lines between a forward direction and a reverse direction opposite said forward direction.

17. A spatial light modulator, comprising:

a pixel array including a plurality of pixel element arranged as a matrix of multiple columns and rows of pixel elements;

a plurality of bit lines each extending along and connected to the pixel elements in one of said columns;

a plurality of word lines each extending along and connected to the pixel elements in one of said rows; and a plurality of drive lines each for transmitting signals for modulating said pixel array extended along one of said rows, and connected to the pixel elements in a first row and a second row for transmitting said signals to the pixel elements in the first and the second rows.

18. The spatial light modulator according to claim 17, further comprising:

a driver circuit for transmitting a signal through the drive line to generate and apply a potential on the drive lines line to drive the pixel element.

19. The spatial light modulator according to claim 17, further comprising:

a driver circuit for transmitting a signal through the drive line for generating and applying a potential to the pixel element from the bit line.

20. The spatial light modulator according to claim 17, further comprising:

a driver circuit for transmitting a signal through a drive line with a shorter transmission duration than an access cycle to the pixel element through the word lines.

21. The spatial light modulator according to claim 17, wherein:

a driver circuit for transmitting a signal through the drive lines with a shorter transmission duration almost equal to an access cycle to the pixel element through the word line.

22. The spatial light modulator according to claim 17, wherein:

each of the plurality of pixel elements includes:

a first memory including a first capacitor, and first and second transistors, a second memory including a second capacitor, and third and fourth transistors, a first electrode connected to the first memory, and a second electrode connected to the second memory;

the first transistor is connected to one of the word lines each extended along the row of the pixel elements and a first bit line;

the second transistor is connected to the drive line extended along one of the rows including the pixel element, and a second bit line;

the third transistor is connected to the word line and a third bit line;

the fourth transistor is connected to the drive line extended along another of the rows not including the pixel element, and a fourth bit line;

a driver circuit for synchronously transmitting signals of different voltages in the first and the second bit lines; and a driver circuit for synchronously transmitting signals of different voltages in the third and the fourth bit lines.

23. The spatial light modulator according to claim 17, further comprising:

a scanning direction switching unit for switching a scanning direction of scanning through the drive lines between a forward direction and a reverse direction opposite said forward direction.

24. The spatial light modulator according to claim 17, wherein:

the drive lines are connected to the pixel elements of two of said rows adjacent to each other.

25. The spatial light modulator according to claim 17, wherein:

each of the plurality of pixel elements includes first and second memories each including a capacitor and a transistor;

a first electrode connected to the first memory, a second electrode connected to the second memory, a third electrode connected to the drive line extended along one of the rows including the pixel element, and a fourth electrode connected to the drive line extended along another of the rows not including the pixel element.

26. The spatial light modulator according to claim 17, wherein:

each of the plurality of pixel elements includes a first memory including first and second capacitors, and a first transistor, a second memory including third and fourth capacitors, and a second transistor, a first electrode connected to the first memory, and a second electrode connected to the second memory;

the second capacitor is connected to the drive line extended along one of the rows including the pixel element; and the fourth capacitor is connected to the drive line extended along another of the rows not including the pixel element.

27. The spatial light modulator according to claim 17, wherein:

each of the plurality of pixel elements includes a first memory including a first capacitor and a first transistor, a second memory including a second capacitor and a second transistor, a first electrode connected to the first memory, and a second electrode connected to the second memory;

the first capacitor is connected to the drive line extended along one of the rows including the pixel element; and the second capacitor is connected to the drive line extended along another of the rows not including the pixel element.

28. The spatial light modulator according to claim 17, wherein:

each of the plurality of pixel elements includes a first memory including a first capacitor, and first and second transistors, a second memory including a second capacitor, and third and fourth transistors, a power supply connected to the second and the fourth transistors, a first electrode connected to the first memory, and a second electrode connected to the second memory;

the second transistor is connected to the drive line extended along one of the rows including the pixel element; and the fourth transistor is connected to the drive line extended along another of the rows not including the pixel element.

29. The spatial light modulator according to claim 17, wherein:

each of the plurality of pixel element elements includes a first memory including a first capacitor, a first transistor and a first diode, a second memory including a second capacitor, a second transistor and a second diode, a first electrode connected to the first memory, and a second electrode connected to the second memory; the first diode is connected to the drive line extended along one of the rows including the pixel element belongs; and the second diode is connected to the drive line extended along another of the rows not including the pixel element.

30. The spatial light modulator according to claim 17 further comprising:

a mirror device wherein each of said pixel elements includes a micromirror.

31. The spatial light modulator according to claim 30, wherein the drive line is controlled for defecting the micromirrors of the pixel elements in one of the rows in an ON direction, and the drive line is controlled simultaneously for deflecting the micromirrors of the pixel elements in another of the rows in an OFF direction.

32. A method for controlling a spatial light modulator comprising a plurality of pixel elements arranged as a matrix of multiple columns and rows of pixel elements having a plurality of bit lines each extending along and connected to the pixel elements in one of said columns and a plurality of word lines each extending along and connected to the pixel elements in one of said rows, the method comprising:

forming drive lines to extend along said rows of pixel elements; and transmitting a signal, in addition to other signals transmitted on said word lines and bit lines, to a plurality of pixel elements along selected rows through a plurality of selected drive lines.

33. The method according to claim 32, wherein:

the step of transmitting a signal to a plurality of pixel elements along the selected rows through a plurality of selected drive lines comprising a step of transmitting the signal to a plurality of pixel elements extended along a first row and a second row.

34. The method according to claim 33, wherein:

the step of transmitting a signal to a plurality of pixel elements along the selected rows through a plurality of selected drive lines comprising a step of transmitting the signal to a plurality of pixel elements extended along a first row and a second row adjacent to the first row.

35. A method for controlling a spatial light modulator comprising a plurality of pixel elements arranged as a matrix of multiple columns and rows of pixel elements having a plurality of bit lines each extending along and connected to the pixel elements in one of said columns and a plurality of word lines each extending along and connected to the pixel elements in one of said rows, the method comprising:

forming drive lines to extend along said rows of pixel elements; and selecting and transmitting a data access signal on a first drive line; and selecting and transmitting a subsequent data access signal on a second drive line with the second drive line located at N rows away from the first drive line where N is a positive integer.

36. The method according to claim 35, further comprising a step of connecting a drive line to the pixel elements extended along a first row and a second row in the matrix of the multiple rows and multiple columns of pixel elements.

37. The method according to claim 36, wherein:

connecting a drive line to the pixel elements along a first row and a second row adjacent to the first row.

38. The method according to claim 35, wherein:

the step of selecting and transmitting a data access signal on a first and second drive lines located with N rows between the first and second drive lines comprise a step of select and transmitting the data access signal on two adjacent drive lines with N=0.

39. The method according to claim 35, wherein:

the step of selecting and transmitting a data access signal on a first and second drive lines located with the N rows between the first and second drive lines comprise a step of select and transmitting the data access signal on two drive lines with N=1.

40. The method according to claim 35, wherein:

the step of selecting and transmitting a data access signal on a first and second drive lines located with the N rows between the first and second drive lines comprise a step of select and transmitting the data access signal on two drive lines with N=2.

41. The method according to claim 35, wherein:

the step of selecting and transmitting a data access signal on a first and second drive lines located with the N rows between the first and second drive lines comprise a step of processing an input video image signal applying a processing result for determining the number of rows represented by N.

42. The method according to claim 41, wherein:

the step of processing the input video, image signal further comprising a step of processing the input video image signal to determine if the input video image signal comprising an interlaced signal or a progressive signal.

43. A method for controlling a spatial light modulator comprising a plurality of pixel elements arranged as a matrix of multiple columns and rows of pixel elements having a plurality of bit lines each extending along and connected to the pixel elements in one of said columns and a plurality of word lines each extending along and connected to the pixel elements in one of said rows, the method comprising:

forming drive lines to extend along said rows of pixel elements; and partitioning the drive lines into at least two groups and transmitting a signal to a pixel element through the drive lines within each of the groups in a predetermined duration.

44. The method according to claim 43, further comprising a step of:

connecting a drive line to the pixel elements extended along a first row and a second row in the matrix of the multiple rows and multiple columns of pixel elements.

45. The method according to claim 43, wherein:

the step of partitioning the drive lines into at least two groups further comprising a step of partitioning the drive lines into a plurality of groups with each group including an equal number of said drive lines.

46. The method according to claim 43, wherein:

the step of partitioning the drive lines into at least two groups further comprising a step of partitioning the drive lines into groups according to a driver circuit configuration for controlling the drive lines.

* * * * *